(12) United States Patent
Kikuchi et al.

(10) Patent No.: US 9,904,044 B2
(45) Date of Patent: Feb. 27, 2018

(54) ZOOM LENS AND IMAGE PICKUP APPARATUS INCLUDING THE SAME

(71) Applicant: CANON KABUSHIKI KAISHA, Tokyo (JP)

(72) Inventors: Shohei Kikuchi, Utsunomiya (JP); Shoichi Takemoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/297,660

(22) Filed: Oct. 19, 2016

(65) Prior Publication Data

US 2017/0108680 A1    Apr. 20, 2017

(30) Foreign Application Priority Data

Oct. 20, 2015  (JP) .................................. 2015-206169
Oct. 20, 2015  (JP) .................................. 2015-206170

(51) Int. Cl.
*G02B 15/14*      (2006.01)
*G02B 9/60*       (2006.01)
(Continued)

(52) U.S. Cl.
CPC ........... *G02B 15/177* (2013.01); *G02B 15/20* (2013.01); *G02B 5/005* (2013.01); *G02B 9/00* (2013.01); *G02B 9/60* (2013.01); *G02B 13/009* (2013.01); *G02B 13/0015* (2013.01); *G02B 13/0045* (2013.01); *G02B 13/04* (2013.01); *G02B 13/18* (2013.01); *G02B 15/14* (2013.01)

(58) Field of Classification Search
CPC ...... G02B 13/0045; G02B 9/60; G02B 13/18; G02B 15/177; G02B 13/009; G02B 13/04; G02B 15/14; G02B 15/20; G02B 5/005; G02B 13/0015; G02B 9/00
USPC ........ 359/676, 680–683, 714, 740, 753, 770
See application file for complete search history.

(56) References Cited

U.S. PATENT DOCUMENTS 6,785,055 B2 *   8/2004   Nishikawa ........... G02B 15/177
                                                          359/680
7,907,350 B2 *   3/2011   Mitsuki ................ G02B 15/173
                                                          359/557

(Continued)

FOREIGN PATENT DOCUMENTS

JP           4957124 B2    6/2012
JP        2014-038153 A    2/2014

*Primary Examiner* — Evelyn A Lester
(74) *Attorney, Agent, or Firm* — Carter, DeLuca, Farrell & Schmidt, LLP

(57) ABSTRACT

A zoom lens, including, in order from an object side: a negative first unit being not moved for zooming; a second unit including at least one sub-unit that is moved during zooming, and having a positive refractive power as a whole; a negative third unit including an aperture stop, being not moved for zooming; a fourth unit including at least one sub-unit and being moved during zooming; and a fifth unit being not moved for zooming, at least three sub-units among the sub-units included in the second and fourth units being moved during zooming, in which focal lengths of the first and third units, and a movement amount of a sub-unit that is moved most in the second unit and a movement amount of a sub-unit that is moved most in the fourth unit during zooming from a wide angle end to a telephoto end satisfy predetermined conditions.

17 Claims, 24 Drawing Sheets

(51) Int. Cl.
   *G02B 15/177* (2006.01)
   *G02B 15/20* (2006.01)
   *G02B 13/00* (2006.01)
   *G02B 5/00* (2006.01)
   *G02B 13/18* (2006.01)
   *G02B 13/04* (2006.01)
   *G02B 9/00* (2006.01)

(56) References Cited

U.S. PATENT DOCUMENTS

| | | | | |
|---|---|---|---|---|
| 8,570,662 B2* | 10/2013 | Eguchi | G02B 15/17 | 348/340 |
| 8,665,530 B2* | 3/2014 | Fujikura | G02B 15/173 | 359/676 |
| 8,804,243 B2* | 8/2014 | Hatakeyama | G02B 15/177 | 359/554 |
| 2003/0103268 A1* | 6/2003 | Nishikawa | G02B 15/177 | 359/683 |
| 2006/0056043 A1* | 3/2006 | Nakazawa | G02B 13/22 | 359/676 |
| 2006/0061872 A1* | 3/2006 | Yamasaki | G02B 13/22 | 359/680 |
| 2009/0091840 A1* | 4/2009 | Ikeda | G02B 15/17 | 359/682 |
| 2009/0195884 A1* | 8/2009 | Inoko | G02B 13/22 | 359/682 |
| 2010/0149653 A1* | 6/2010 | Wada | G02B 15/177 | 359/682 |
| 2011/0286103 A1* | 11/2011 | Miyazawa | G02B 15/177 | 359/682 |
| 2012/0268831 A1* | 10/2012 | Yamanashi | G02B 15/177 | 359/686 |
| 2014/0002714 A1* | 1/2014 | Eguchi | G02B 15/14 | 348/345 |
| 2014/0226218 A1* | 8/2014 | Nagahara | G02B 15/177 | 359/680 |
| 2014/0293123 A1 | 10/2014 | Wakazono et al. | | |
| 2015/0015969 A1* | 1/2015 | Komatsu | G02B 15/17 | 359/683 |
| 2015/0097995 A1* | 4/2015 | Wada | G02B 15/173 | 348/294 |
| 2015/0130969 A1* | 5/2015 | Nakamura | G02B 15/177 | 348/240.3 |
| 2015/0241676 A1* | 8/2015 | Komatsu | G02B 15/17 | 359/683 |
| 2015/0316755 A1 | 11/2015 | Takemoto | | |
| 2015/0362710 A1 | 12/2015 | Kikuchi | | |
| 2015/0362711 A1 | 12/2015 | Wakazono et al. | | |
| 2016/0054549 A1* | 2/2016 | Takemoto | G02B 15/167 | 359/683 |

* cited by examiner

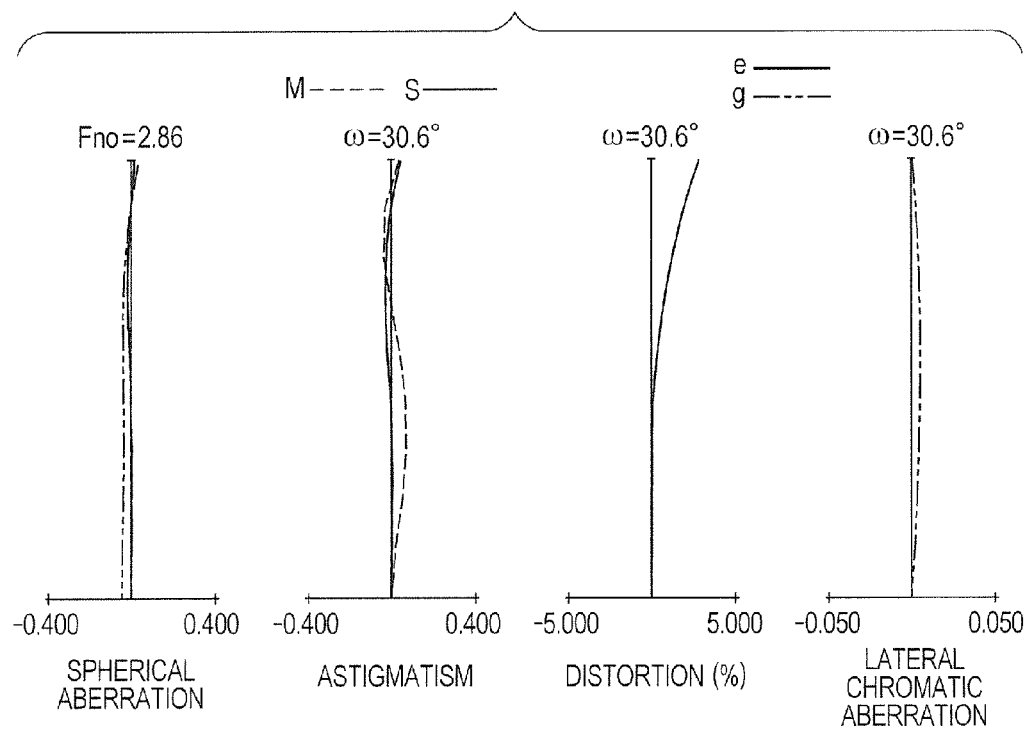
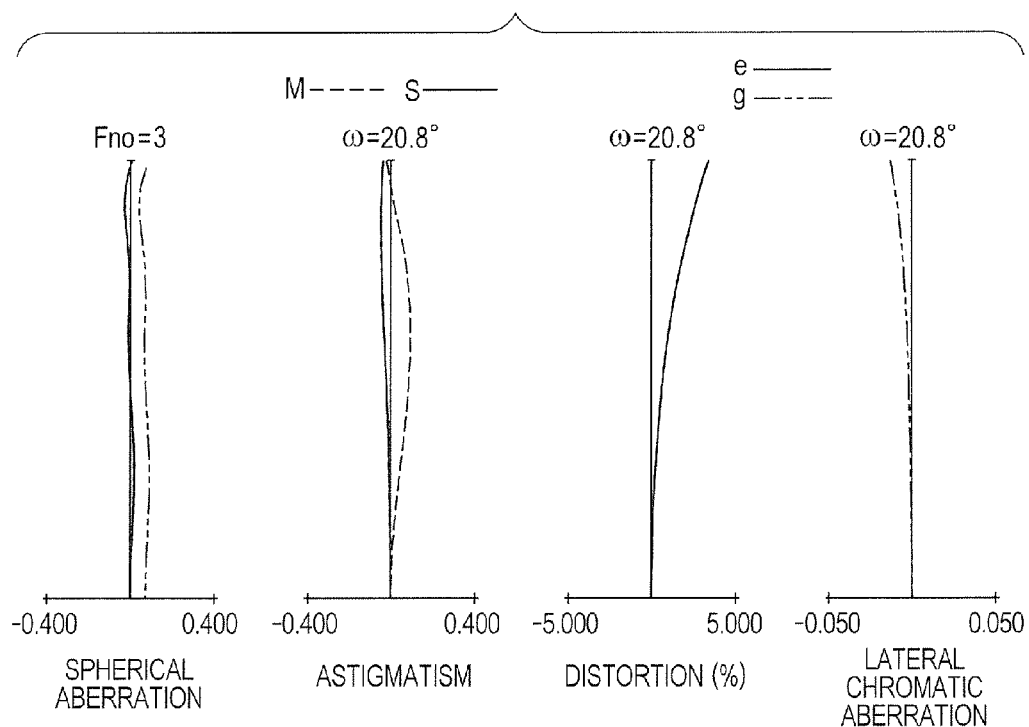

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, and more particularly, to a zoom lens suited for use in a broadcasting television camera, a cinema camera, a video camera, a digital still camera, and a silver-halide film camera.

Description of the Related Art

In recent years, a zoom lens having a small size, a light weight, a wide angle of view, a high magnification ratio, and high optical performance is desired for use in an image pickup apparatus, e.g., a television camera, a cinema camera, a photographic camera, or a video camera. In particular, an image pickup device, e.g., a charge coupled device (CCD) or a complementary metal oxide semiconductor (CMOS), which is used in a television or cinema camera serving as a professional moving image pickup system, has a substantially uniform resolution over the entire image pickup range. Therefore, a zoom lens using the image pickup device is required to have a substantially uniform resolution from the center to the periphery of the screen. There are also needs for reductions in size and weight for an image pickup mode that places emphasis on mobility and operability.

Meanwhile, when a wide angle lens having a short focal length at a wide angle end is used, a wide range may be photographed, and perspective may be enhanced. Among users who want to utilize the photographing effect, there is an increased demand for a wide angle zoom lens having a wider angle, a high magnification ratio, a small size, a light weight, and high performance.

As a wide angle zoom lens, there is known a negative lead type zoom lens including a total of four or more lens units, of which a lens unit having a negative refractive power is arranged closest to an object side.

For example, in Japanese Patent Application Laid-Open No. 2014-38153, there is disclosed a six-unit zoom lens having an F-number of from about 2.2 to about 2.5 at a wide angle end, an angle of view of from about 45 degrees to about 65 degrees at the wide angle end, and a magnification ratio of from about 1.4× to about 1.7×. Moreover, in Japanese Patent No. 4957124, there is disclosed a six-unit zoom lens having an F-number of from about 1.8 to about 2.5 at a wide angle end, an angle of view of from about 35 degrees to about 60 degrees at the wide angle end, and a magnification ratio of from about 1.2× to about 1.5×. Each zoom lens includes, in order from an object side, a first lens unit having a negative refractive power, a second lens unit having a positive refractive power, a third lens unit having a positive refractive power, a fourth lens unit having a negative refractive power, a fifth lens unit having a positive refractive power, and a sixth lens unit having a positive refractive power.

However, in the zoom lens disclosed in each of Japanese Patent Application Laid-Open No. 2014-38153 and Japanese Patent No. 4957124, the refractive power and the lens configuration of each lens unit are disadvantageous for achieving a wider angle and a higher magnification, with the result that it becomes difficult to suppress an increase in lens diameter accompanying the achievement of the wide angle and an increase in total length accompanying the achievement of the high magnification. In particular, when the angle of view exceeds 70 degrees at the wide angle end, a tendency toward the increased lens diameter becomes significant, and when the magnification ratio exceeds 2×, a tendency toward an increase in movement amount of a magnification varying lens unit becomes significant.

SUMMARY OF THE INVENTION

Therefore, it is an object of the present invention to provide, by appropriately setting refractive powers, lens configurations, aberration shares, and other such conditions of respective lens units, a zoom lens having a wide angle of view, a high magnification ratio, a small size, a light weight, and high optical performance over the entire zoom range. Specifically, it is an object of the present invention to provide a small, lightweight, and high-performance zoom lens having an angle of view of from about 70 degrees to about 120 degrees at a wide angle end, and a magnification ratio of from about 2 to about 5.

In order to attain the object described above, according to one embodiment of the present invention, there are provided a zoom lens and an image pickup apparatus including the zoom lens, including in order from an object side to an image side: a first lens unit having a negative refractive power and being not moved for zooming; a second lens unit including at least one lens sub unit that is moved during zooming as a whole, and having a positive refractive power; a third lens unit including an aperture stop, being not moved for zooming, and having a negative refractive power; a fourth lens unit including at least one lens sub unit, and being moved during zooming; and a fifth lens unit being not moved for zooming, among the lens sub units included in the second lens unit and the lens sub units included in the fourth lens unit, at least three of the lens sub units being moved in an optical axis direction during zooming, in which the following expressions are satisfied:

$$0.6 < f1/f3 < 4.0; \text{ and}$$

$$1.4 < |m2|/|m4| < 50.0,$$

where f1 and f3 respectively represent focal lengths of the first lens unit and the third lens unit, and m2 and m4 respectively represent a movement amount of a lens sub unit that is moved by a largest amount in the second lens unit and a movement amount of a lens sub unit that is moved by a largest amount in the fourth lens unit during zooming from a wide angle end to a telephoto end.

Through appropriate setting of the refractive powers, the lens configurations, the aberration shares, and other such conditions of the respective lens units, there can be obtained the zoom lens having the wide angle of view, the high magnification ratio, the small size, the light weight, and the high optical performance over the entire zoom range.

Further features of the present invention will become apparent from the following description of exemplary embodiments with reference to the attached drawings.

BRIEF DESCRIPTION OF THE DRAWINGS

FIG. 10B is an aberration diagram in the state in which focus is at infinity at an intermediate zoom position according to Numerical Embodiment 5.

FIG. 10C is an aberration diagram in the state in which focus is at infinity at a telephoto end according to Numerical Embodiment 5.

DESCRIPTION OF THE EMBODIMENTS

Now, exemplary embodiments of the present invention are described in detail with reference to the attached drawings. First, features of a zoom lens according to the present invention are described along with conditional expressions.

In order to achieve a wide angle of view, a high magnification ratio, a small size, a light weight, and high optical performance over the entire zoom range, the present invention has a feature of defining a ratio of focal lengths of a first lens unit and a third lens unit, which is configured not to move for zooming, and a ratio of movement amounts of sub units that are configured to move by the largest amount respectively in a second lens unit and a fourth lens unit.

Specifically, the zoom lens according to the present invention includes, in order from an object side: a first lens unit having a negative refractive power, and being configured not to move for zooming; a second lens unit including at least one lens sub unit that is configured to move during zooming, and having a positive refractive power as a whole; a third lens unit including an aperture stop, being configured not to move for zooming, and having a negative refractive power; a fourth lens unit including at least one sub lens unit, and being configured to move during zooming; and a fifth lens unit configured not to move for zooming. Moreover, at least three lens units are configured to move in an optical axis direction during zooming. In other word, among the lens sub units included in the second lens unit and the lens sub units included in the fourth lens unit, at least three of the lens sub units are moved in an optical axis direction during zooming. When focal lengths of the above-mentioned first lens unit and the above-mentioned third lens unit are respectively represented by f1 and f3, and when a movement amount of a lens sub unit that is configured to move by the largest amount in the above-mentioned second lens unit and a movement amount of a lens sub unit that is configured to move by the largest amount in the above-mentioned fourth lens unit during zooming from a wide angle end to a telephoto end are respectively represented by m2 and m4, the zoom lens has a feature that the following conditions are satisfied:

$$0.6 < f1/f3 < 4.0 \quad (1); \text{ and}$$

$$1.4 < |m2|/|m4| < 50.0 \quad (2).$$

Described below are optical actions obtained by configuring, in the present invention, the zoom lens to include the first lens unit having the negative refractive power, and being configured not to move for zooming, the second lens unit having the positive refractive power, and being configured to move during zooming, and the third lens unit having the negative refractive power.

Figure 23A:
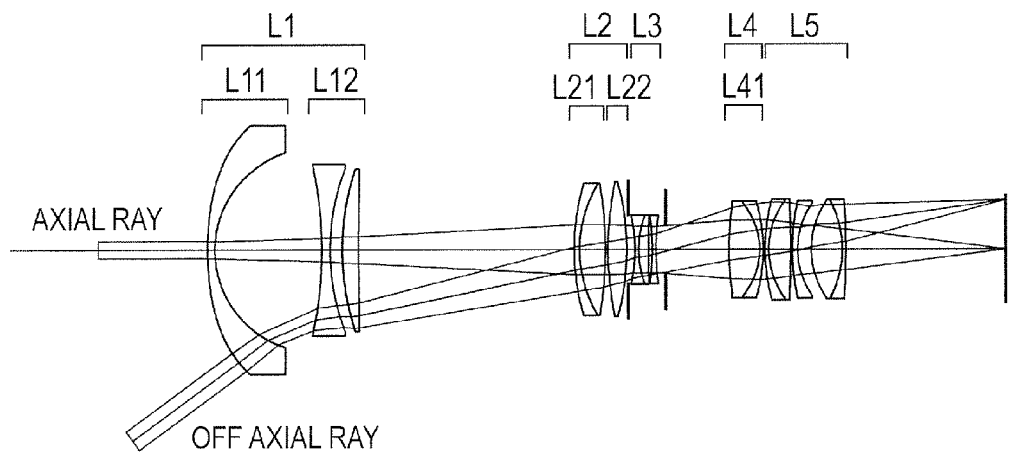
FIG. 23A is an optical path diagram of Numerical Embodiment 1 at the wide angle end.
Figure 23B:
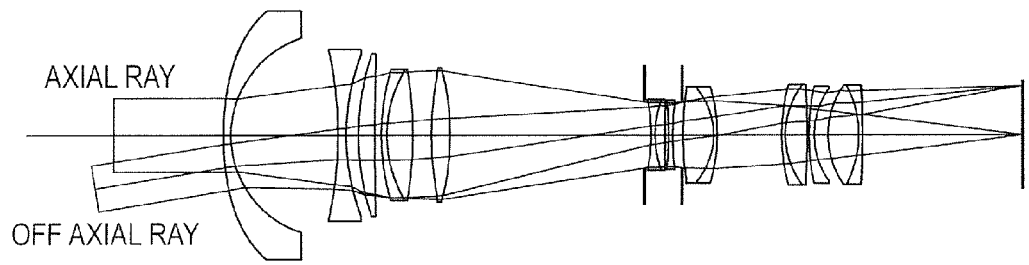
FIG. 23B is an optical path diagram of Numerical Embodiment 1 at the telephoto end.

FIG. 23A and FIG. 23B are respectively optical path diagrams of Embodiment 1 of the present invention at the wide angle end and the telephoto end. A first lens unit L1, a second lens unit L2, a third lens unit L3, a fourth lens unit L4, and a fifth lens unit L5 are illustrated. The second lens unit L2 is divided into two lens sub units: a lens sub unit L21 and a lens sub unit L22. The fourth lens unit includes one lens sub unit: a lens sub unit L41. As can be seen from FIG. 23A and FIG. 23B, in each of Embodiments of the present invention, the first lens unit and the second lens unit are configured to move along loci in which the first lens unit and the second lens unit are away from each other at the wide angle end, and in which the second lens unit is brought closer to the first lens unit at the telephoto end. With the first lens unit, which has the negative refractive power, and the second lens unit, which has the positive refractive power, being arranged away from each other at the wide angle end, an absolute value of a lateral magnification of the second lens unit may be reduced at the wide angle end, and an entrance pupil may be pushed to the object side. Therefore, the structure is advantageous in achieving both the wide angle and reductions in size and weight. Described next are optical actions obtained by configuring the zoom lens to include the third lens unit having the negative refractive power, and being configured not to move for zooming, and the lens sub unit L41, which is configured to move during zooming. Light that has exited the second lens unit enters the third lens unit as convergent light, and a ray that has entered the third lens unit enters the lens sub unit L41 as divergent light. Therefore, an image point of the third lens unit, that is, an object point of the lens sub unit L41 exists on the object side of the lens sub unit L41. The lens sub unit L41 is a lens unit configured to correct a movement of an image plane, which is caused by zooming, and is configured to move for image plane correction from the wide angle end to the telephoto end. Therefore, with the fourth lens unit being configured to correct the movement of the image plane, which is caused by zooming, a magnification increasing action is generated, and hence the high magnification ratio may be achieved effectively. Moreover, with the aperture stop being arranged in the third lens unit, which is configured not to move for zooming, the mechanism of the aperture stop is configured not to move for zooming, and reductions in weight of movable lens units may be achieved. Further, with the three or more lens units being configured to move during zooming, variations in spherical aberration and field curvature are corrected.

Further, the expressions (1) and (2) described above may be satisfied to effectively achieve the wide angle of view, the small size, the light weight, and the high optical performance over the entire zoom range.

The expression (1) defines a relationship between the first lens unit and the third lens unit, which are configured not to move for zooming. The expression (1) is satisfied to effectively achieve the high magnification ratio, the small size, the light weight, and the high optical performance. When the upper limit of the expression (1) is not satisfied, the refractive power of the third lens unit becomes stronger. Therefore, a height of a beam that enters the fourth lens unit becomes higher, and aberration variations accompanying zooming, in particular, a variation in spherical aberration becomes larger, with the result that it becomes difficult to achieve good optical performance over the entire zoom range. When the lower limit of the expression (1) is not satisfied, the refractive power of the third lens unit becomes weaker, and hence the image point of the third lens unit (that is, the object point of the fourth lens unit) moves relatively away toward the object side. Therefore, a movement amount of a lens unit that is configured to perform the image plane correction of the fourth lens unit accompanying zooming becomes larger, and it becomes difficult to reduce the size and weight. It is more preferred to set the expression (1) as follows:

$$0.65 < f1/f3 < 3.65 \quad (1a).$$

Moreover, the expression (2) defines a ratio between a movement amount of a lens sub unit that is configured to move by the largest amount in the second lens unit and a movement amount of a lens sub unit that is configured to move by the largest amount in the fourth lens unit during zooming from the wide angle end to the telephoto end. The expression (2) is satisfied to effectively achieve the high magnification ratio, the small size, the light weight, and the high optical performance. When the upper limit of the expression (2) is not satisfied, the movement amount of the second lens unit becomes much larger, and a distance between the first lens unit and the aperture stop becomes larger. Therefore, the first lens unit is disadvantageously increased in size, and it becomes difficult to achieve both the high magnification ratio and the reductions in size and weight. When the lower limit of the expression (2) is not satisfied, the movement amount of the fourth lens unit becomes much larger, and a distance between the fifth lens unit and the aperture stop becomes larger. Therefore, the fifth lens unit is disadvantageously increased in size, and it becomes difficult to achieve both the high magnification ratio and the reductions in size and weight.

It is more preferred to set the expression (2) as follows:

$$1.55 < |m2|/|m4| < 20.00 \tag{2a}$$

As a further aspect of the zoom lens according to the present invention, a magnification share of the second lens unit, which is a main magnification varying lens unit, is defined. It is preferred that a lateral magnification $\beta 2\_w$ of the second lens unit at the wide angle end when focused at infinity, and a lateral magnification $\beta 2\_t$ of the second lens unit at the telephoto end when focused at infinity satisfy the following conditional expression:

$$1.5 < \beta 2\_t/\beta 2\_w < 4.0 \tag{3}$$

The expression (3) is satisfied so that the second lens unit, which is the main magnification varying lens unit, is configured to make a predetermined contribution or more to magnification varying, resulting in the structure that is advantageous in achieving the wide angle and the high magnification ratio. When the upper limit of the expression (3) is not satisfied, the movement amount of the second lens unit for the zooming becomes much larger, and the distance from the stop becomes much farther toward the object side at the telephoto end. As a result, a beam height of the axial ray that passes through the second lens unit is significantly changed by zooming from the wide angle end to the telephoto end, and hence it becomes difficult to suppress variations in spherical aberration and coma caused by zooming. When the lower limit of the expression (3) is not satisfied, it becomes difficult to achieve the high magnification ratio, and an interval between the first lens unit and the second lens unit becomes shorter at the wide angle end. As a result, it becomes difficult to reduce the lateral magnification of the second lens unit, and hence it becomes difficult to achieve the wide angle. It is more preferred to set the expression (3) as follows:

$$1.7 < \beta 2\_t/\beta 2\_w < 3.0 \tag{3a}$$

As a further aspect of the zoom lens according to the present invention, defined is a relationship between a focal length of the first lens unit, and a focal length of the zoom lens at the wide angle end in a state of being focused at infinity. It is preferred that a focal length f1 of the first lens unit and a focal length fw of the zoom lens at the wide angle end satisfy the following conditional expression:

$$-5.0 < f1/fw < -1.5 \tag{4}$$

The expression (4) may be satisfied to achieve the high optical performance while achieving both the wide angle and the reductions in size and weight. When the upper limit of the expression (4) is not satisfied, the refractive power of the first lens unit becomes stronger, and it becomes difficult to correct the aberration variations accompanying zooming and aberration variations accompanying focusing. When the lower limit condition of the expression (4) is not satisfied, the refractive power of the first lens unit becomes insufficient, and hence it becomes difficult to achieve both the wide angle and the reductions in size and weight. It is more preferred to set the expression (4) as follows:

$$-4.0 < f1/fw < -1.7 \tag{4a}$$

It is further preferred to set the expression (4) as follows:

$$-2.5 < f1/fw < -1.7 \tag{4b}$$

As a further aspect of the zoom lens according to the present invention, the absolute value of the lateral magnification of the second lens unit at the wide angle end is defined. It is preferred that an absolute value $|\beta 2\_w|$ of the lateral magnification of the second lens unit at the wide angle end when focused at infinity satisfy the following conditional expression:

$$|\beta 2\_w| < 1.0 \tag{5}$$

The expression (5) may be satisfied to achieve the wide angle. When the expression (5) is not satisfied, the lateral magnification of the second lens unit becomes much larger at the wide angle end, and the wide angle is not achieved. It is more preferred to set the expression (5) as follows:

$$|\beta 2\_w| < 0.75 \tag{5a}$$

As a further aspect of the zoom lens according to the present invention, it is defined that the third lens unit includes at least two lenses having negative refractive powers. Including the two or more lenses having negative refractive powers may achieve the high optical performance. When the third lens unit is formed of one lens having a negative refractive power, the refractive power of the lens having the negative refractive power becomes much higher, and a large high-order spherical aberration and other such aberrations are generated, with the result that it becomes difficult to correct the aberrations.

As a further aspect of the zoom lens according to the present invention, it is defined that a lens closest to the object side in the first lens unit has a negative refractive power. With the lens closest to the object side in the first lens unit having the negative refractive power, both the wide angle and the reductions in size and weight may be achieved. When the lens closest to the object side in the first lens unit has a positive refractive power, a lens having a large diameter and a high negative refractive power needs to be arranged as a lens on the image side of the lens closest to the object side, and it becomes difficult to achieve both the wide angle and the reductions in size and weight.

As a further aspect of the zoom lens according to the present invention, it is defined that the first lens unit has the structure including a lens sub unit L11 having a negative refractive power, and being configured not to move for focusing, and a lens sub unit L12, which is configured to move during focusing. With the structure in which focusing is performed in the first lens unit, an movement amount for focusing may be made constant irrespective of zooming, resulting in a simplified drive mechanism and the structure that is advantageous in reducing the size of the focus lens unit.

As a further aspect of the zoom lens according to the present invention, a relationship between the lens sub unit L11 and the lens sub unit L12 in the first lens unit is defined. The above-mentioned lens sub unit L12, which is configured to move during focusing, is configured to have a positive refractive power, and it is preferred that a focal length f11 of the lens sub unit L11 and a focal length f12p of the lens sub unit L12 satisfy the following conditional expression:

$$-0.15 < f11/f12p < -0.04 \quad (6).$$

When the upper limit of the expression (6) is not satisfied, the positive refractive power of the lens sub unit L12 becomes weaker, and hence a movement amount for focusing becomes larger, with the result that it becomes difficult to reduce the size and weight. When the lower limit of the expression (6) is not satisfied, the positive refractive power of the lens sub unit L12 becomes stronger, and hence the negative refractive power of the first lens unit as a whole cannot be increased, with the result that it becomes difficult to achieve the wide angle and the reduction in size. It is more preferred to set the expression (6) as follows:

$$-0.12 < f11/f12p < -0.05 \quad (6a).$$

As a further aspect of the zoom lens according to the present invention, a relationship between the lens sub unit L11 and the lens sub unit L12 in the first lens unit is defined. The above-mentioned lens sub unit L12, which is configured to move during focusing, is configured to have a negative refractive power, and it is preferred that the focal length f11 of the lens sub unit L11 and a focal length f12n of the lens sub unit L12 satisfy the following conditional expression:

$$0.3 < f11/f12n < 0.8 \quad (7).$$

When the upper limit of the expression (7) is not satisfied, the negative refractive power of the lens sub unit L12 becomes much stronger, and it becomes difficult to correct a variation in field curvature and other such variations in off-axial aberrations caused by focusing. When the lower limit of the expression (7) is not satisfied, the negative refractive power of the lens sub unit L12 becomes weaker, and hence the movement amount for focusing is increased, and it becomes difficult to reduce the size and weight. It is more preferred to set the expression (7) as follows:

$$0.35 < f11/f12n < 0.75 \quad (7a).$$

As a further aspect of the zoom lens according to the present invention, it is defined that the second lens unit includes at least one cemented lens including one convex lens and one concave lens, and that one of the at least one cemented lens has a predetermined partial dispersion ratio of optical materials.

When an Abbe number and a partial dispersion ratio of the convex lens of the cemented lens including one convex lens and one concave lens are respectively represented by $\nu 2p$ and $\theta 2p$, and an Abbe number and a partial dispersion ratio of the concave lens are respectively represented by $\nu 2n$ and $\theta 2n$, it is preferred that the second lens unit include a cemented lens that satisfies the following conditional expression:

$$-3.00 \times 10^{-3} < (\theta 2p - \theta 2n)/(\nu 2p - \nu 2n) < -1.5 \times 10^{-3} \quad (8).$$

Here, an Abbe number and a partial dispersion ratio of a material of an optical element (lens) used in the present invention are described as follows. When refractive indices for a g-line (435.8 nm), an F-line (486.1 nm), a d-line (587.6 nm), and a C-line (656.3 nm) of Fraunhofer lines are respectively represented by Ng, NF, Nd, and NC, an Abbe number $\nu d$ and a partial dispersion ratio $\theta gF$ with respect to the g-line and the F-line are expressed as follows:

$$\nu d = (Nd-1)/(NF-NC) \quad \text{(i); and}$$

$$\theta gF = (Ng-NF)/(NF-NC) \quad \text{(ii).}$$

Existing optical materials have the partial dispersion ratio $\theta gF$ in a narrow range with respect to the Abbe number $\nu d$. Moreover, the existing optical materials have tendencies that as the Abbe number $\nu d$ becomes smaller, the partial dispersion ratio $\theta gF$ becomes larger, and that as the Abbe number $\nu d$ becomes larger, the refractive index becomes lower. Here, a condition for correcting chromatic aberrations of a thin contact optical system, which respectively includes two lenses 1 and 2 having refractive powers $\phi 1$ and $\phi 2$, and having Abbe numbers $\nu 1$ and $\nu 2$ is respectively expressed as follows:

$$\phi 1/\nu 1 + \phi 2/\nu 2 = E \quad \text{(iii).}$$

Here, a combined refractive power $\phi$ of the lenses 1 and 2 is expressed as follows:

$$\phi = \phi 1 + \phi 2 \quad \text{(iv).}$$

In the expression (iii), when E=0 is satisfied, image forming positions of the C-line and the F-line match in chromatic aberrations. At this time, $\phi 1$ and $\phi 2$ are expressed by the following expressions:

$$\phi 1 = \phi \times \nu 1/(\nu 1 - \nu 2) \quad \text{(v); and}$$

$$\phi 2 = \phi \times \nu 2/(\nu 1 - \nu 2) \quad \text{(vi).}$$

Figure 24:
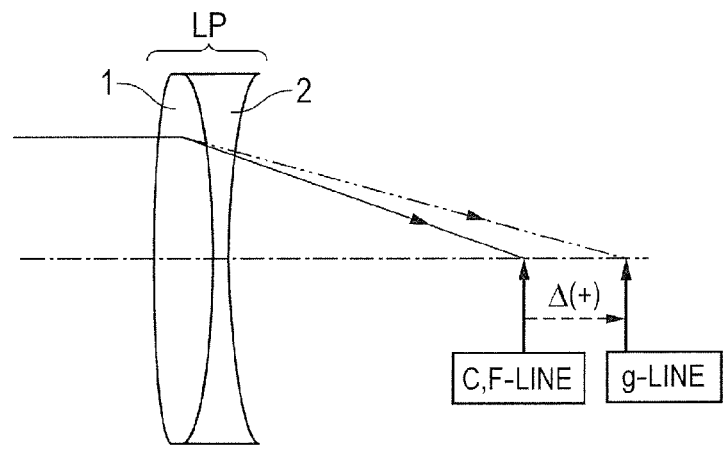
FIG. 24 is a schematic diagram regarding chromatic aberration correction for two colors of an axial chromatic aberration by a positive lens unit, and a residual secondary spectrum.

FIG. 24 is a schematic diagram regarding chromatic aberration correction for two colors of an axial chromatic aberration by a lens unit LP having a positive refractive power, and a residual secondary spectrum. In FIG. 24, a material having a large Abbe number $\nu 1$ and a material having a small Abbe number $\nu 2$ are respectively used for the positive lens 1 and the negative lens 2. Therefore, the positive lens 1 has a small partial dispersion ratio $\theta 1$, and the negative lens 2 has a large partial dispersion ratio $\theta 2$. As a result, when the axial chromatic aberration is corrected for the C-line and the F-line, an image forming point of the g-line is shifted toward the image side. When a shift amount of the axial chromatic aberration of the g-line with respect to the C-line and the F-line when a light flux enters with an object distance being infinity is defined as a secondary spectrum amount $\Delta S$, the secondary spectrum amount $\Delta S$ is expressed as follows:

$$\Delta S = -(1/\phi) \times (\theta 1 - \theta 2)/(\nu 1 - \nu 2) \quad \text{(vii).}$$

In order to satisfactorily correct the secondary spectrum of the axial chromatic aberration at the telephoto end, there is a need to adjust a generation amount in the second lens unit, in which a significant amount of secondary spectrum is generated. The second lens unit has the positive refractive power, and in order to satisfactorily correct the secondary spectrum of the axial chromatic aberration at the telephoto end, there is a need to select such a glass material that reduces the secondary spectrum amount $\Delta S$ generated in the second lens unit.

The condition of the expression (8) is defined to achieve the correction of the axial chromatic aberration at the telephoto end and the high optical performance. When the upper limit condition of the expression (8) is not satisfied, the secondary spectrum of the axial chromatic aberration is advantageously corrected at the telephoto end. However, the refractive index of the convex lens forming the second lens unit becomes lower, and a curvature radius of the convex lens forming the second lens unit becomes smaller. As a result, higher-order aberrations of spherical aberration are increased at the telephoto end, and it becomes difficult to achieve good optical performance. To the contrary, when the lower limit condition of the expression (8) is not satisfied, the secondary spectrum of the axial chromatic aberration is increased at the telephoto end, and it becomes difficult to satisfactorily correct the chromatic aberrations at the telephoto end. It is more preferred to set the expression (8) as follows:

$$-2.80\times10^{-3}<(\theta 2p-\theta 2n)/(v2p-v2n)<-1.60\times10^{-3} \quad (8a).$$

As a further aspect of the zoom lens according to the present invention, it is defined that the second lens unit or the fourth lens unit includes a lens having at least one aspherical surface. As can be seen from FIG. 23A and FIG. 23B, a ray of a lens unit that is configured to move during zooming undergoes a change in height of an axial ray and a change in height of an off-axial ray accompanying zooming from the wide angle end to the telephoto end. Therefore, arrangement of the lens having the aspherical surface in the second lens unit or the fourth lens unit may effectively suppress variations in spherical aberration, coma, and field curvature caused by zooming.

As a further aspect of the zoom lens according to the present invention, a ratio between the focal length of the first lens unit L1 and a focal length of the lens sub unit L21 is defined. It is preferred that the focal length f1 of the first lens unit L1 and a focal length f21 of the lens sub unit L21 satisfy the following conditional expression:

$$-0.60<f1/f21<-0.15 \quad (9).$$

The expression (9) is satisfied to achieve both the wide angle of the zoom lens and the correction of the aberration variations. A focal length of the zoom lens takes a value obtained by multiplying the focal length of the first lens unit L1 by a lateral magnification of lens units on the image side of the first lens unit L1, and hence in order to achieve the wide angle, there is a need to appropriately set the focal length of the first lens unit L1. When the upper limit condition of the expression (9) is not satisfied, the refractive power of the first lens unit L1 becomes stronger, and it becomes difficult to correct the aberration variations accompanying zooming and the aberration variations accompanying focusing. When the lower limit condition of the expression (9) is not satisfied, the refractive power of the first lens unit L1 becomes insufficient, and hence it becomes difficult to achieve both the wide angle and the reductions in size and weight. It is more preferred to set the expression (9) as follows:

$$-0.55<f1/f21<-0.20 \quad (9a).$$

As a further aspect of the zoom lens according to the present invention, a relationship between focal lengths of the first lens unit L1 and the fourth lens unit L4 is defined. It is preferred that the focal length f1 of the first lens unit L1 and a focal length f4 of the fourth lens unit L4 satisfy the following conditional expression:

$$-1.00<f1/f4<-0.15 \quad (10).$$

The expression (10) may be satisfied to achieve both the satisfactory correction of aberrations and the reduction in size. When the upper limit of the expression (10) is not satisfied, the refractive power of the fourth lens unit L4 becomes relatively weaker, and a movement amount for zooming becomes larger, with the result that it becomes difficult to reduce the size and weight. When the lower limit of the expression (10) is not satisfied, the refractive power of the fourth lens unit L4 becomes relatively stronger, and it becomes difficult to suppress variations in spherical aberration and coma caused by zooming. It is more preferred to set the expression (10) as follows:

$$-0.90<f1/f4<-0.20 \quad (10a).$$

As a further aspect of the zoom lens according to the present invention, a relationship between focal lengths of the lens sub unit L21 and the lens sub unit L22 is defined. It is preferred that the focal length f21 of the lens sub unit L21 and a focal length f22 of the lens sub unit L22 satisfy the following conditional expression:

$$0.80<f21/f22<1.80 \quad (11).$$

The expression (11) may be satisfied to satisfactorily correct variations in spherical aberration, coma, and field curvature caused by zooming. When the upper limit of the expression (11) is not satisfied, the refractive power of the lens sub unit L21 becomes relatively weaker, and a height of a beam that enters the lens sub unit L22 becomes higher, with the result that it becomes difficult to suppress the variation in spherical aberration caused by zooming. When the lower limit of the expression (11) is not satisfied, the refractive power of the lens sub unit L22 becomes relatively weaker, and the effect of correcting the variations in spherical aberration and coma by changing an interval between the lens sub unit L21 and the lens sub unit L22 is reduced, with the result that it becomes difficult to suppress the aberration variations caused by zooming. It is more preferred to set the expression (11) as follows:

$$0.90<f21/f22<1.65 \quad (11a).$$

Further, an image pickup apparatus according to the present invention has a feature in including the zoom lens according to each of Embodiments and a solid-state image pickup element having a predetermined effective image pickup range, which is configured to receive light of an image formed by the zoom lens.

Now, a specific configuration of the zoom lens according to the present invention is described by way of features of lens configurations of Numerical Embodiments 1 to 11 corresponding to Embodiments 1 to 11, respectively.

Embodiment 1

Figure 1:
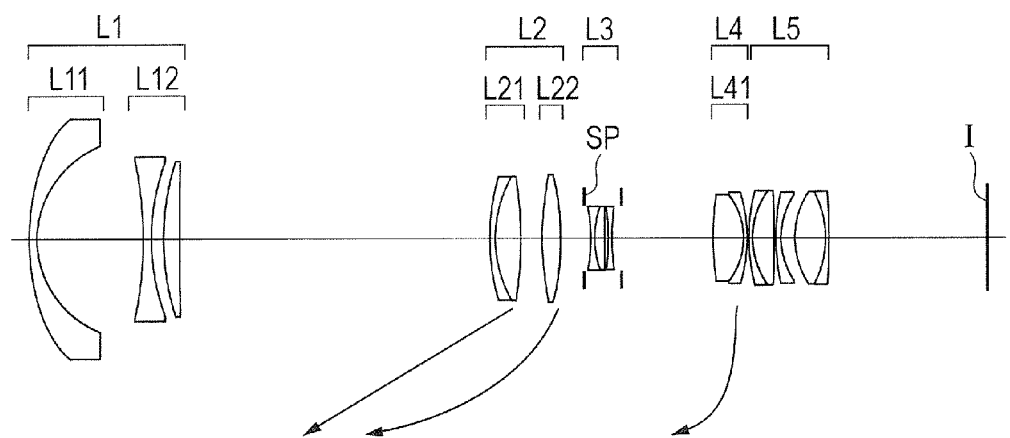
FIG. 1 is a lens cross-sectional view in a state in which focus is at infinity at a wide angle end according to Embodiment 1 (Numerical Embodiment 1) of the present invention.
Figure 2A:
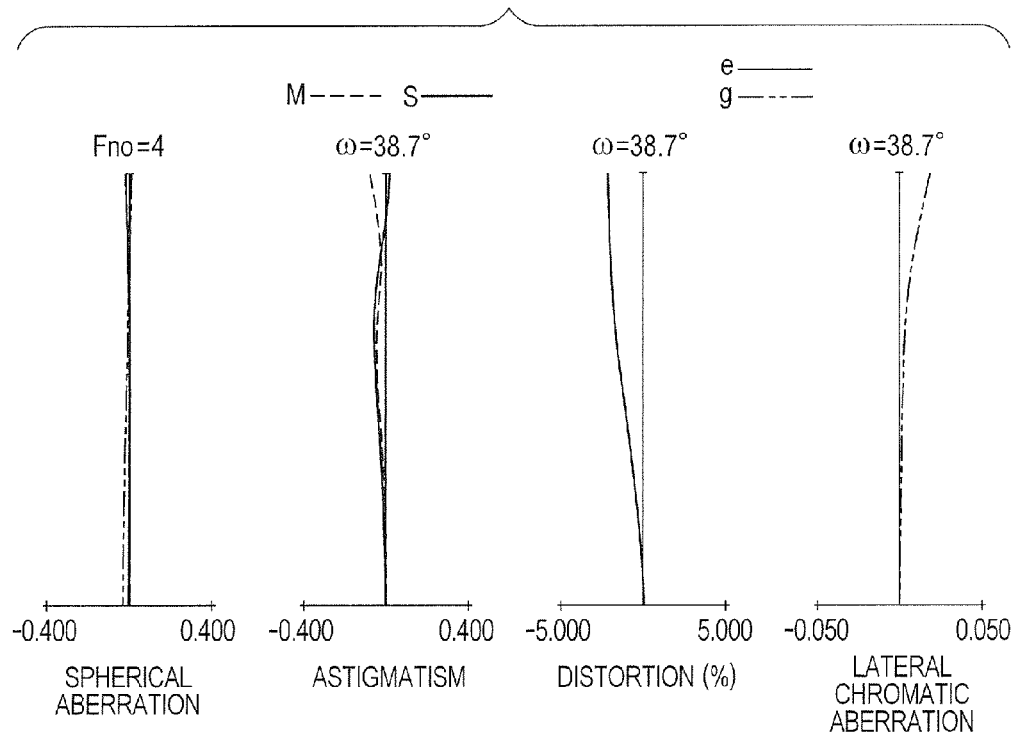
FIG. 2A is an aberration diagram in the state in which focus is at infinity at the wide angle end according to Numerical Embodiment 1.
Figure 2B:
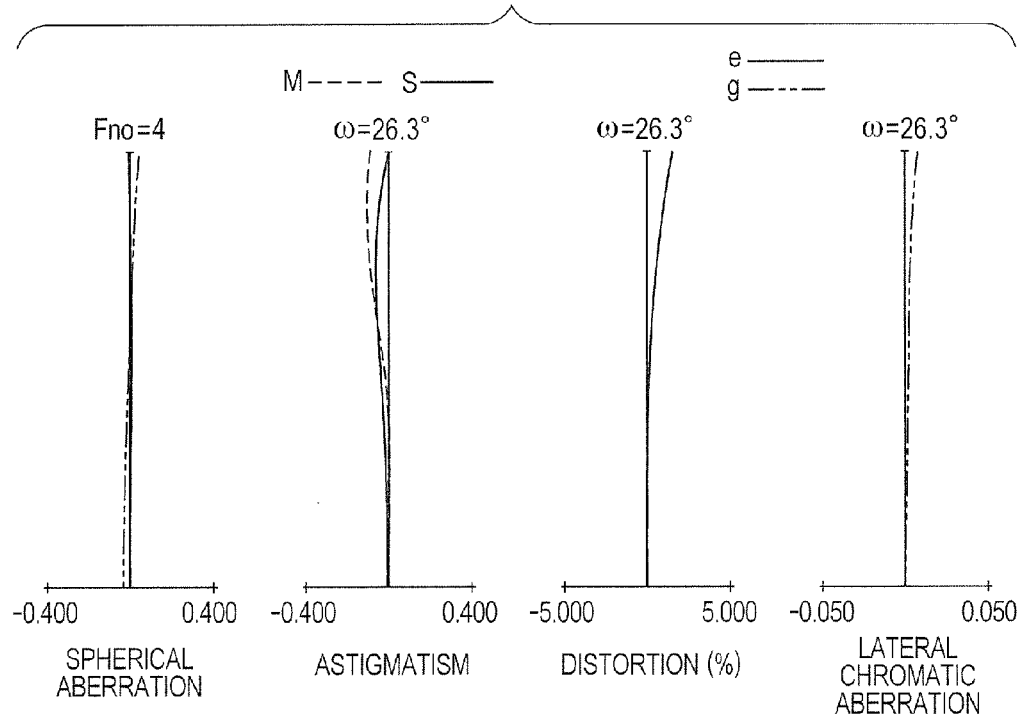
FIG. 2B is an aberration diagram in the state in which focus is at infinity at an intermediate zoom position according to Numerical Embodiment 1.
Figure 2C:
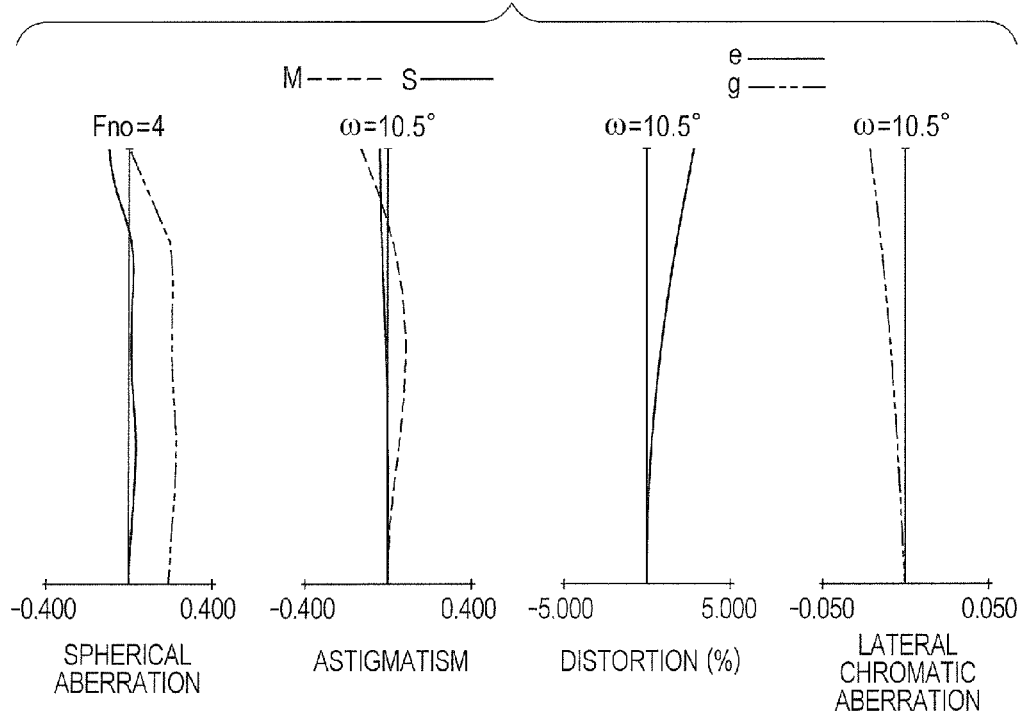
FIG. 2C is an aberration diagram in the state in which focus is at infinity at a telephoto end according to Numerical Embodiment 1.

FIG. 1 is a lens cross-sectional view when the focus is at the infinity at the wide angle end in the zoom lens according to Embodiment 1 (Numerical Embodiment 1) of the present invention. FIG. 2A, FIG. 2B, and FIG. 2C are respectively longitudinal aberration diagrams at the wide angle end, a focal length of 30 mm, and the telephoto end. Each of the aberration diagrams is the longitudinal aberration diagram when the focus is at the infinity. In addition, the value of the focal length is a value when corresponding value in Numerical Embodiment 1 to be described later is represented in units of mm. This also applies to Numerical Embodiments described below.

In FIG. 1, the zoom lens includes, in order from the object side to the image side, a first lens unit L1 for focusing, which has a negative refractive power. The zoom lens further includes a lens sub unit L21, which is one lens sub unit of the second lens unit L2 for magnification varying, which is configured to move toward the object side during zooming from the wide angle end to the telephoto end, and has a positive refractive power. The zoom lens further includes a lens sub unit L22, which is another lens sub unit of the second lens unit L2 for magnification varying, which is configured to move toward the object side during zooming from the wide angle end to the telephoto end, and has a positive refractive power. The lens sub unit L21 and the lens sub unit L22 are configured to move along loci that are different from each other during zooming. The zoom lens further includes a third lens unit L3 having a negative refractive power, and being configured not to move for zooming. The zoom lens further includes a lens sub unit L41 of the fourth lens unit L4 having a positive refractive power, and being configured to move on the optical axis in conjunction with the movement of the second lens unit to correct an image plane variation accompanying zooming. The zoom lens further includes a fifth lens unit L5 having a positive refractive power, being configured not to move for zooming, and having an image forming action. An aperture stop is denoted by SP. When used as an image pickup optical system for a broadcasting television camera, a video camera, or a digital still camera, an image plane I corresponds to an image pickup surface of a solid-state image pickup element (photoelectric converter) or the like configured to receive light of an image formed by the zoom lens and to convert light to electricity. When used as an image pickup optical system for a film camera, the image plane I corresponds to a film surface on which the image formed by the zoom lens is exposed.

In each of the longitudinal aberration diagrams, spherical aberrations are respectively illustrated with respect to an e-line and the g-line by a solid line and a two-dot chain line. Further, astigmatisms are illustrated on a meridional image plane by a broken line and on a sagittal image plane by a solid line. In addition, lateral chromatic aberrations are illustrated with respect to the g-line by a two-dot chain line. A half angle of view is denoted by ω and an F-number is denoted by Fno. In each of the longitudinal aberration diagrams, a spherical aberration is illustrated in the unit of 0.4 mm, an astigmatism in the unit of 0.4 mm, a distortion in the unit of 5%, and a lateral chromatic aberration in the unit of 0.05 mm. In each Embodiment described below, each of the wide angle end and the telephoto end refers to a zooming position obtained when the lens unit for magnification varying is positioned at each of the ends of a range in which the lens unit may mechanically move along the optical axis.

Next, the first lens unit L1 in this Embodiment is described. The first lens unit L1 corresponds to the first surface to the sixth surface. The first lens unit L1 includes a lens sub unit L11 having a negative refractive power, and being configured not to move for focusing, and a lens sub unit L12 having a positive refractive power, and being configured to move toward the object side during focusing from an infinity side to a proximity side. The lens sub unit L11 includes a concave meniscus lens that is convex toward the object side. Moreover, the first surface has an aspherical shape to mainly correct distortion and field curvature on the wide angle side. The lens sub unit L12 includes, in order from the object side to the image side, a biconcave lens and a biconvex lens. The lens sub unit L21, which is one lens sub unit of the second lens unit L2, corresponds to the seventh surface to the ninth surface, and includes a cemented lens formed of a concave meniscus lens having a convex surface on the object side and a biconvex lens. The lens sub unit L22, which is another lens sub unit of the second lens unit L2, corresponds to the tenth surface and the eleventh surface, and includes a biconvex lens. Moreover, the tenth surface and the eleventh surface have aspherical shapes to mainly correct variations in spherical aberration and field curvature accompanying zooming. The third lens unit L3 corresponds to the twelfth surface to the eighteenth surface, and includes the aperture stop, a cemented lens formed of a biconcave lens and a convex meniscus lens having a convex surface on the object side, a biconcave lens, and an auxiliary stop. The auxiliary stop as the eighteenth surface is configured to change its aperture diameter depending on zooming to keep the maximum F-number at each zoom position constant. The lens sub unit L41 corresponds to the nineteenth surface to the twenty-first surface, and includes a cemented lens formed of a biconvex lens and a concave meniscus lens having a convex surface on the image side. The fifth lens unit L5 corresponds to the twenty-second surface to the twenty-ninth surface, and includes a cemented lens formed of a concave meniscus lens having a convex surface on the object side and a biconvex lens, a concave meniscus lens having a convex surface on the object side, and a cemented lens formed of a biconvex lens and a concave meniscus lens having a convex surface on the image side.

Numerical Embodiment 1, which corresponds to Embodiment 1 described above, is described. In all Numerical Embodiments without limiting to Numerical Embodiment 1, the order of a surface (optical surface) from the object side is represented by i, a curvature radius of the i-th surface from the object side is represented by ri, and an interval between the i-th surface and the (i+1)th surface from the object side (on the optical axis) is represented by di. Moreover, a refractive index, an Abbe number, and a partial dispersion ratio of a medium (optical member) between the i-th surface and the (i+1)th surface are respectively represented by ndi, vdi, and θgFi, and an air-equivalent back focus is represented by BF. When an X axis is set in the optical axis direction, an H axis is set in a direction perpendicular to the optical axis, a direction of travel of light is defined as positive, a paraxial curvature radius is represented by R, a conic constant is represented by k, and aspherical coefficients are represented by A4, A6, A8, A10, and A12, the aspherical shape is expressed by the expression below. Moreover, "e-Z" means "$\times 10^{-z}$".

$$X = \frac{H^2/R}{1+\sqrt{1-(1+k)(H/R)^2}} + A4H^4 + A6H^6 + A8H^8 + A10H^{10} + A12H^{12}$$

Values corresponding to respective conditional expressions of this Embodiment are shown in Table 1. This Embodiment satisfies the expressions (1) to (5) and the expressions (7) to (11) to achieve a photographing angle of view (angle of view) of 77.4 degrees at the wide angle end. In addition, the zoom lens having the high optical performance, in which various aberrations are satisfactorily corrected over the entire zoom range, is realized. It is essential that the zoom lens according to the present invention satisfy the expressions (1) and (2), but the zoom lens does not always need to satisfy the expressions (3) to (11). However, when at least one of the expressions (3) to (11) is satisfied, even better effects may be provided. This is also true for the other Embodiments.

Figure 25:
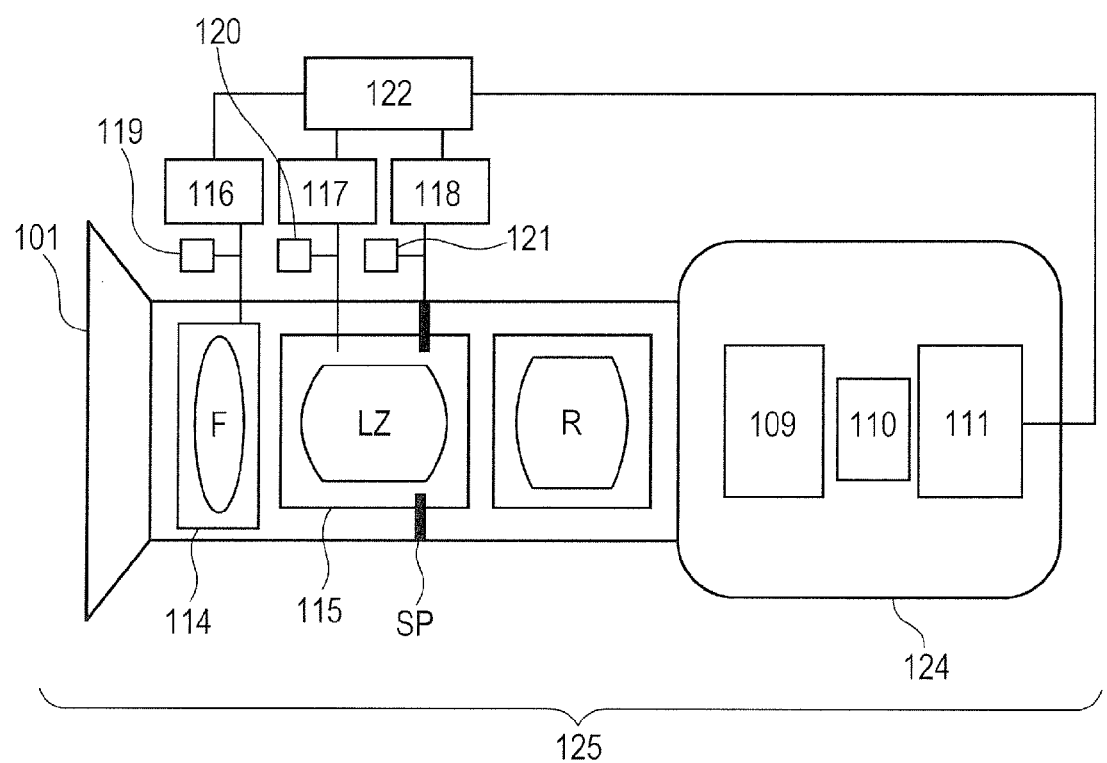
FIG. 25 is a schematic diagram for illustrating a main part of an image pickup apparatus according to the present invention.

FIG. 25 is a schematic diagram of an image pickup apparatus (television camera system) using the zoom lens according to each of Embodiments as a photographing optical system. In FIG. 25, the zoom lens according to any one of Embodiments 1 to 11, which is denoted by 101, and a camera 124 are illustrated. The zoom lens 101 is configured to be detachably attachable to the camera 124. An image pickup apparatus 125 is formed by attaching the zoom lens 101 to the camera 124. The zoom lens 101 includes a first lens unit F, a magnification varying portion LZ, and a fifth lens unit R for image formation. The first lens unit F includes a lens unit for focusing. The magnification varying portion LZ includes a second lens unit, which is configured to move on the optical axis for zooming, a third lens unit, which is configured not to move for zooming, and a fourth lens unit, which is configured to move on the optical axis for zooming. An aperture stop is denoted by SP. Drive mechanisms 114 and 115, such as helicoids or cams, are respectively configured to drive the first lens unit F and the magnification varying portion LZ in the optical axis direction. Motors (drive units) 116 to 118 are respectively configured to electrically drive the drive mechanisms 114 and 115 and the aperture stop SP. Detectors 119 to 121, such as encoders, potentiometers, or photosensors, are respectively configured to detect positions of the first lens unit F and the magnification varying portion LZ on the optical axis, and an aperture diameter of the aperture stop SP. In the camera 124, a glass block 109 corresponds to an optical filter or a color separation optical system in the camera 124, and a solid-state image pickup element (photoelectric converter) 110, such as a charge-coupled device (CCD) sensor or a complementary metal oxide semiconductor (CMOS) sensor, is configured to receive light of a subject image formed by the zoom lens 101. Moreover, central processing units (CPUs) 111 and 122 are respectively configured to control various kinds of driving of the camera 124 and the zoom lens 101.

As described above, the zoom lens according to the present invention is applied to a television camera or a cinema camera to realize an image pickup apparatus having high optical performance.

Embodiment 2

Figure 3:
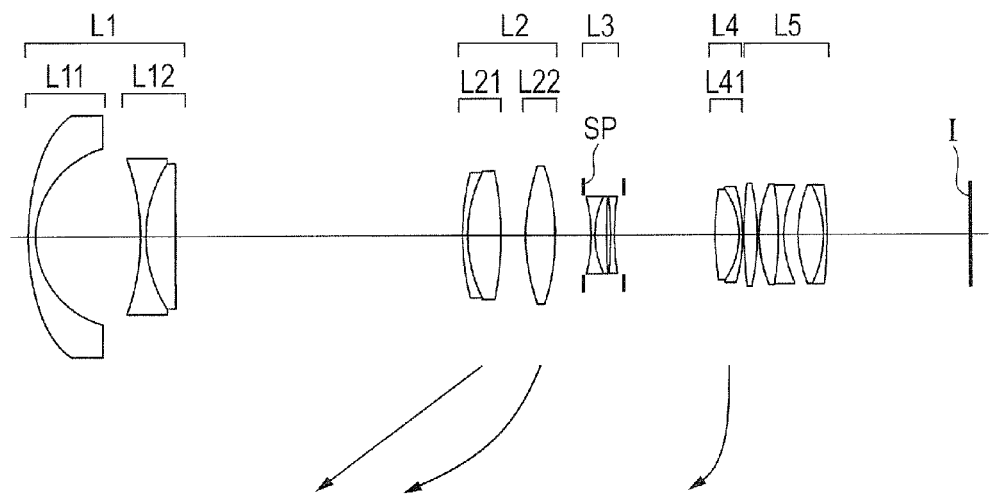
FIG. 3 is a lens cross-sectional view in the state in which focus is at infinity at a wide angle end according to Embodiment 2 (Numerical Embodiment 2) of the present invention.
Figure 4A:
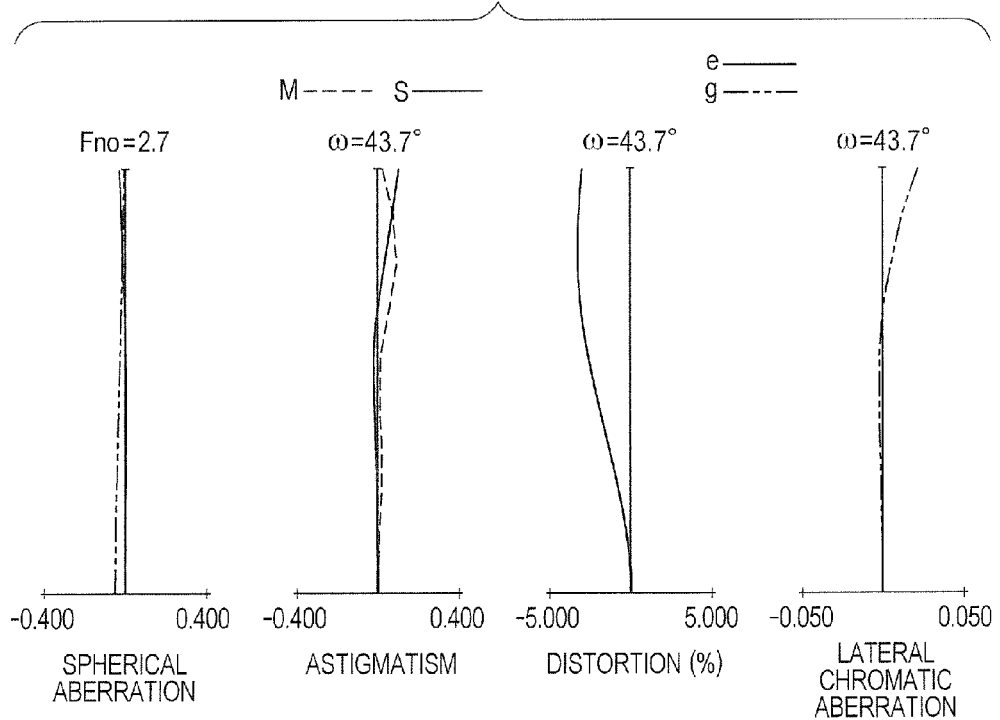
FIG. 4A is an aberration diagram in the state in which focus is at infinity at the wide angle end according to Numerical Embodiment 2.
Figure 4B:
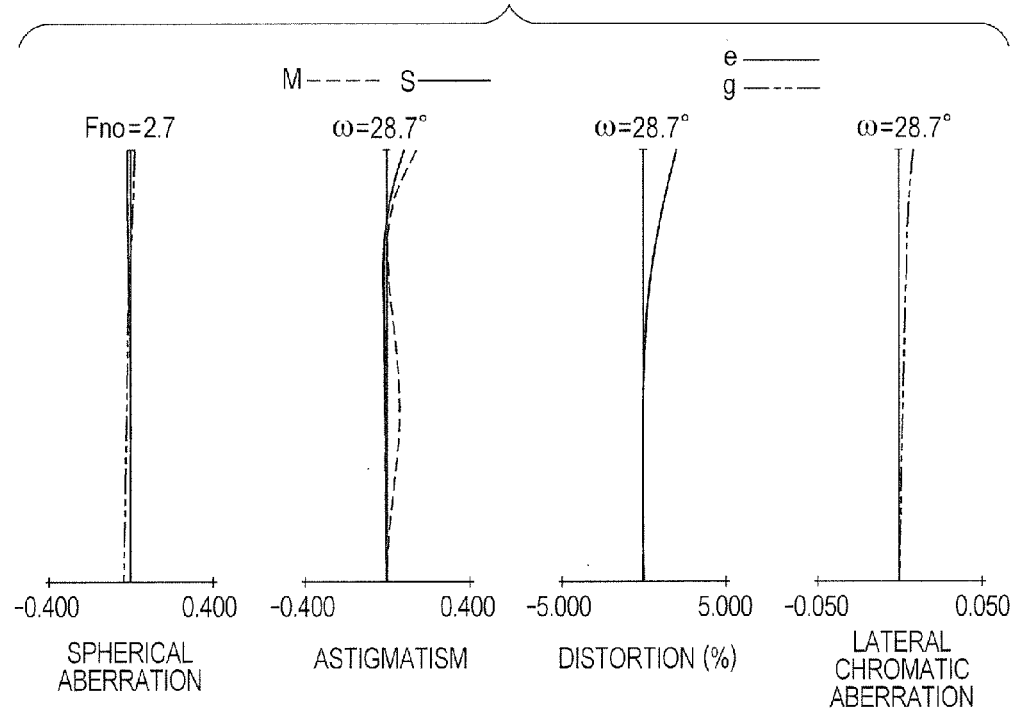
FIG. 4B is an aberration diagram in the state in which focus is at infinity at an intermediate zoom position according to Numerical Embodiment 2.
Figure 4C:
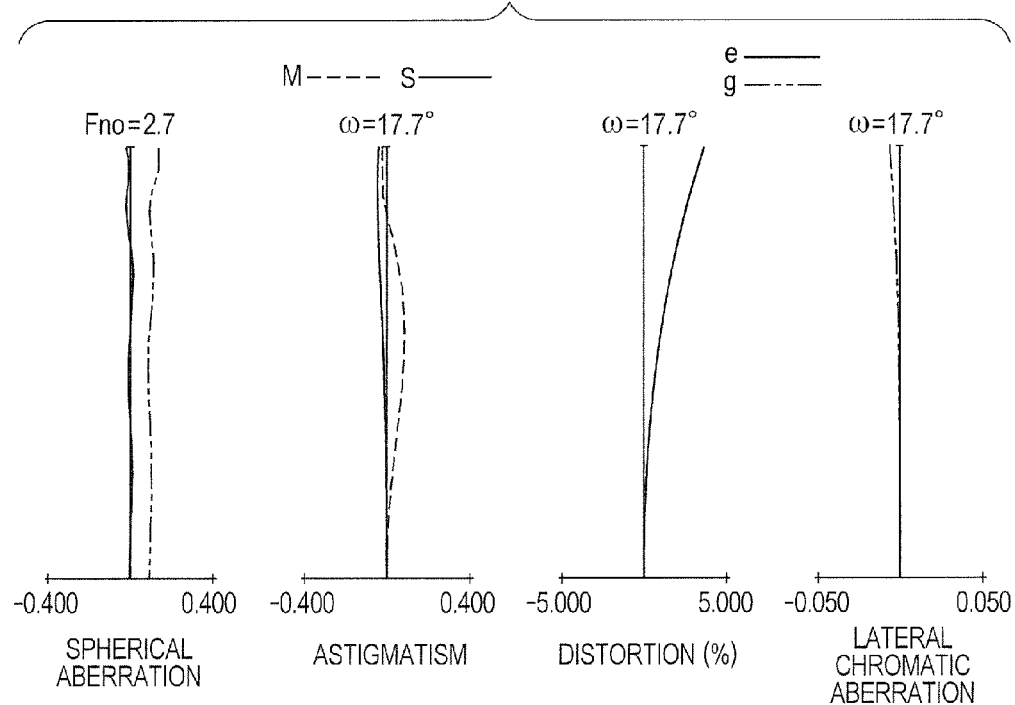
FIG. 4C is an aberration diagram in the state in which focus is at infinity at a telephoto end according to Numerical Embodiment 2.

FIG. 3 is a lens cross-sectional view when the focus is at the infinity at the wide angle end in the zoom lens according to Embodiment 2 (Numerical Embodiment 2) of the present invention. FIG. 4A, FIG. 4B, and FIG. 4C are respectively longitudinal aberration diagrams at the wide angle end, a focal length of 27 mm, and the telephoto end. Each of the aberration diagrams is the longitudinal aberration diagram when the focus is at the infinity. In FIG. 3, the zoom lens includes, in order from the object side to the image side, a first lens unit L1 for focusing, which has a negative refractive power. The zoom lens further includes a lens sub unit L21 for magnification varying, which is configured to move toward the object side during zooming from the wide angle end to the telephoto end, and has a positive refractive power. The zoom lens further includes a lens sub unit L22 for magnification varying, which is configured to move toward the object side during zooming from the wide angle end to the telephoto end, and has a positive refractive power. The lens sub unit L21 and the lens sub unit L22 are configured to move along loci that are different from each other during zooming. The zoom lens further includes a third lens unit L3 having a negative refractive power, and being configured not to move for zooming. The zoom lens further includes a lens sub unit L41 having a positive refractive power, and being configured to move nonlinearly on the optical axis in conjunction with the movements of the second lens unit and the third lens unit to correct an image plane variation accompanying zooming. The zoom lens further includes a fifth lens unit L5 having a positive refractive power, being configured not to move for zooming, and having an image forming action.

Next, the first lens unit L1 in this Embodiment is described. The first lens unit L1 corresponds to the first surface to the fifth surface. The first lens unit L1 includes a lens sub unit (L11) having a negative refractive power, and being configured not to move for focusing, and a lens sub unit (L12) having a negative refractive power, and being configured to move toward the object side during focusing from an infinity side to a proximity side. The lens sub unit L11 includes a concave meniscus lens that is convex toward the object side. Moreover, the first surface has an aspherical shape to mainly correct distortion and field curvature on the wide angle side. The lens sub unit L12 includes, in order from the object side to the image side, a cemented lens formed of a biconcave lens and a convex meniscus lens having a convex surface on the object side. The lens sub unit L21, which is one lens sub unit of the second lens unit L2, corresponds to the sixth surface to the eighth surface, and includes a cemented lens formed of a concave meniscus lens having a convex surface on the object side and a biconvex lens. The lens sub unit L22, which is another lens sub unit of the second lens unit L2, corresponds to the ninth surface and the tenth surface, and includes a biconvex lens. Moreover, the ninth surface and the tenth surface have aspherical shapes to mainly correct variations in spherical aberration and field curvature accompanying zooming. The third lens unit L3 corresponds to the eleventh surface to the seventeenth surface, and includes the aperture stop, a cemented lens formed of a biconcave lens and a convex meniscus lens having a convex surface on the object side, a biconcave lens, and an auxiliary stop. The lens sub unit L41 corresponds to the eighteenth surface to the twelfth surface, and includes a cemented lens formed of a biconvex lens and a concave meniscus lens having a convex surface on the image side. The fifth lens unit L5 corresponds to the twenty-first surface to the twenty-eighth surface, and includes a biconvex lens, a cemented lens formed of a biconvex lens and a biconcave lens, and a cemented lens formed of a biconvex lens and a concave meniscus lens having a concave surface on the object side.

Values corresponding to respective conditional expressions of this Embodiment are shown in Table 1. This Embodiment satisfies the expressions (1) to (5) and the expressions (7) to (11) to achieve a wide angle of view with a photographing angle of view (angle of view) of 87.4 degrees at the wide angle end. In addition, the zoom lens having the high optical performance, in which various aberrations are satisfactorily corrected over the entire zoom range, is realized.

Embodiment 3

Figure 5:
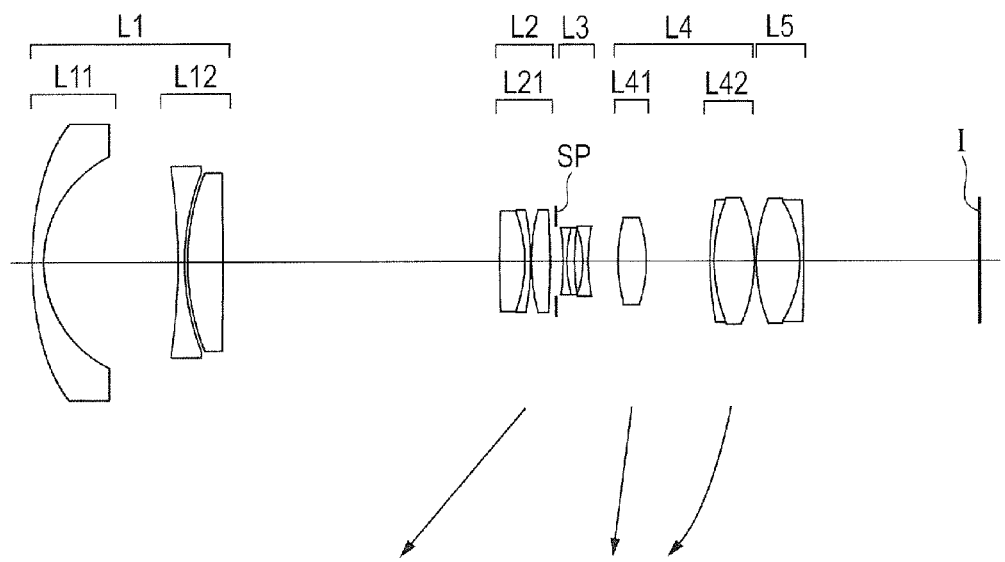
FIG. 5 is a lens cross-sectional view in the state in which focus is at infinity at a wide angle end according to Embodiment 3 (Numerical Embodiment 3) of the present invention.
Figure 6A:
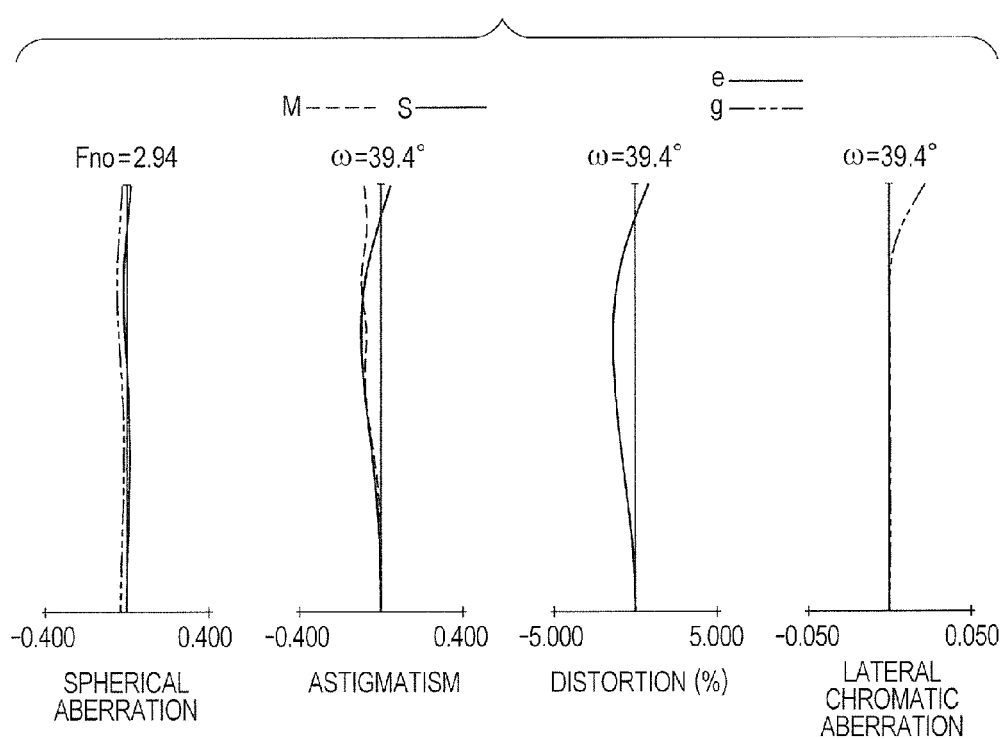
FIG. 6A is an aberration diagram in the state in which focus is at infinity at the wide angle end according to Numerical Embodiment 3.
Figure 6B:
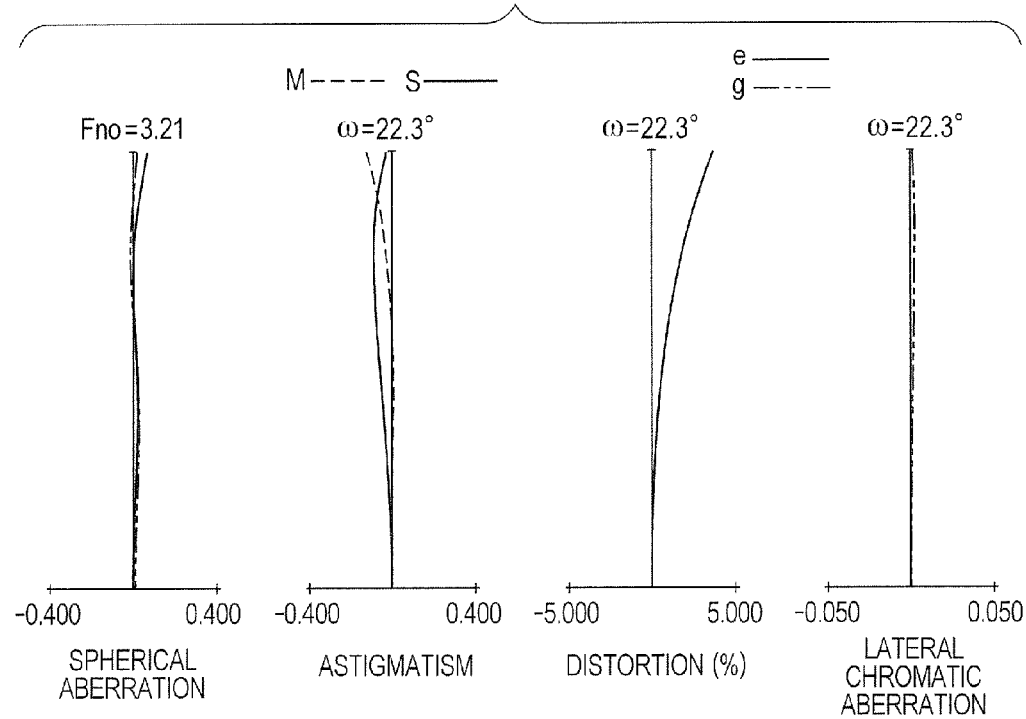
FIG. 6B is an aberration diagram in the state in which focus is at infinity at an intermediate zoom position according to Numerical Embodiment 3.
Figure 6C:
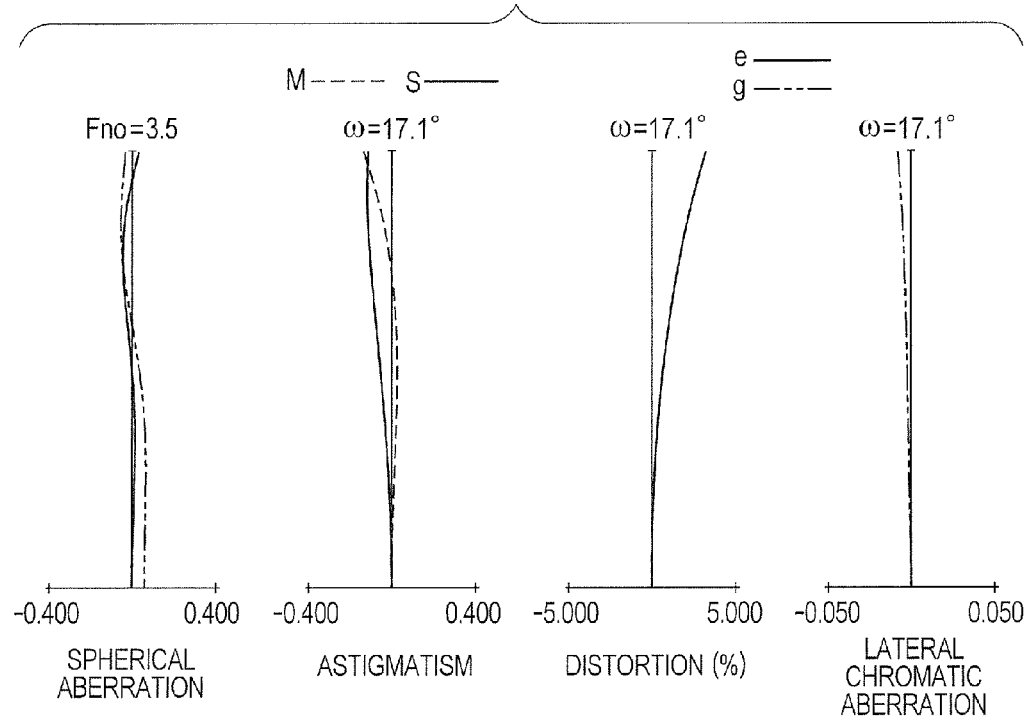
FIG. 6C is an aberration diagram in the state in which focus is at infinity at a telephoto end according to Numerical Embodiment 3.

FIG. 5 is a lens cross-sectional view when the focus is at the infinity at the wide angle end in the zoom lens according to Embodiment 3 (Numerical Embodiment 3) of the present invention. FIG. 6A, FIG. 6B, and FIG. 6C are respectively longitudinal aberration diagrams at the wide angle end, a focal length of 36 mm, and the telephoto end. Each of the aberration diagrams is the longitudinal aberration diagram when the focus is at the infinity. In FIG. 5, the zoom lens includes, in order from the object side to the image side, a first lens unit L1 for focusing, which has a negative refractive power. The zoom lens further includes a lens sub unit L21 for magnification varying, which is configured to move toward the object side during zooming from the wide angle end to the telephoto end, and has a positive refractive power. In this Embodiment, the second lens unit is formed of the lens sub unit L21. The zoom lens further includes a third lens unit L3 having a negative refractive power, and being configured not to move for zooming. The zoom lens further includes a lens sub unit L41 for magnification varying, which is configured to move during zooming from the wide angle end to the telephoto end, and has a positive refractive power. The zoom lens further includes a lens sub unit L42 for magnification varying, which is configured to move during zooming from the wide angle end to the telephoto end, and has a positive refractive power. The zoom lens further includes a fifth lens unit L5 having a positive refractive power, being configured not to move for zooming, and having an image forming action.

Next, the first lens unit L1 in this Embodiment is described. The first lens unit L1 corresponds to the first surface to the sixth surface. The first lens unit L1 includes a lens sub unit (L11) having a negative refractive power, and being configured not to move for focusing, and a lens sub unit (L12) having a negative refractive power, and being configured to move toward the object side during focusing from an infinity side to a proximity side. The lens sub unit L11 includes a concave meniscus lens having a convex surface on the object side. Moreover, the first surface has an aspherical shape to mainly correct distortion and field curvature on the wide angle side. The lens sub unit L12 includes, in order from the object side to the image side, a biconcave lens and a biconvex lens. The lens sub unit L21 corresponds to the seventh surface to the eleventh surface, and includes a cemented lens formed of a biconvex lens and a concave meniscus lens having a concave surface on the object side, and a biconvex lens. The third lens unit L3 corresponds to the twelfth surface to the seventeenth surface, and includes an aperture stop, a cemented lens formed of a biconcave lens and a convex meniscus lens having a convex surface on the object side, and a biconcave lens. The lens sub unit L41 corresponds to the eighteenth surface and the nineteenth surface, and includes a biconvex lens. Moreover, the eighteenth surface has an aspherical shape to mainly correct variations in spherical aberration and field curvature accompanying zooming. The lens sub unit L42 corresponds to the twentieth surface to the twenty-second surface, and includes a cemented lens formed of a concave meniscus lens having a convex surface on the object side and a biconvex lens. The fifth lens unit L5 corresponds to the twenty-third surface to the twenty-fifth surface, and includes a cemented lens formed of a biconvex lens and a concave meniscus lens having a concave surface on the object side.

Values corresponding to respective conditional expressions of this Embodiment are shown in Table 1. This Embodiment satisfies the expressions (1) to (5) and the expressions (7) and (8) to achieve a wide angle of view with a photographing angle of view (angle of view) of 78.8 degrees at the wide angle end. In addition, the zoom lens having the high optical performance, in which various aberrations are satisfactorily corrected over the entire zoom range, is realized.

Embodiment 4

Figure 7:
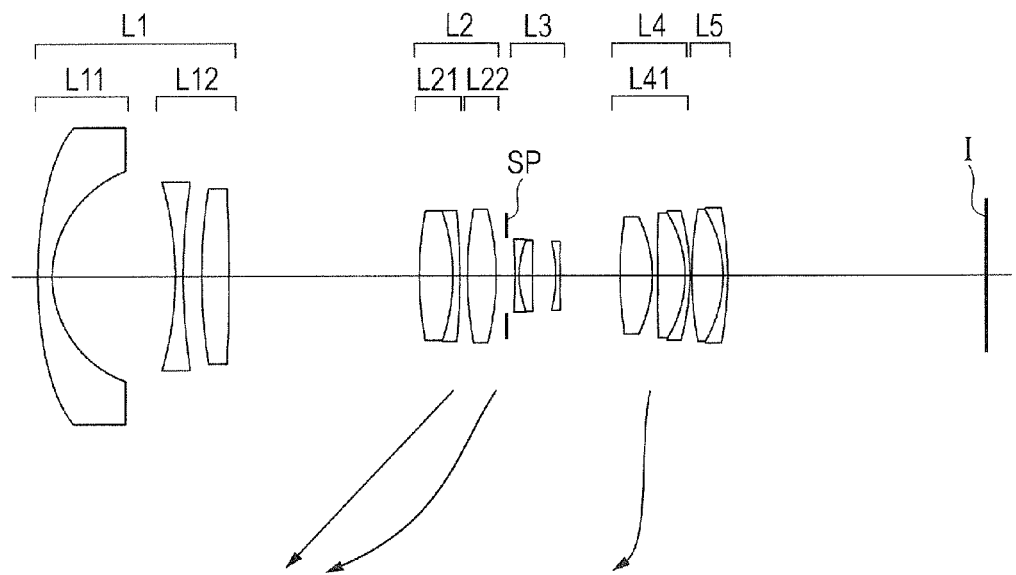
FIG. 7 is a lens cross-sectional view in the state in which focus is at infinity at a wide angle end according to Embodiment 4 (Numerical Embodiment 4) of the present invention.
Figure 8A:
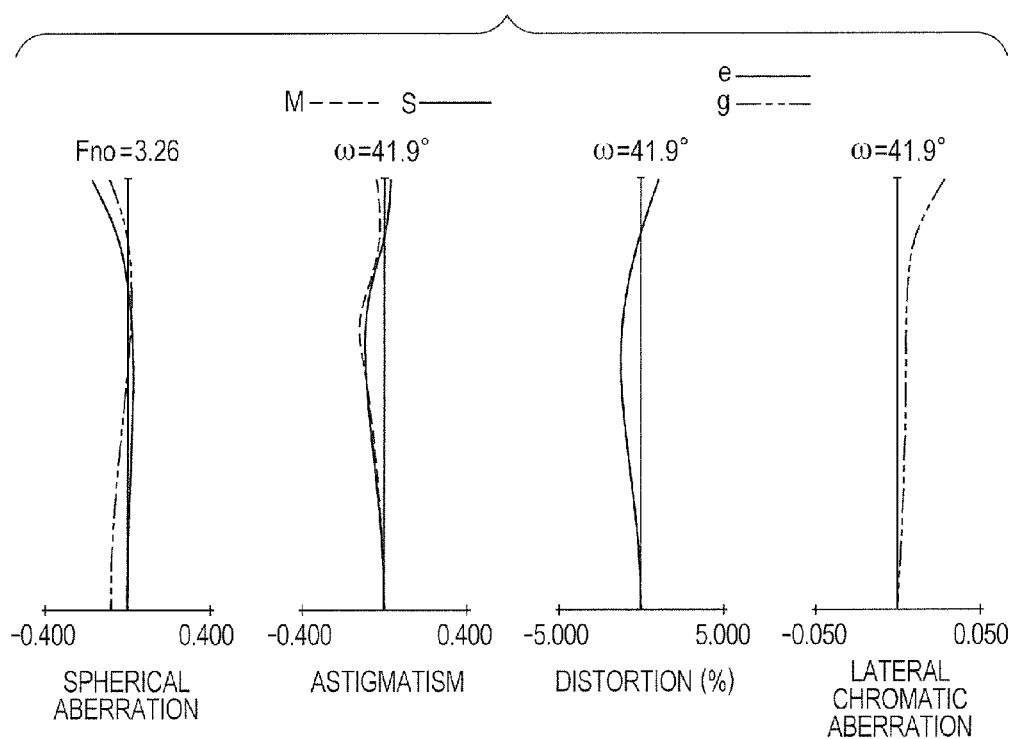
FIG. 8A is an aberration diagram in the state in which focus is at infinity at the wide angle end according to Numerical Embodiment 4.
Figure 8B:
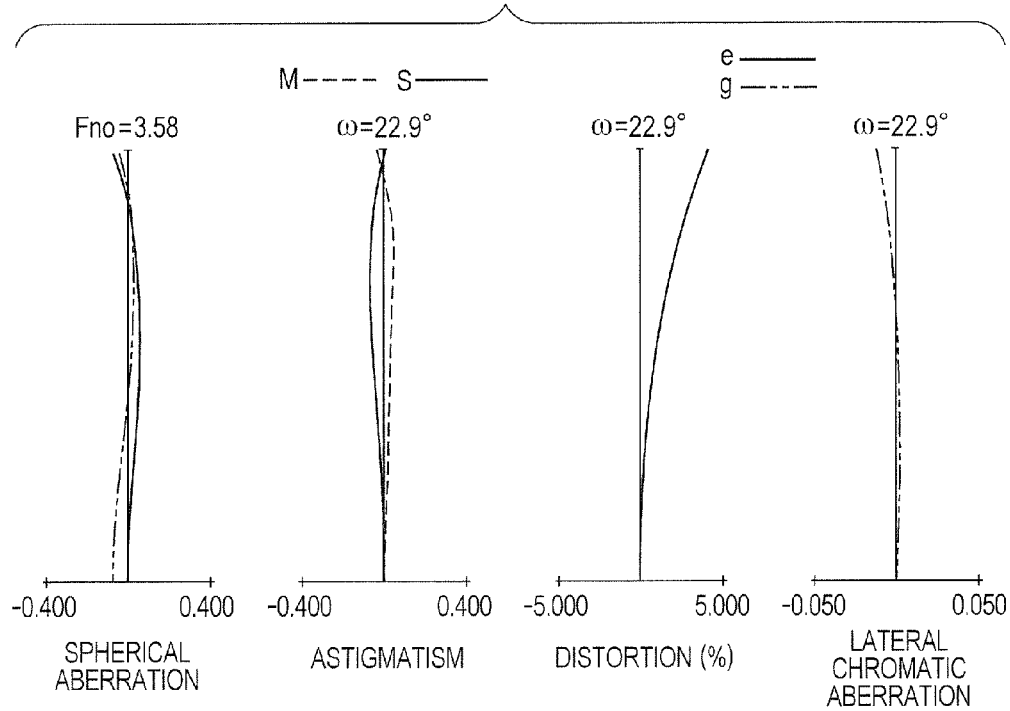
FIG. 8B is an aberration diagram in the state in which focus is at infinity at an intermediate zoom position according to Numerical Embodiment 4.
Figure 8C:
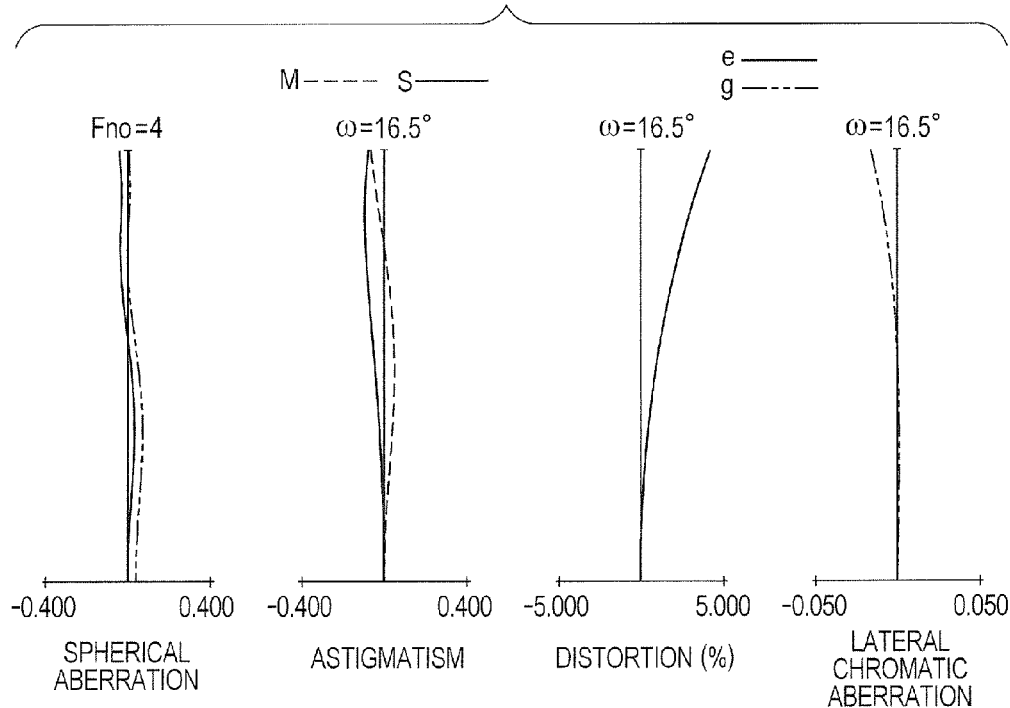
FIG. 8C is an aberration diagram in the state in which focus is at infinity at a telephoto end according to Numerical Embodiment 4.

FIG. 7 is a lens cross-sectional view when the focus is at the infinity at the wide angle end in the zoom lens according to Embodiment 4 (Numerical Embodiment 4) of the present invention. FIG. 8A, FIG. 8B, and FIG. 8C are respectively longitudinal aberration diagrams at the wide angle end, a focal length of 35 mm, and the telephoto end. Each of the aberration diagrams is the longitudinal aberration diagram when the focus is at the infinity. In FIG. 7, the zoom lens includes, in order from the object side to the image side, a first lens unit L1 for focusing, which has a negative refractive power. The zoom lens further includes a lens sub unit L21 for magnification varying, which is configured to move toward the object side during zooming from the wide angle end to the telephoto end, and has a positive refractive power. The zoom lens further includes a lens sub unit L22 for magnification varying, which is configured to move toward the object side during zooming from the wide angle end to the telephoto end, and has a positive refractive power. The lens sub unit L21 and the lens sub unit L22 are configured to move along loci that are different from each other during zooming. The zoom lens further includes a third lens unit L3 having a negative refractive power, and being configured not to move for zooming. The zoom lens further includes a lens sub unit L41 having a positive refractive power, and being configured to move nonlinearly on the optical axis in conjunction with the movement of the second lens unit and the third lens unit to correct an image plane variation accompanying zooming. The zoom lens further includes a fifth lens unit L5 having a positive refractive power, being configured not to move for zooming, and having an image forming action.

Next, the first lens unit L1 in this Embodiment is described. The first lens unit L1 corresponds to the first surface to the sixth surface. The first lens unit L1 includes a lens sub unit (L11) having a negative refractive power, and being configured not to move for focusing, and a lens sub unit (L12) having a negative refractive power, and being configured to move toward the object side during focusing from an infinity side to a proximity side. The lens sub unit L11 includes a concave meniscus lens having a convex surface on the object side. Moreover, the first surface has an aspherical shape to mainly correct distortion and field curvature on the wide angle side. The lens sub unit L12 includes, in order from the object side to the image side, a biconcave lens and a biconvex lens. The lens sub unit L21, which is one lens sub unit of the second lens unit L2, corresponds to the seventh surface to the ninth surface, and includes a cemented lens formed of a biconvex lens and a concave meniscus lens having a convex surface on the image side. The lens sub unit L22, which is another lens sub unit of the second lens unit L2, corresponds to the tenth surface and the eleventh surface, and includes a biconvex lens. Moreover, the tenth surface has an aspherical shape to mainly correct variations in spherical aberration and field curvature accompanying zooming. The third lens unit L3 corresponds to the twelfth surface to the seventeenth surface, and includes an aperture stop, a cemented lens formed of a biconcave lens and a convex meniscus lens having a convex surface on the object side, and a biconcave lens. The lens sub unit L41 corresponds to the eighteenth surface and the nineteenth surface, and includes a biconvex lens. Moreover, the eighteenth surface has an aspherical shape to mainly correct a variation in spherical aberration accompanying zooming. The fifth lens unit L5 corresponds to the twentieth surface to the twenty-fifth surface, and includes a cemented lens formed of a biconvex lens and a concave meniscus lens having a convex surface on the image side, and a cemented lens formed of a biconvex lens and a concave meniscus lens having a convex surface on the image side.

Values corresponding to respective conditional expressions of this Embodiment are shown in Table 1. This Embodiment satisfies the expressions (1) to (5) and the expressions (7) to (11) to achieve a wide angle of view with a photographing angle of view (angle of view) of 83.8 degrees at the wide angle end. In addition, the zoom lens having the high optical performance, in which various aberrations are satisfactorily corrected over the entire zoom range, is realized.

Embodiment 5

Figure 9:
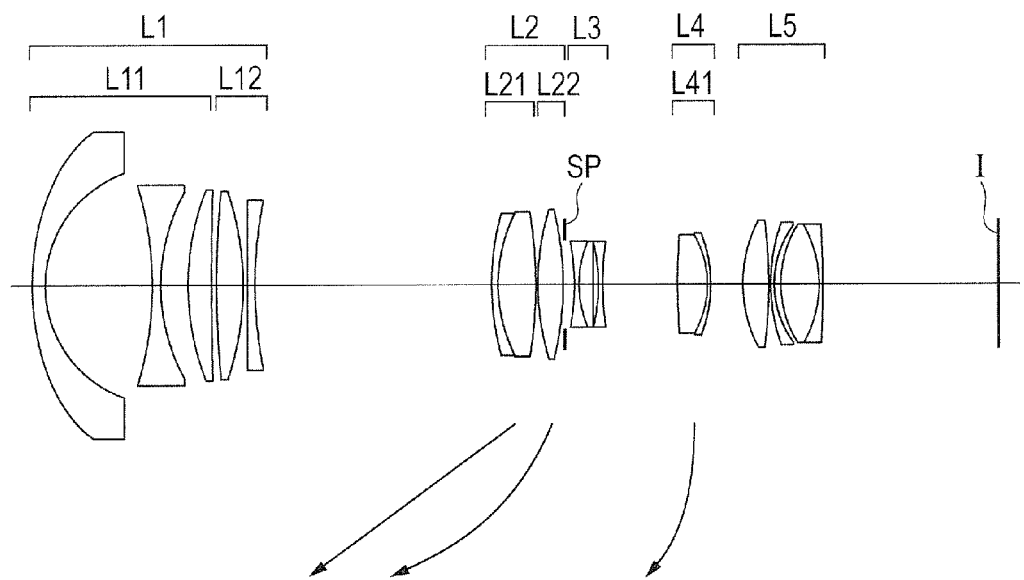
FIG. 9 is a lens cross-sectional view in the state in which focus is at infinity at a wide angle end according to Embodiment 5 (Numerical Embodiment 5) of the present invention.
Figure 10A:
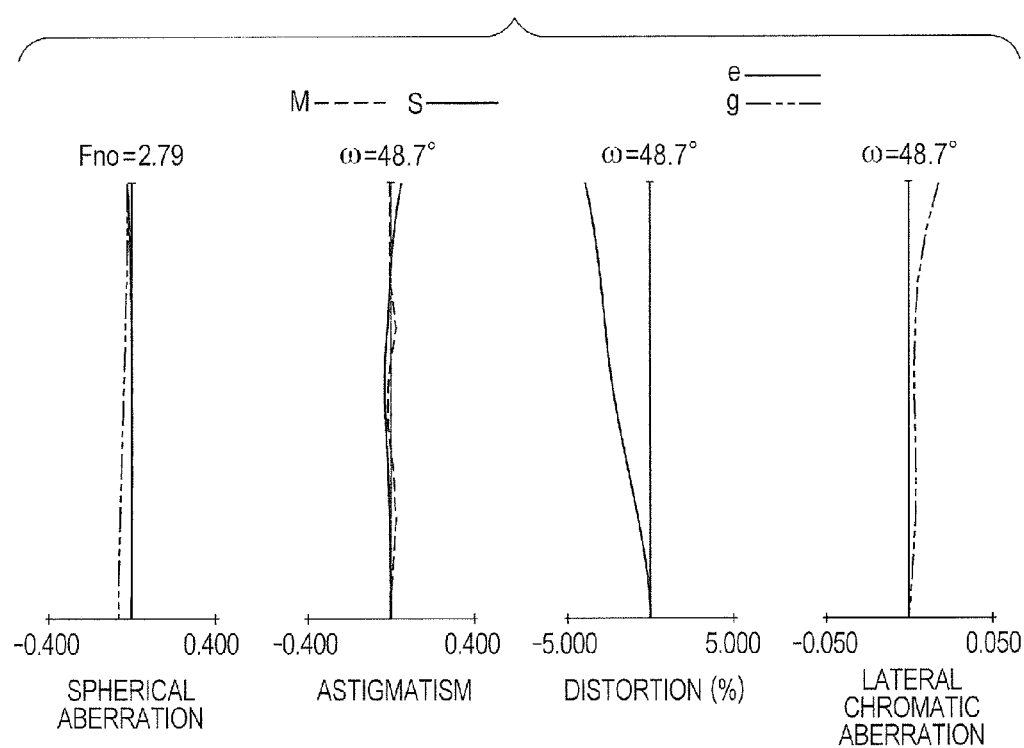
FIG. 10A is an aberration diagram in the state in which focus is at infinity at the wide angle end according to Numerical Embodiment 5.

FIG. 9 is a lens cross-sectional view when the focus is at the infinity at the wide angle end in the zoom lens according to Embodiment 5 (Numerical Embodiment 5) of the present invention. FIG. 10A, FIG. 10B, and FIG. 10C are respectively longitudinal aberration diagrams at the wide angle end, a focal length of 25 mm, and the telephoto end. Each of the aberration diagrams is the longitudinal aberration diagram when the focus is at the infinity. In FIG. 9, the zoom lens includes, in order from the object side to the image side: a first lens unit L1 for focusing, which has a negative refractive power. The zoom lens further includes a lens sub unit L21 for magnification varying, which is configured to move toward the object side during zooming from the wide angle end to the telephoto end, and has a positive refractive power. The zoom lens further includes a lens sub unit L22 for magnification varying, which is configured to move toward the object side during zooming from the wide angle end to the telephoto end, and has a positive refractive power. The lens sub unit L21 and the lens sub unit L22 are configured to move along loci that are different from each other during zooming. The zoom lens further includes a third lens unit L3 having a negative refractive power, and being configured not to move for zooming. The zoom lens further includes a lens sub unit L41 having a positive refractive power, and being configured to move nonlinearly on the optical axis in conjunction with the movements of the second lens unit and the third lens unit to correct an image plane variation accompanying zooming. The zoom lens further includes a fifth lens unit L5 having a positive refractive power, being configured not to move for zooming, and having an image forming action.

Next, the first lens unit L1 in this Embodiment is described. The first lens unit L1 corresponds to the first surface to the tenth surface. The first lens unit L1 includes a lens sub unit (L11) having a negative refractive power, and being configured not to move for focusing, and a lens sub unit (L12) having a positive refractive power, and being configured to move toward the object side during focusing from an infinity side to a proximity side. The lens sub unit L11 includes a concave meniscus lens having a convex surface on the object side, a biconcave lens, and a convex meniscus lens having a convex surface on the object side. Moreover, the first surface has an aspherical shape to mainly correct distortion and field curvature on the wide angle side. The lens sub unit L12 includes, in order from the object side to the image side, a biconvex lens and a biconcave lens. The lens sub unit L21, which is one lens sub unit of the second lens unit L2, corresponds to the eleventh surface to the thirteenth surface, and includes a cemented lens formed of a concave meniscus lens having a convex surface on the object side and a biconvex lens. The lens sub unit L22, which is another lens sub unit of the second lens unit L2, corresponds to the fourteenth surface and the fifteenth surface, and includes a biconvex lens. Moreover, the fourteenth surface and the fifteenth surface have aspherical shapes to mainly correct variations in spherical aberration, coma, and field curvature accompanying zooming. The third lens unit L3 corresponds to the sixteenth surface to the twenty-first surface, and includes an aperture stop, a cemented lens formed of a biconcave lens and a convex meniscus lens having a convex surface on the object side. The lens sub unit L41 corresponds to the twenty-second surface to the twenty-fourth surface, and includes a cemented lens formed of a biconvex lens and a concave meniscus lens having a convex surface on the image side. The fifth lens unit L5 corresponds to the twenty-fifth surface to the thirty-first surface, and includes a biconvex lens, a concave meniscus lens having a convex surface on the object side, and a cemented lens formed of a biconvex lens and a concave meniscus lens having a convex surface on the image side.

Values corresponding to respective conditional expressions of this Embodiment are shown in Table 1. This Embodiment satisfies the expressions (1) to (6) and the expressions (8) to (11) to achieve a wide angle of view with a photographing angle of view (angle of view) of 97.4 degrees at the wide angle end. In addition, the zoom lens having the high optical performance, in which various aberrations are satisfactorily corrected over the entire zoom range, is realized.

Embodiment 6

Figure 11:
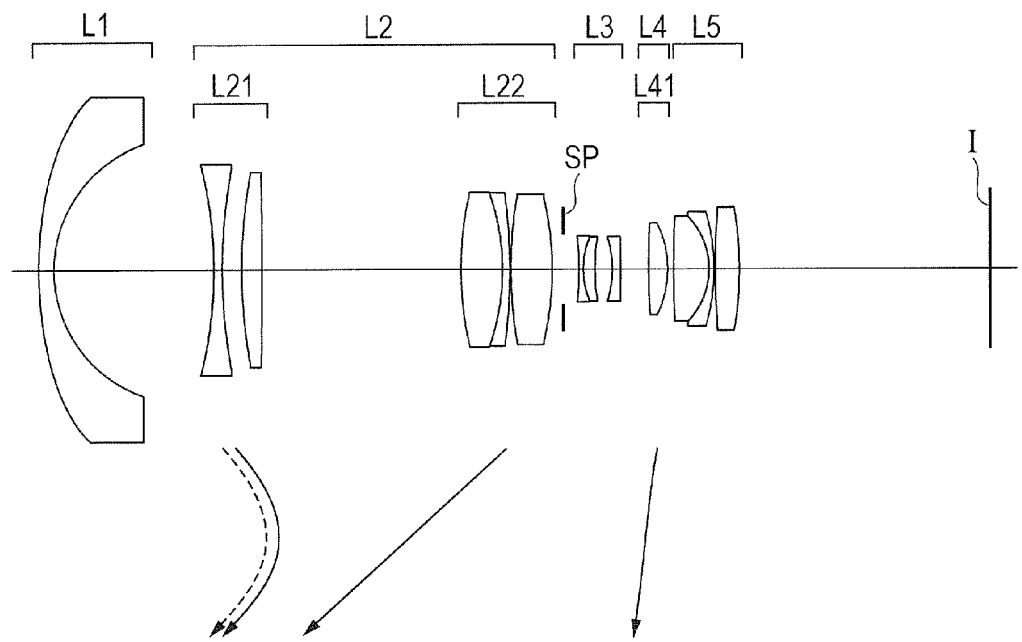
FIG. 11 is a lens cross-sectional view in the state in which focus is at infinity at a wide angle end according to Embodiment 6 (Numerical Embodiment 6) of the present invention.
Figure 12A:
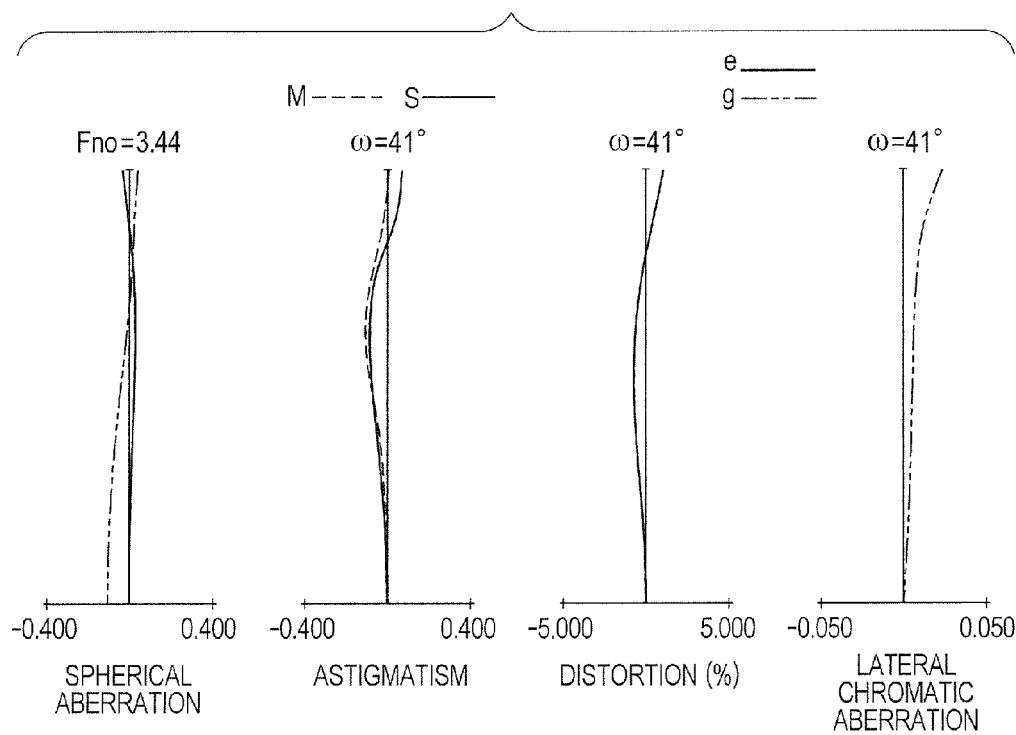
FIG. 12A is an aberration diagram in the state in which focus is at infinity at the wide angle end according to Numerical Embodiment 6.
Figure 12B:
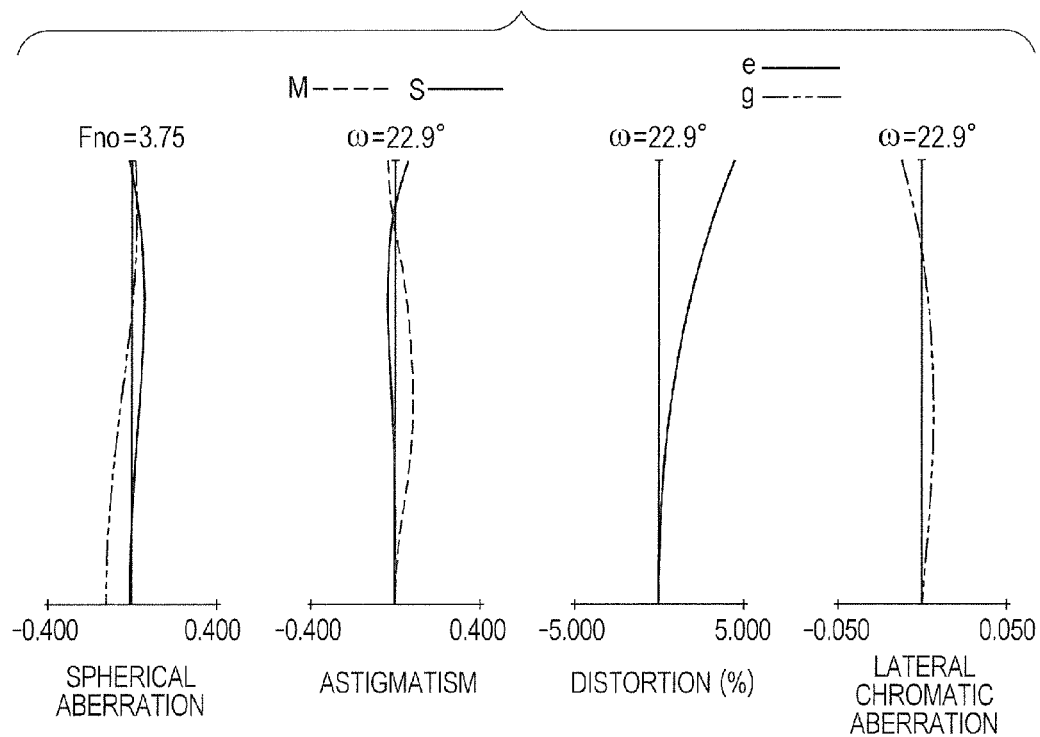
FIG. 12B is an aberration diagram in the state in which focus is at infinity at an intermediate zoom position according to Numerical Embodiment 6.
Figure 12C:
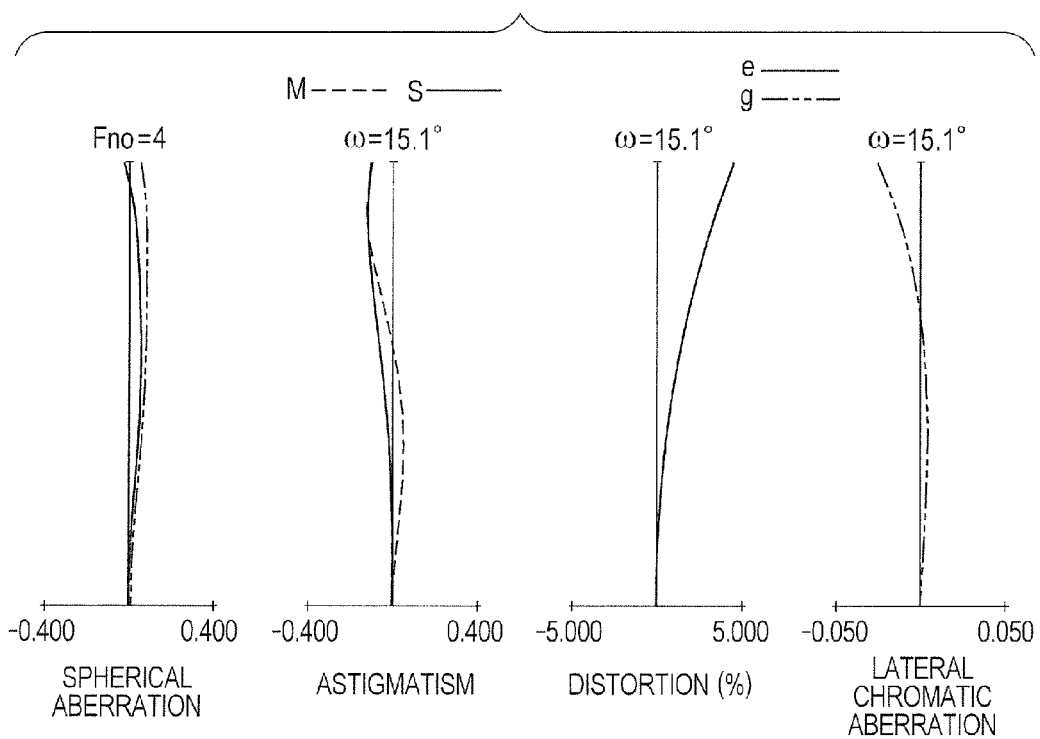
FIG. 12C is an aberration diagram in the state in which focus is at infinity at a telephoto end according to Numerical Embodiment 6.

FIG. 11 is a lens cross-sectional view when the focus is at the infinity at the wide angle end in the zoom lens according to Embodiment 6 (Numerical Embodiment 6) of the present invention. FIG. 12A, FIG. 12B, and FIG. 12C are respectively longitudinal aberration diagrams at the wide angle end, a focal length of 35 mm, and the telephoto end. Each of the aberration diagrams is the longitudinal aberration diagram when the focus is at the infinity. In FIG. 11, the zoom lens includes, in order from the object side to the image side, a first lens unit L1 for focusing, which has a negative refractive power. The zoom lens further includes a lens sub unit L21 for magnification varying, which is configured to move during zooming from the wide angle end to the telephoto end, and has a negative refractive power. The zoom lens further includes a lens sub unit L22 for magnification varying, which is configured to move during zooming from the wide angle end to the telephoto end, and has a positive refractive power. The lens sub unit L21 and the lens sub unit L22 are configured to move along loci that are different from each other during zooming. The zoom lens further includes a third lens unit L3 having a negative refractive power, and being configured not to move for zooming. The zoom lens further includes a lens sub unit L41 having a positive refractive power, and being configured to move nonlinearly on the optical axis in conjunction with the movements of the second lens unit and the third lens unit to correct the image plane variation accompanying zooming. The zoom lens further includes a fifth lens unit L5 having a positive refractive power, being configured not to move for zooming, and having an image forming action.

Next, the first lens unit L1 in this Embodiment is described. The first lens unit L1 corresponds to the first surface and the second surface. The first lens unit L1 includes a first lens unit having a negative refractive power, and being configured not to move for focusing. Moreover, the first surface has an aspherical shape to mainly correct distortion and field curvature on the wide angle side. The lens sub unit L21, which is one lens sub unit of the second lens unit L2, corresponds to the third surface to the sixth surface, and includes, in order from the object side to the image side, a biconcave lens and a biconvex lens. The entire lens sub unit is configured to move toward the object side during focusing from the infinity side to the proximity side.

The lens sub unit L22, which is another lens sub unit of the second lens unit L2, corresponds to the seventh surface to the eleventh surface, and includes a cemented lens formed of a biconvex lens and a concave meniscus lens having a convex surface on the image side, and a biconvex lens. Moreover, the tenth surface has an aspherical shape to mainly correct variations in spherical aberration and field curvature accompanying zooming. The third lens unit L3 corresponds to the twelfth surface to the seventeenth surface, and includes an aperture stop, a cemented lens formed of a biconcave lens and a convex meniscus lens having a convex surface on the object side, and a concave meniscus lens having a convex surface on the image side. The lens sub unit L41 corresponds to the eighteenth surface and the nineteenth surface, and includes a biconvex lens. Moreover, the eighteenth surface has an aspherical shape to mainly correct a variation in spherical aberration accompanying zooming. The fifth lens unit L5 corresponds to the twentieth surface to the twenty-fourth surface, and includes a cemented lens formed of a biconvex lens and a concave meniscus lens having a convex surface on the image side, and a biconvex lens.

Values corresponding to respective conditional expressions of this Embodiment are shown in Table 1. This Embodiment satisfies the expressions (1) to (5) and the expression (8) to achieve a wide angle of view with a photographing angle of view (angle of view) of 82.0 degrees at the wide angle end. In addition, the zoom lens having the high optical performance, in which various aberrations are satisfactorily corrected over the entire zoom range, is realized.

Embodiment 7

Figure 13:
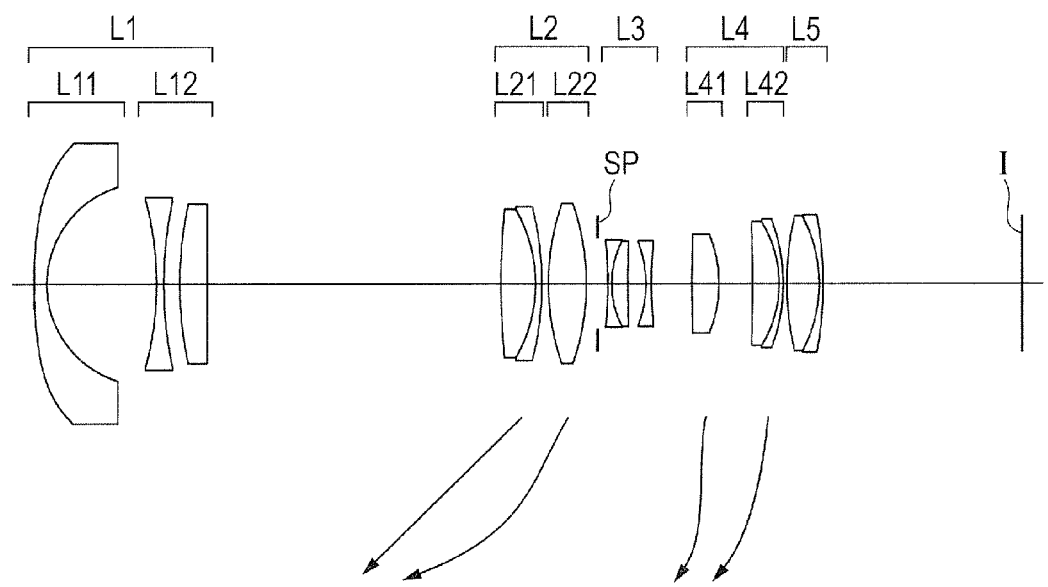
FIG. 13 is a lens cross-sectional view in the state in which focus is at infinity at a wide angle end according to Embodiment 7 (Numerical Embodiment 7) of the present invention.
Figure 14A:
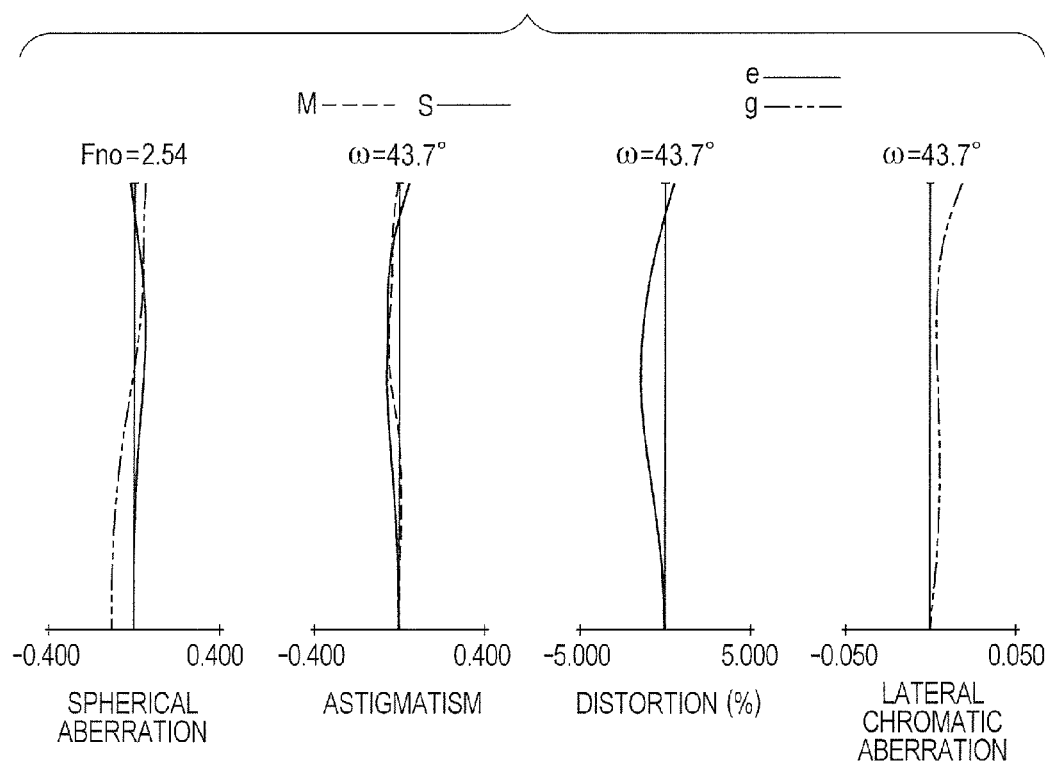
FIG. 14A is an aberration diagram in the state in which focus is at infinity at the wide angle end according to Numerical Embodiment 7.
Figure 14B:
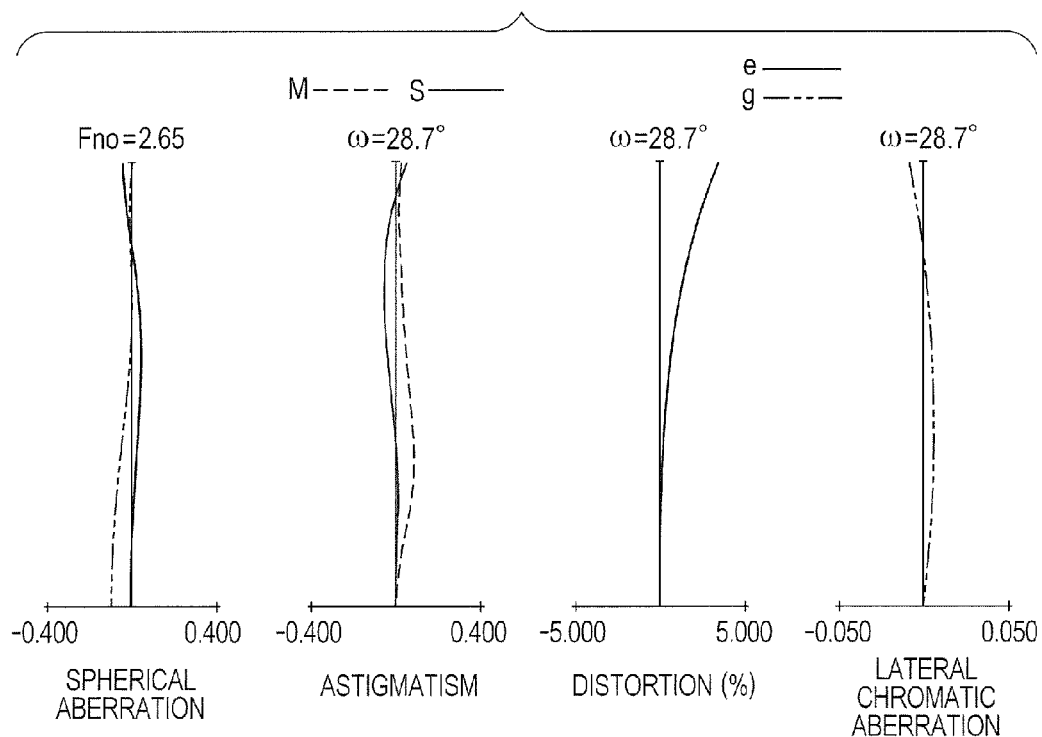
FIG. 14B is an aberration diagram in the state in which focus is at infinity at an intermediate zoom position according to Numerical Embodiment 7.
Figure 14C:
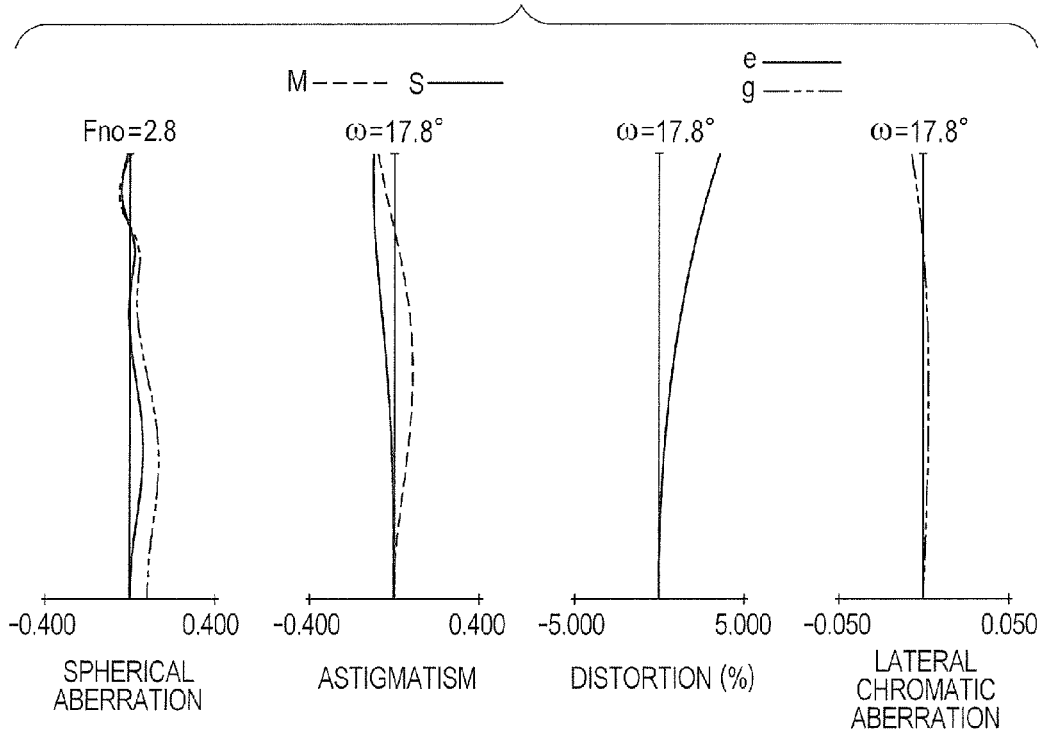
FIG. 14C is an aberration diagram in the state in which focus is at infinity at a telephoto end according to Numerical Embodiment 7.

FIG. 13 is a lens cross-sectional view when the focus is at the infinity at the wide angle end in the zoom lens according to Embodiment 7 (Numerical Embodiment 7) of the present invention. FIG. 14A, FIG. 14B, and FIG. 14C are respectively longitudinal aberration diagrams at the wide angle end, a focal length of 27 mm, and the telephoto end. Each of the aberration diagrams is the longitudinal aberration diagram when the focus is at the infinity. In FIG. 13, the zoom lens includes, in order from the object side to the image side: a first lens unit L1 for focusing, which has a negative refractive power. The zoom lens further includes a lens sub unit L21 for magnification varying, which is configured to move toward the object side during zooming from the wide angle end to the telephoto end, and has a positive refractive power. The zoom lens further includes a lens sub unit L22 for magnification varying, which is configured to move toward the object side during zooming from the wide angle end to the telephoto end, and has a positive refractive power. The lens sub unit L21 and the lens sub unit L22 are configured to move along loci that are different from each other during zooming. The zoom lens further includes a third lens unit L3 having a negative refractive power, and being configured not to move for zooming. The zoom lens further includes a lens sub unit L41 for magnification varying, which is configured to move during zooming from the wide angle end to the telephoto end, and has a positive refractive power. The zoom lens further includes a lens sub unit L42 for magnification varying, which is configured to move during zooming from the wide angle end to the telephoto end, and has a positive refractive power. The zoom lens further includes a fifth lens unit L5 having a positive refractive power, being configured not to move for zooming, and having an image forming action.

Next, the first lens unit L1 in this Embodiment is described. The first lens unit L1 corresponds to the first surface to the sixth surface. The first lens unit L1 includes a lens sub unit L11 having a negative refractive power, and being configured not to move for focusing, and a lens sub unit L12 having a negative refractive power, and being configured to move toward the object side during focusing from an infinity side to a proximity side. The lens sub unit L11 includes a concave meniscus lens having a convex surface on the object side. Moreover, the first surface has an aspherical shape to mainly correct distortion and field curvature on the wide angle side. The lens sub unit L12 includes, in order from the object side to the image side, a biconcave lens and a biconvex lens. The lens sub unit L21, which is one lens sub unit of the second lens unit L2, corresponds to the seventh surface to the ninth surface, and includes a cemented lens formed of a biconvex lens and a concave meniscus lens having a convex surface on the image side. The lens sub unit L22, which is another lens sub unit of the second lens unit L2, corresponds to the tenth surface and the eleventh surface, and includes a biconvex lens. Moreover, the tenth surface has an aspherical shape to mainly correct variations in spherical aberration and field curvature accompanying zooming. The third lens unit L3 corresponds to the twelfth surface to the seventeenth surface, and includes an aperture stop, a cemented lens formed of a biconvex lens and a convex meniscus lens having a convex surface on the object side, and a biconcave lens. The lens sub unit L41 corresponds to the eighteenth surface and the nineteenth surface, and includes a biconvex lens. Moreover, the eighteenth surface has an aspherical shape to mainly correct variations in spherical aberration and field curvature accompanying zooming. The lens sub unit L42 corresponds to the twentieth surface to the twenty-second surface, and includes a cemented lens formed of a convex meniscus lens having a convex surface on the image side and a concave meniscus lens having a convex surface on the image side. The fifth lens unit L5 corresponds to the twenty-third surface to the twenty-fifth surface, and includes a cemented lens formed of a biconvex lens and a concave meniscus lens having a concave surface on the object side.

Values corresponding to respective conditional expressions of this Embodiment are shown in Table 1. This Embodiment satisfies the expressions (1) to (5) and the expressions (7) to (11) to achieve a wide angle of view with a photographing angle of view (angle of view) of 87.4 degrees at the wide angle end. In addition, the zoom lens having the high optical performance, in which various aberrations are satisfactorily corrected over the entire zoom range, is realized.

Embodiment 8

Figure 15:
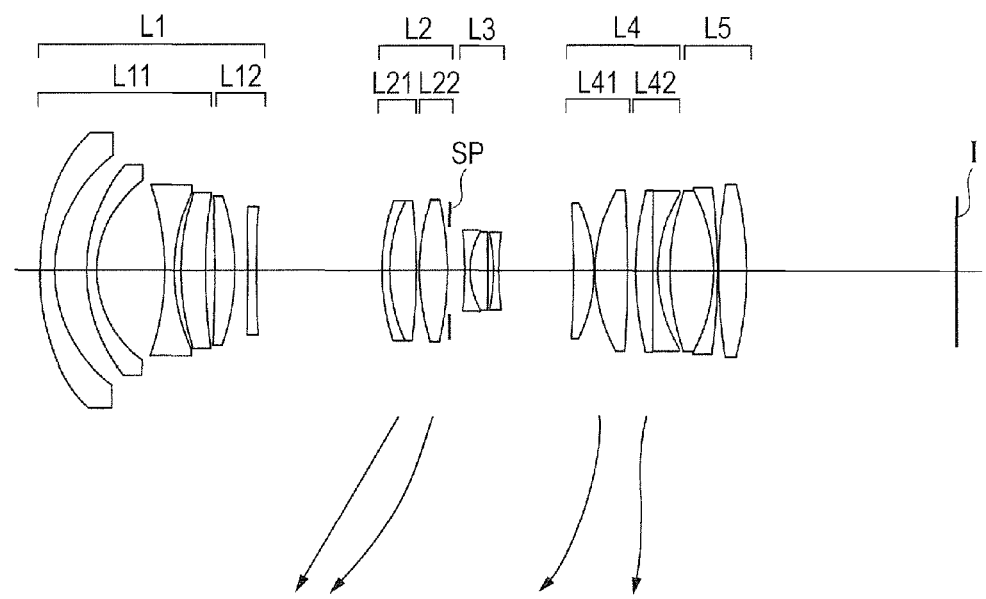
FIG. 15 is a lens cross-sectional view in the state in which focus is at infinity at a wide angle end according to Embodiment 8 (Numerical Embodiment 8) of the present invention.
Figure 16A:
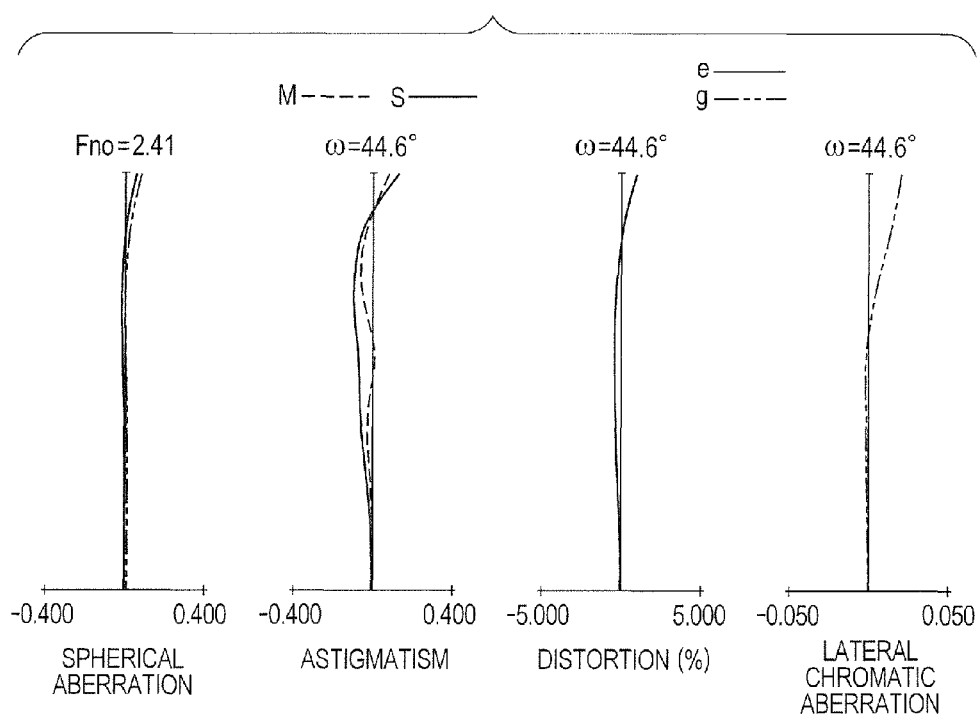
FIG. 16A is an aberration diagram in the state in which focus is at infinity at the wide angle end according to Numerical Embodiment 8.
Figure 16B:
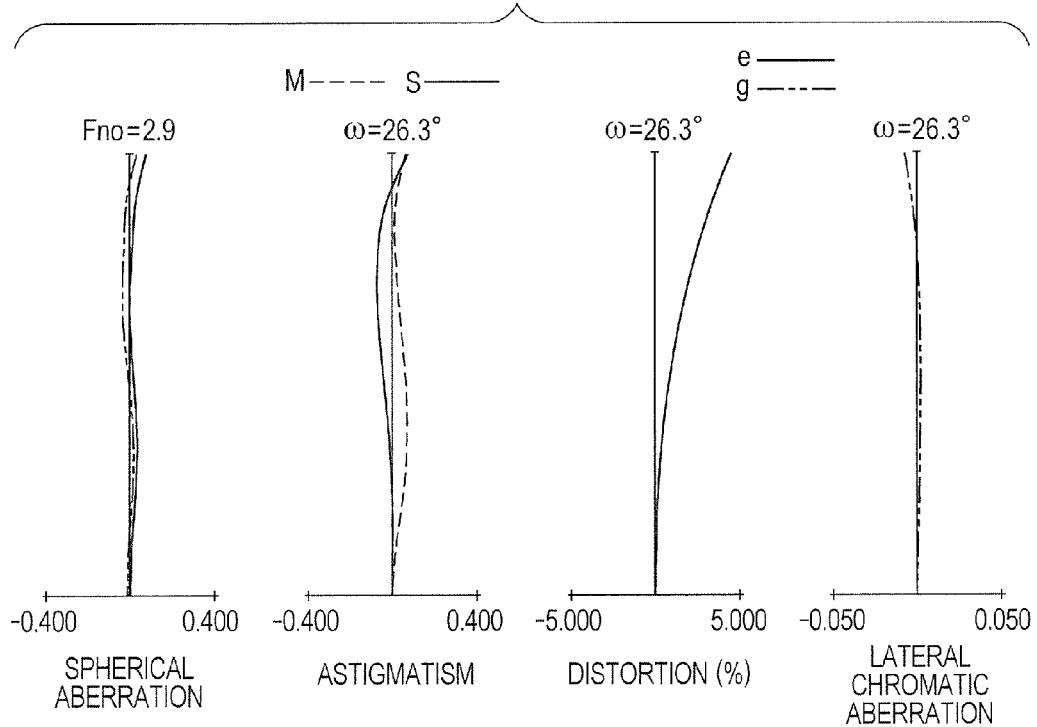
FIG. 16B is an aberration diagram in the state in which focus is at infinity at an intermediate zoom position according to Numerical Embodiment 8.
Figure 16C:
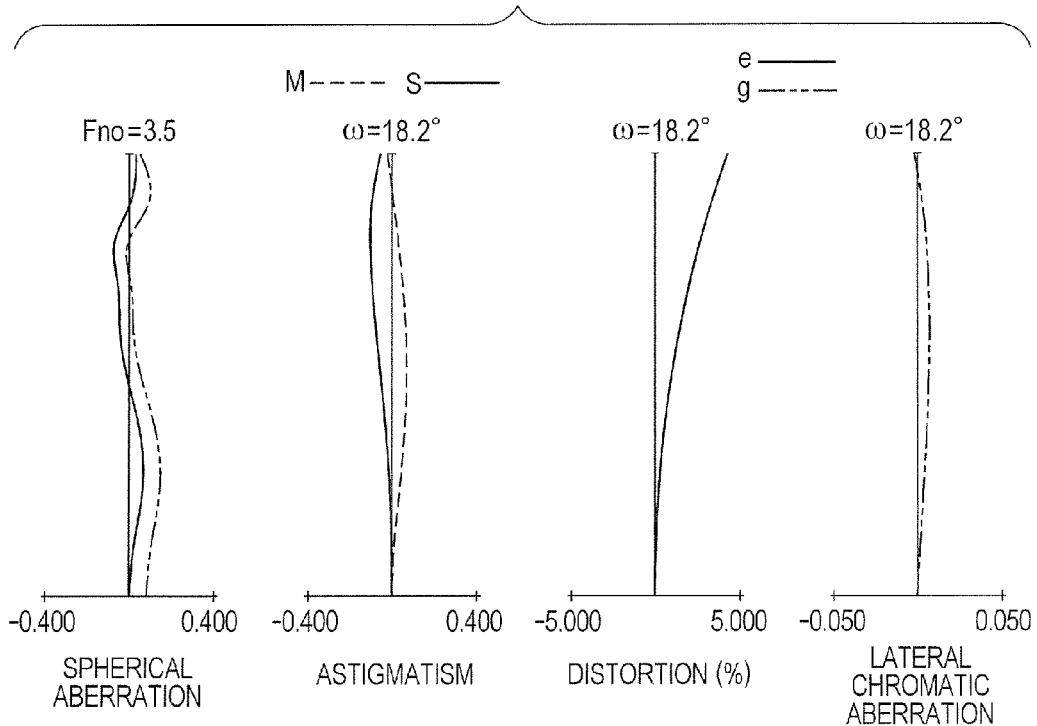
FIG. 16C is an aberration diagram in the state in which focus is at infinity at a telephoto end according to Numerical Embodiment 8.

FIG. 15 is a lens cross-sectional view when the focus is at the infinity at the wide angle end in the zoom lens according to Embodiment 8 (Numerical Embodiment 8) of the present invention. FIG. 16A, FIG. 16B, and FIG. 16C are respectively longitudinal aberration diagrams at the wide angle end, a focal length of 30 mm, and the telephoto end. Each of the aberration diagrams is the longitudinal aberration diagram when the focus is at the infinity. In FIG. 15, the zoom lens includes, in order from the object side to the image side, a first lens unit L1 for focusing, which has a negative refractive power. The zoom lens further includes a lens sub unit L21 for magnification varying, which is configured to move toward the object side during zooming from the wide angle end to the telephoto end, and has a positive refractive power. The zoom lens further includes a lens sub unit L22 for magnification varying, which is configured to move toward the object side during zooming from the wide angle end to the telephoto end, and has a positive refractive power. The lens sub unit L21 and the lens sub unit L22 are configured to move along loci that are different from each other during zooming. The zoom lens further includes a third lens unit L3 having a negative refractive power, and being configured not to move for zooming. The zoom lens further includes a lens sub unit L41 for magnification varying, which is configured to move during zooming from the wide angle end to the telephoto end, and has a positive refractive power. The zoom lens further includes a lens sub unit L42 for magnification varying, which is configured to move during zooming from the wide angle end to the telephoto end, and has a negative refractive power. The zoom lens further includes a fifth lens unit L5 having a positive refractive power, being configured to not to move for zooming, and having an image forming action.

Next, the first lens unit L1 in this Embodiment is described. The first lens unit L1 corresponds to the first surface to the twelfth surface. The first lens unit L1 includes a lens sub unit (L11) having a negative refractive power, and being configured not to move for focusing, and a lens sub unit (L12) having a positive refractive power, and being configured to move toward the image side during focusing from an infinity side to a proximity side. The lens sub unit L11 includes a concave meniscus lens having a convex surface on the object side, a concave meniscus lens having a convex surface on the object side, a biconcave lens, and a convex meniscus lens having a convex surface on the object side. Moreover, the first surface has an aspherical shape to mainly correct distortion and field curvature on the wide angle side. The lens sub unit L12 includes, in order from the object side to the image side, a convex meniscus lens having a convex surface on the image side, and a biconcave lens. The lens sub unit L21, which is one lens sub unit of the second lens unit L2, corresponds to the thirteenth surface to the fifteenth surface, and includes a cemented lens formed of a concave meniscus lens having a convex surface on the object side and a biconvex lens. The lens sub unit L22, which is another lens sub unit of the second lens unit L2, corresponds to the sixteenth surface and the seventeenth surface, and includes a biconvex lens. Moreover, the sixteenth surface and the seventeenth surface have aspherical shapes to mainly correct variations in spherical aberration and field curvature accompanying zooming. The third lens unit L3 corresponds to the eighteenth surface to the twenty-third surface, and includes an aperture stop, a cemented lens formed of a biconcave lens and a biconvex lens, and a biconcave lens. The lens sub unit L41 corresponds to the twenty-fourth surface to the twenty-seventh surface, and includes a convex meniscus lens having a convex surface on the image side, and a biconvex lens. The lens sub unit L42 corresponds to the twenty-eighth surface to the thirtieth surface, and includes a cemented lens formed of a biconvex lens and a biconcave lens. The fifth lens unit L5 corresponds to the thirty-first surface to the thirty-fifth surface, and includes a cemented lens formed of a biconvex lens and a concave meniscus lens having a concave surface on the object side, and a biconvex lens.

Values corresponding to respective conditional expressions of this Embodiment are shown in Table 1. This Embodiment satisfies the expressions (1) to (6) and the expressions (8) to (11) to achieve a wide angle of view with a photographing angle of view (angle of view) of 89.2 degrees at the wide angle end.

In addition, the zoom lens having the high optical performance, in which various aberrations are satisfactorily corrected over the entire zoom range, is realized.

Embodiment 9

Figure 17:
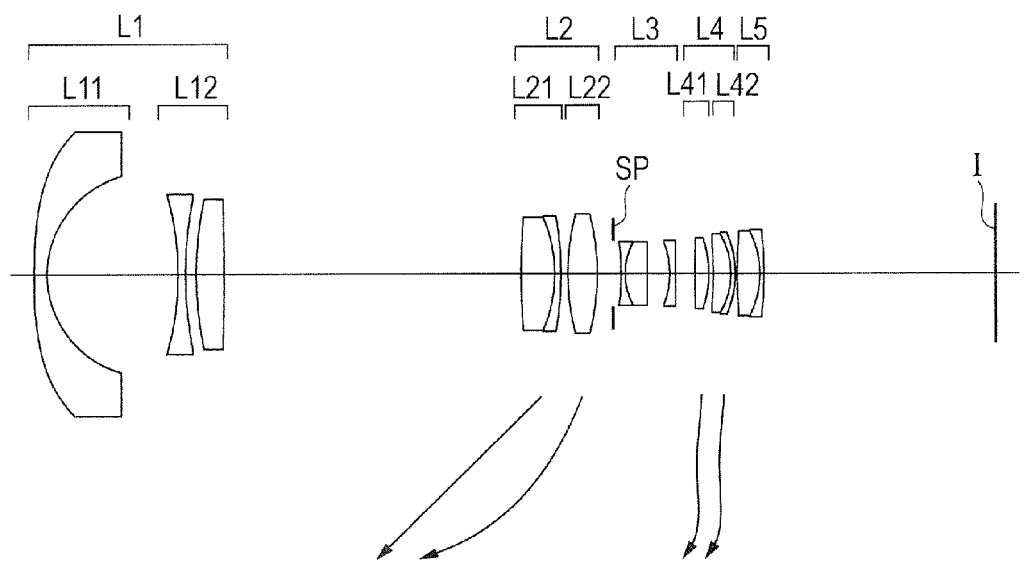
FIG. 17 is a lens cross-sectional view in the state in which focus is at infinity at a wide angle end according to Embodiment 9 (Numerical Embodiment 9) of the present invention.
Figure 18A:
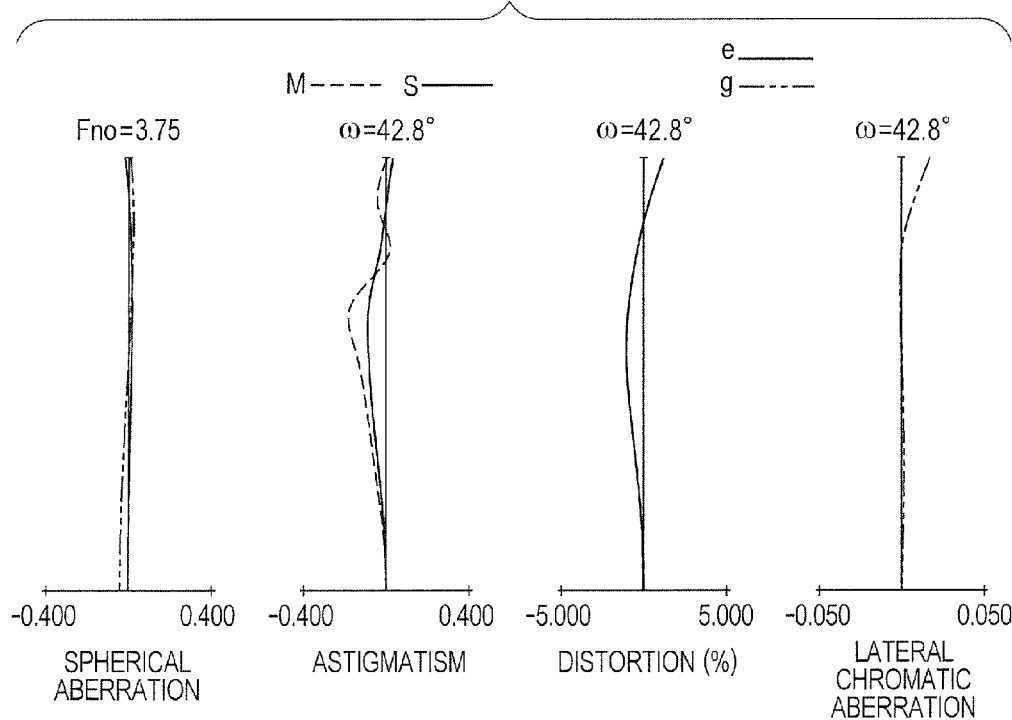
FIG. 18A is an aberration diagram in the state in which focus is at infinity at the wide angle end according to Numerical Embodiment 9.
Figure 18B:
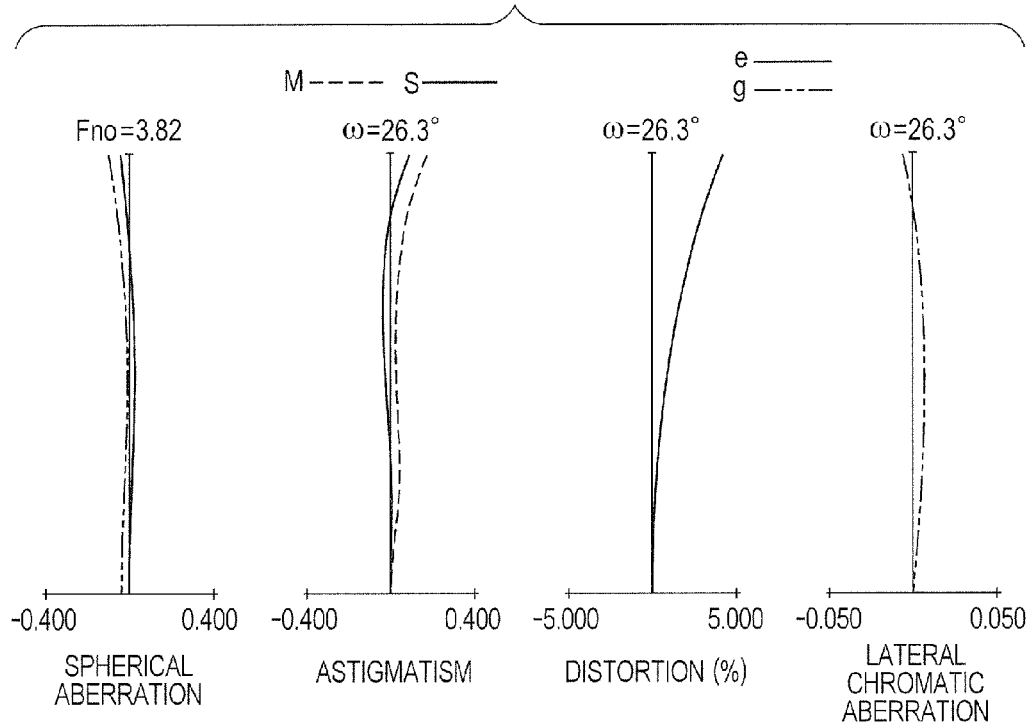
FIG. 18B is an aberration diagram in the state in which focus is at infinity at an intermediate zoom position according to Numerical Embodiment 9.
Figure 18C:
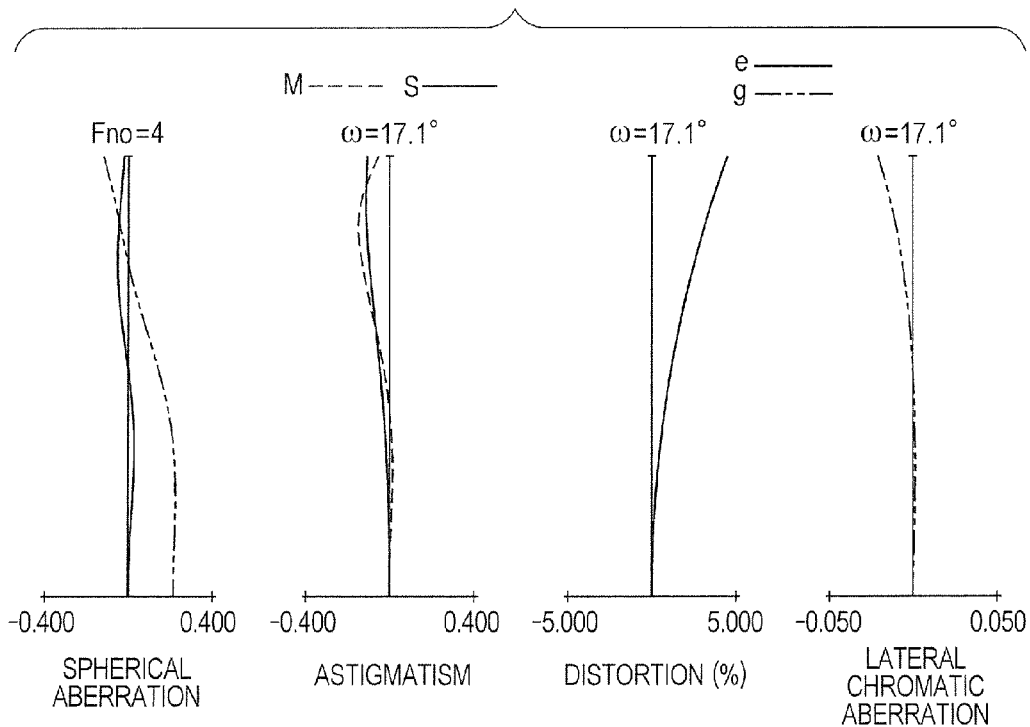
FIG. 18C is an aberration diagram in the state in which focus is at infinity at a telephoto end according to Numerical Embodiment 9.

FIG. 17 is a lens cross-sectional view when the focus is at the infinity at the wide angle end in the zoom lens according to Embodiment 9 (Numerical Embodiment 9) of the present invention. FIG. 18A, FIG. 18B, and FIG. 18C are respectively longitudinal aberration diagrams at the wide angle end, a focal length of 30 mm, and the telephoto end. Each of the aberration diagrams is the longitudinal aberration diagram when the focus is at the infinity. In FIG. 17, the zoom lens includes, in order from the object side to the image side, a first lens unit L1 for focusing, which has a negative refractive power. The zoom lens further includes a lens sub unit L21 for magnification varying, which is configured to move toward the object side during zooming from the wide angle end to the telephoto end, and has a positive refractive power. The zoom lens further includes a lens sub unit L22 for magnification varying, which is configured to move toward the object side during zooming from the wide angle end to the telephoto end, and has a positive refractive power. The lens sub unit L21 and the lens sub unit L22 are configured to move along loci that are different from each other during zooming. The zoom lens further includes a third lens unit L3 having a negative refractive power, and being configured not to move for zooming. The zoom lens further includes a lens sub unit L41 for magnification varying, which is configured to move during zooming from the wide angle end to the telephoto end, and has a positive refractive power. The zoom lens further includes a lens sub unit L42 for magnification varying, which is configured to move during zooming from the wide angle end to the telephoto end, and has a positive refractive power. The zoom lens further includes a fifth lens unit L5 having a positive refractive power, being configured to not to move for zooming, and having an image forming action.

Next, the first lens unit L1 in this Embodiment is described. The first lens unit L1 corresponds to the first surface to the sixth surface. The first lens unit L1 includes a lens sub unit L11 having a negative refractive power, and being configured not to move for focusing, and a lens sub unit L12 having a negative refractive power, and being configured to move toward the object side during focusing from an infinity side to a proximity side. The lens sub unit (L11) includes a concave meniscus lens that is convex toward the object side. Moreover, the first surface has an aspherical shape to mainly correct distortion and field curvature on the wide angle side. The lens sub unit (L12) includes, in order from the object side to the image side, a biconcave lens and a biconvex lens. The lens sub unit L21, which is one lens sub unit of the second lens unit L2, corresponds to the seventh surface to the ninth surface, and includes a cemented lens formed of a biconvex lens and a concave meniscus lens having a concave surface on the object side. The lens sub unit L22, which is another lens sub unit of the second lens unit L2, corresponds to the tenth surface and the eleventh surface, and includes a biconvex lens. Moreover, the tenth surface has an aspherical shape to mainly correct variations in spherical aberration and field curvature accompanying zooming. The third lens unit L3 corresponds to the twelfth surface to the seventeenth surface, and includes the aperture stop, a cemented lens formed of a biconcave lens and a convex meniscus lens having a convex surface on the object side, and a biconcave lens. The lens sub unit L41 corresponds to the eighteenth surface and the nineteenth surface, and includes a biconvex lens. The lens sub unit L42 corresponds to the twentieth surface to the twenty-second surface, and includes a cemented lens formed of a convex meniscus lens having a convex surface on the image side and a concave meniscus lens having a convex surface on the image side. The fifth lens unit L5 corresponds to the twenty-third surface to the twenty-fifth surface, and includes a cemented lens formed of a biconvex lens and a concave meniscus lens having a concave surface on the object side.

Values corresponding to respective conditional expressions of this Embodiment are shown in Table 1. This Embodiment satisfies the expressions (1) to (5), and the expressions (7) to (9) to achieve a wide angle of view with a photographing angle of view (angle of view) of 85.6 degrees at the wide angle end. In addition, the zoom lens having the high optical performance, in which various aberrations are satisfactorily corrected over the entire zoom range, is realized.

Embodiment 10

Figure 19:
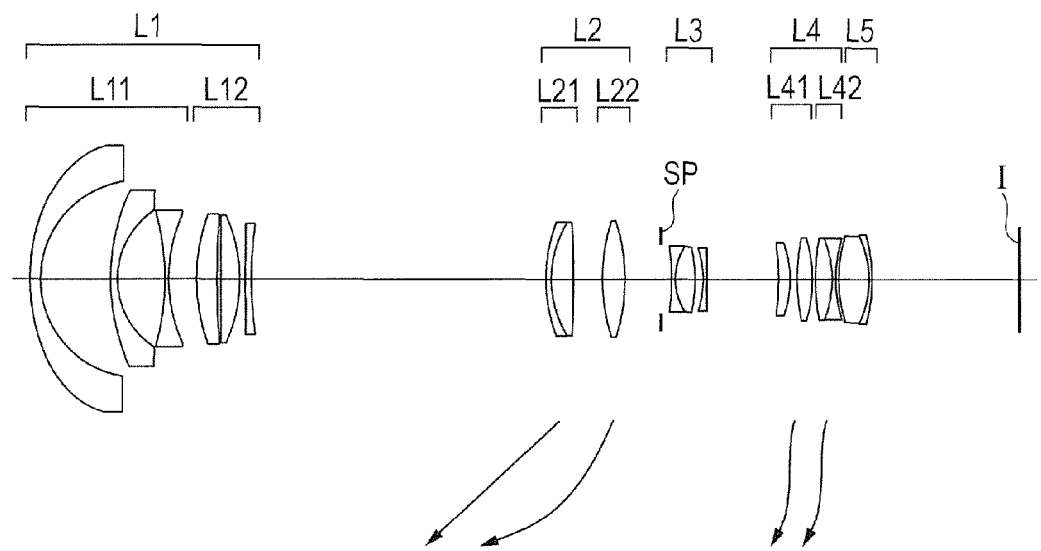
FIG. 19 is a lens cross-sectional view in the state in which focus is at infinity at a wide angle end according to Embodiment 10 (Numerical Embodiment 10) of the present invention.
Figure 20A:
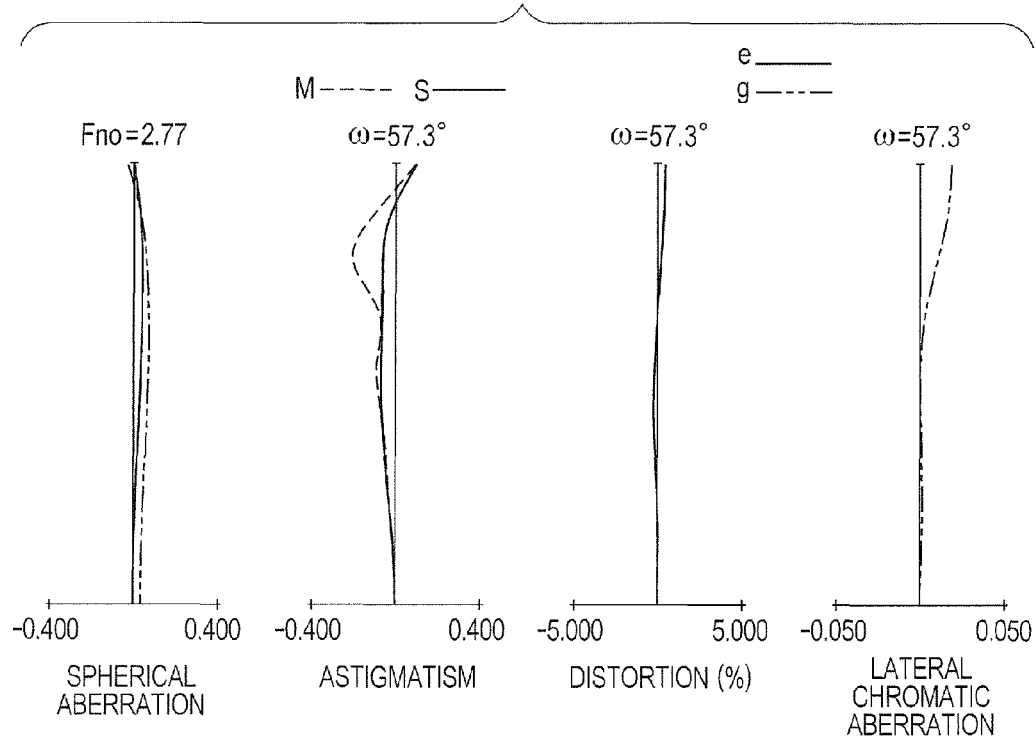
FIG. 20A is an aberration diagram in the state in which focus is at infinity at the wide angle end according to Numerical Embodiment 10.
Figure 20B:
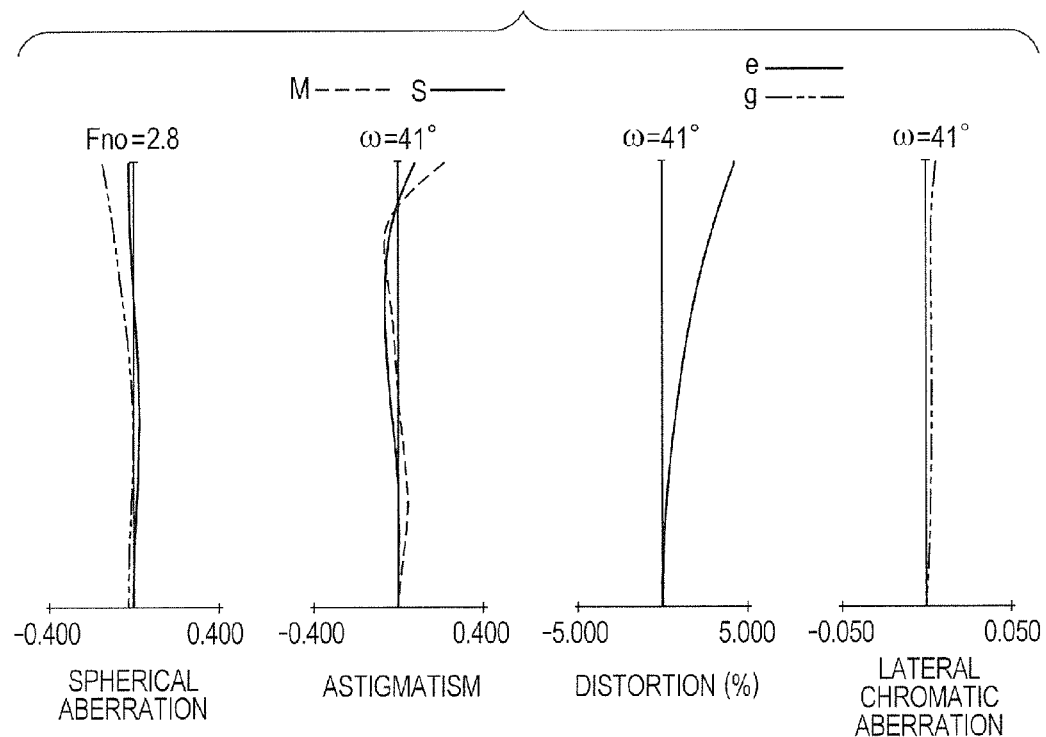
FIG. 20B is an aberration diagram in the state in which focus is at infinity at an intermediate zoom position according to Numerical Embodiment 10.
Figure 20C:
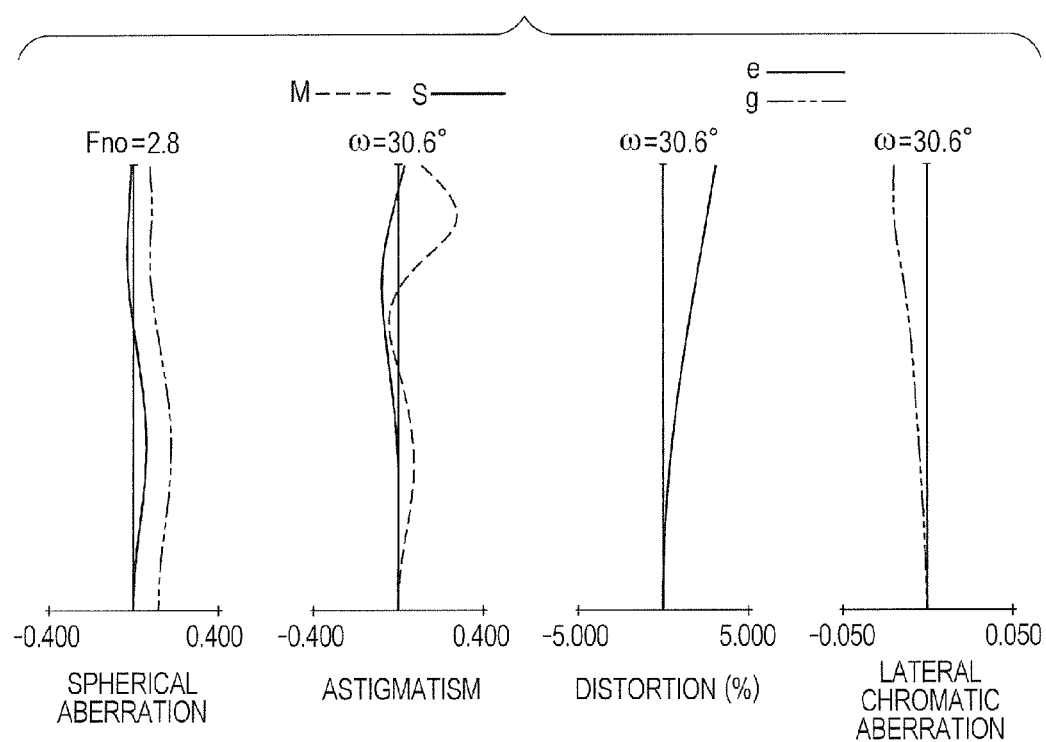
FIG. 20C is an aberration diagram in the state in which focus is at infinity at a telephoto end according to Numerical Embodiment 10.

FIG. 19 is a lens cross-sectional view when the focus is at the infinity at the wide angle end in the zoom lens according to Embodiment 10 (Numerical Embodiment 10) of the present invention. FIG. 20A, FIG. 20B, and FIG. 20C are respectively longitudinal aberration diagrams at the wide angle end, a focal length of 17 mm, and the telephoto end. Each of the aberration diagrams is the longitudinal aberration diagram when the focus is at the infinity. In FIG. 19, the zoom lens includes, in order from the object side to the image side, a first lens unit L1 for focusing, which has a negative refractive power. The zoom lens further includes a lens sub unit L21 for magnification varying, which is configured to move toward the object side during zooming from the wide angle end to the telephoto end, and has a positive refractive power. The zoom lens further includes a lens sub unit L22 for magnification varying, which is configured to move toward the object side during zooming from the wide angle end to the telephoto end, and has a positive refractive power. The lens sub unit L21 and the lens sub unit L22 are configured to move along loci that are different from each other during zooming. The zoom lens further includes a third lens unit L3 having a negative refractive power, and being configured not to move for zooming. The zoom lens further includes a lens sub unit L41 for magnification varying, which is configured to move during zooming from the wide angle end to the telephoto end, and has a positive refractive power. The zoom lens further includes a lens sub unit L42 for magnification varying, which is configured to move during zooming from the wide angle end to the telephoto end, and has a negative refractive power. The zoom lens further includes a fifth lens unit L5 having a positive refractive power, being configured to not to move for zooming, and having an image forming action.

Next, the first lens unit L1 in this Embodiment is described. The first lens unit L1 corresponds to the first surface to the sixth surface. The first lens unit L1 includes a lens sub unit (L11) having a negative refractive power, and being configured not to move for focusing, and a lens sub unit L12 having a positive refractive power, and being configured to move toward the image side during focusing from an infinity side to a proximity side. The lens sub unit L11 includes a concave meniscus lens having a convex surface on the object side, a concave meniscus lens having a convex surface on the object side, a biconcave lens, and a convex meniscus lens having a convex surface on the object side. Moreover, the first surface has an aspherical shape to mainly correct distortion and field curvature on the wide angle side. The lens sub unit L12 includes, in order from the object side to the image side, a biconvex lens and a concave meniscus lens having a concave surface on the image side. The lens sub unit L21, which is one lens sub unit of the second lens unit L2, corresponds to the thirteenth surface to the fifteenth surface, and includes a cemented lens formed of a concave meniscus lens having a convex surface on the object side and a biconvex lens. The lens sub unit L22, which is another lens sub unit of the second lens unit L2, corresponds to the sixteenth surface and the seventeenth surface, and includes a biconvex lens. Moreover, the sixteenth surface and the seventeenth surface have aspherical shapes to mainly correct variations in spherical aberration and field curvature accompanying zooming. The third lens unit L3 corresponds to the eighteenth surface to the twenty-third surface, and includes an aperture stop, a cemented lens formed of a biconcave lens and a biconvex lens, and a biconcave lens. The lens sub unit L41 corresponds to the twenty-fourth surface to the twenty-seventh surface, and includes a convex meniscus lens having a convex surface on the image side, and a biconvex lens. The lens sub unit L42 corresponds to the twenty-eighth surface to the thirtieth surface, and includes a cemented lens formed of a biconvex lens and a biconcave lens. The fifth lens unit L5 corresponds to the thirty-first surface to the thirty-third surface, and includes a cemented lens formed of a biconvex lens and a concave meniscus lens having a concave surface on the object side.

Values corresponding to respective conditional expressions of this Embodiment are shown in Table 1. This Embodiment satisfies the expressions (1) to (6) and the expressions (8) to (10) to achieve a wide angle of view with a photographing angle of view (angle of view) of 114.6 degrees at the wide angle end. In addition, the zoom lens having the high optical performance, in which various aberrations are satisfactorily corrected over the entire zoom range, is realized.

Embodiment 11

Figure 21:
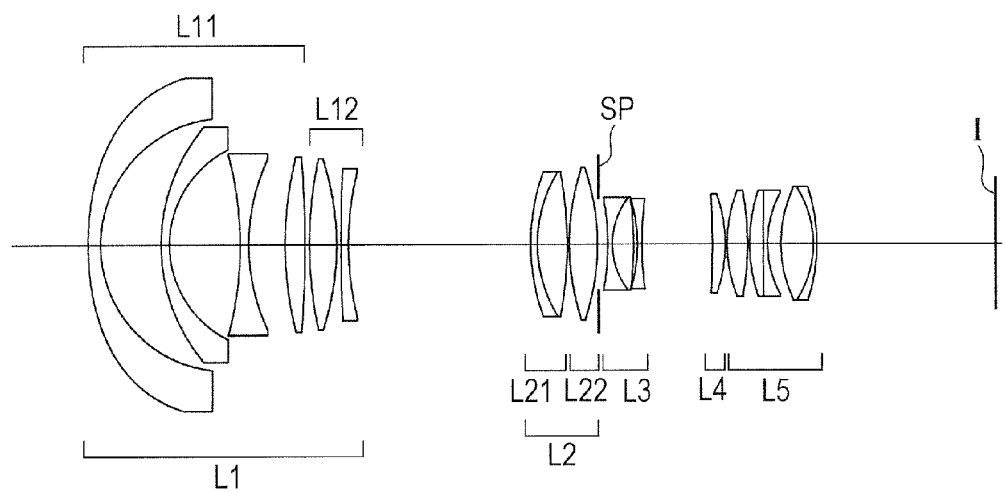
FIG. 21 is a lens cross-sectional view in the state in which focus is at infinity at a wide angle end according to Embodiment 11 (Numerical Embodiment 11) of the present invention.
Figure 22A:
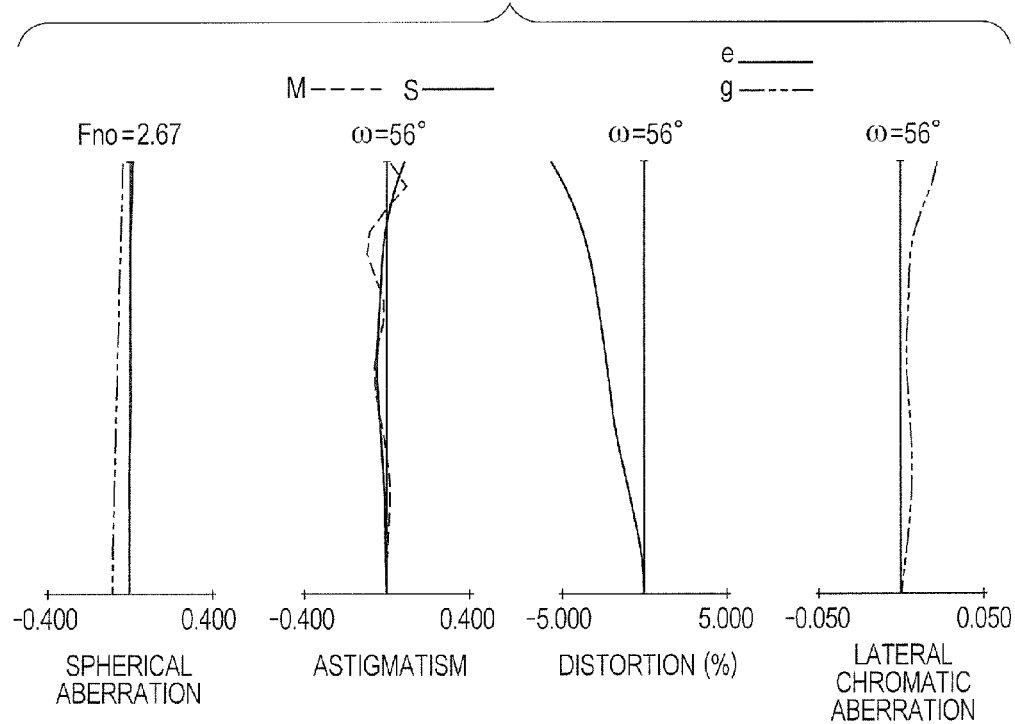
FIG. 22A is an aberration diagram in the state in which focus is at infinity at the wide angle end according to Numerical Embodiment 11.
Figure 22B:
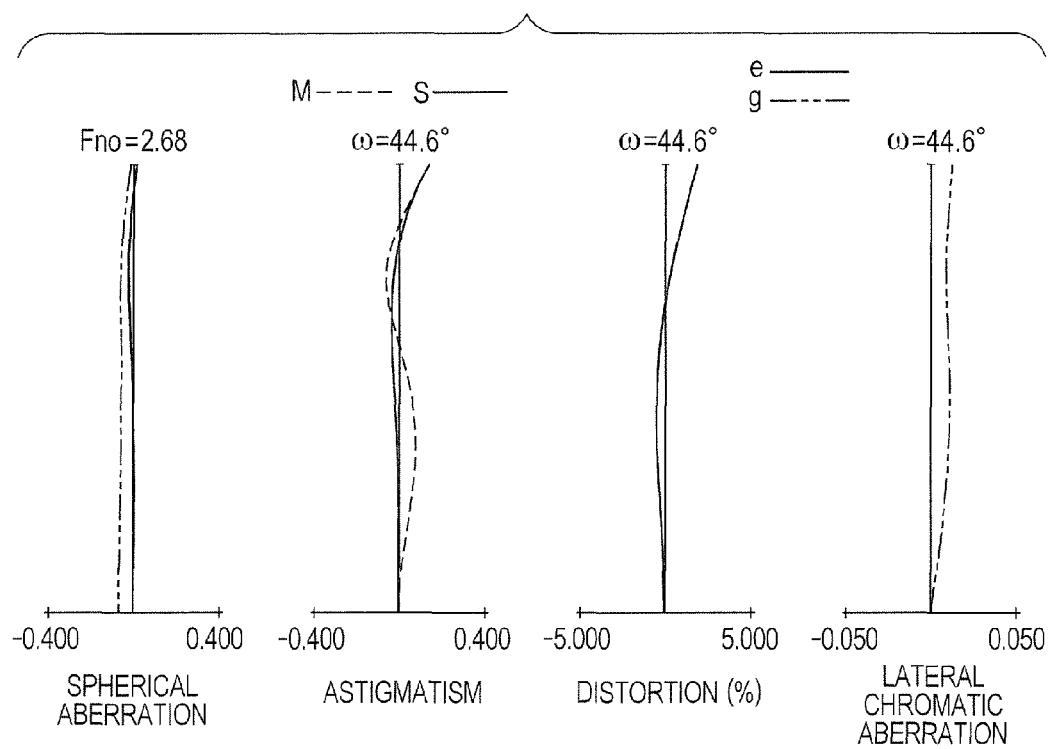
FIG. 22B is an aberration diagram in the state in which focus is at infinity at an intermediate zoom position according to Numerical Embodiment 11.
Figure 22C:
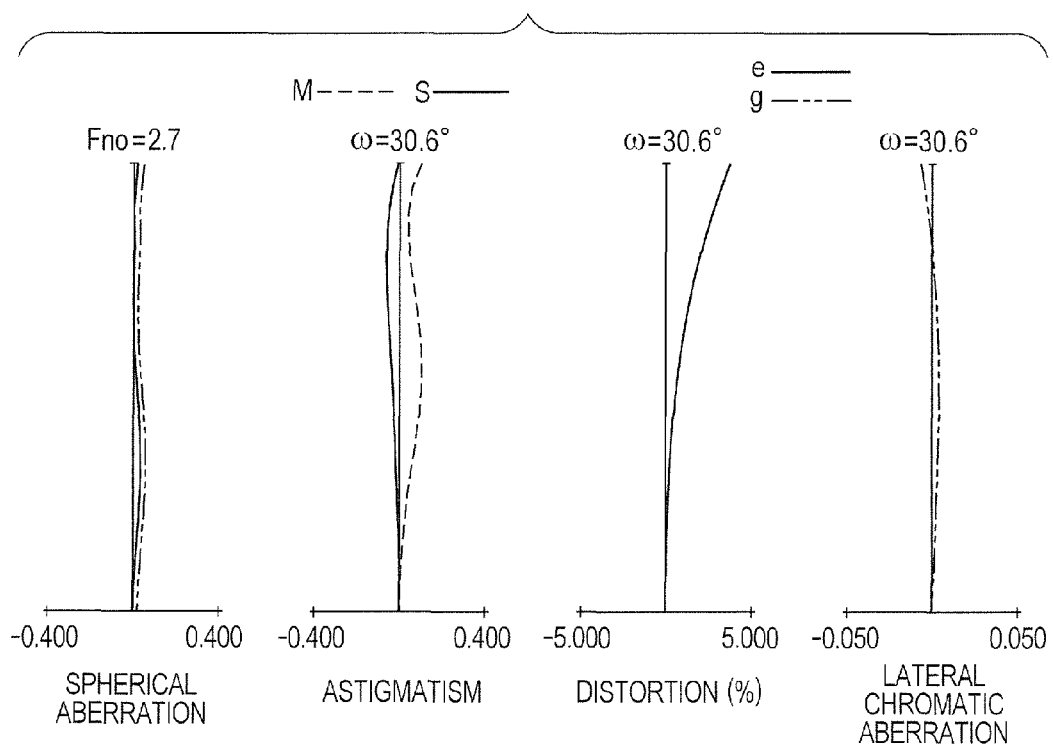
FIG. 22C is an aberration diagram in the state in which focus is at infinity at a telephoto end according to Numerical Embodiment 11.

FIG. 21 is a lens cross-sectional view when the focus is at the infinity at the wide angle end in the zoom lens according to Embodiment 11 (Numerical Embodiment 11) of the present invention. FIG. 22A, FIG. 22B, and FIG. 22C are respectively longitudinal aberration diagrams at the wide angle end, a focal length of 15 mm, and the telephoto end. Each of the aberration diagrams is the longitudinal aberration diagram when the focus is at the infinity. In FIG. 21, the zoom lens includes, in order from the object side to the image side, a first lens unit L1 for focusing, which has a negative refractive power. The zoom lens further includes a lens sub unit L21 for magnification varying, which is configured to move toward the object side during zooming from the wide angle end to the telephoto end, and has a positive refractive power. The zoom lens further includes a lens sub unit L22 for magnification varying, which is configured to move toward the object side during zooming from the wide angle end to the telephoto end, and has a positive refractive power. The zoom lens further includes a third lens unit L3 having a negative refractive power, and being configured not to move for zooming. The zoom lens further includes a fourth lens unit L4 having a positive refractive power, and being configured to move nonlinearly on the optical axis in conjunction with the movements of the lens sub unit L21 and the lens sub unit L22 to correct an image plane variation accompanying zooming. The zoom lens further includes a fifth lens unit L5 having a positive refractive power, being configured not to move for zooming, and having an image forming action.

Next, the first lens unit L1 in this Embodiment is described. The first lens unit L1 corresponds to the first surface to the twelfth surface. The first lens unit L1 includes a lens sub unit (L11) having a negative refractive power, and being configured not to move for focusing, and a lens sub unit (L12) having a positive refractive power, and being configured to move toward the image side during focusing from an infinity side to a proximity side. The lens sub unit L11 includes a concave meniscus lens having a convex surface on the object side, a concave meniscus lens having a convex surface on the object side, a biconcave lens, and a biconvex lens. Moreover, the first surface has an aspherical shape to mainly correct distortion and field curvature on the wide angle side. The lens sub unit L12 includes, in order from the object side, a biconvex lens and a concave meniscus lens having a convex surface on the object side. The lens sub unit L21 corresponds to the thirteenth surface to the fifteenth surface, and includes a cemented lens formed of a concave meniscus lens having a convex surface on the object side and a biconvex lens. The lens sub unit L22 corresponds to the sixteenth surface and the seventeenth surface, and includes a biconvex lens. Moreover, the sixteenth surface and the seventeenth surface have aspherical shapes to mainly correct variations in spherical aberration and field curvature accompanying zooming. The third lens unit L3 corresponds to the eighteenth surface to the twenty-third surface, and includes an aperture stop, a cemented lens formed of a biconcave lens and a biconvex lens, and a biconcave lens. The fourth lens unit L4 corresponds to the twenty-fourth surface and the twenty-fifth surface, and includes a convex meniscus lens having a convex surface on the image side. The fifth lens unit L5 corresponds to the twenty-sixth surface to the thirty-third surface, and includes a biconvex lens, a cemented lens formed of a convex meniscus lens having a convex surface on the object side and a concave meniscus lens having a convex surface on the object side, and a cemented lens formed of a biconvex lens and a concave meniscus lens having a convex surface on the image side.

Values corresponding to respective conditional expressions of this Embodiment are shown in Table 1. This Embodiment satisfies the expressions (1) to (6) and the expressions (8) to (11) to achieve a wide angle of view with a photographing angle of view (angle of view) of 112 degrees at the wide angle end. In addition, the zoom lens having the high optical performance, in which various aberrations are satisfactorily corrected over the entire zoom range, is realized.

The exemplary embodiments of the present invention have been described above. However, it is to be understood that the present invention is not limited to the exemplary embodiments and various modifications and changes may be made without departing from the gist of the present invention.

(Numerical Embodiment 1)
Unit mm

Surface data

| Surface number i | ri | di | ndi | vdi | θgFi | Effective diameter |
|---|---|---|---|---|---|---|
| 1* | 81.541 | 2.00 | 1.516330 | 64.14 | 0.5352 | 66.0 |
| 2 | 27.668 | 29.11 | | | | 51.2 |
| 3 | −106.430 | 2.21 | 1.800000 | 29.84 | 0.6017 | 45.1 |
| 4 | 61.512 | 3.30 | | | | 42.5 |
| 5 | 69.810 | 4.46 | 1.846660 | 23.78 | 0.6205 | 42.6 |
| 6 | 1,314.349 | (Variable) | | | | 42.3 |
| 7 | 62.618 | 1.50 | 1.800000 | 29.84 | 0.6017 | 33.9 |
| 8 | 34.394 | 7.04 | 1.563839 | 60.67 | 0.5402 | 33.9 |
| 9 | −104.184 | (Variable) | | | | 34.1 |
| 10* | 77.774 | 5.13 | 1.438750 | 94.93 | 0.5343 | 34.9 |
| 11* | −75.732 | (Variable) | | | | 34.8 |
| 12 | 0.000 | 1.84 | | | | 17.9 |
| 13 | −43.859 | 1.00 | 1.603112 | 60.64 | 0.5414 | 17.6 |
| 14 | 26.489 | 2.68 | 1.784696 | 26.29 | 0.6135 | 17.5 |
| 15 | 522.448 | 1.05 | | | | 17.3 |
| 16 | −70.742 | 1.00 | 1.696797 | 55.53 | 0.5433 | 17.3 |
| 17 | 65.636 | 2.64 | | | | 17.3 |
| 18 | 0.000 | (Variable) | | | | 17.7 |
| 19 | 81.328 | 8.34 | 1.537750 | 74.70 | 0.5393 | 22.5 |
| 20 | −19.512 | 1.00 | 1.567322 | 42.80 | 0.5730 | 23.8 |
| 21 | −44.224 | (Variable) | | | | 25.0 |
| 22 | 52.647 | 1.00 | 1.517417 | 52.43 | 0.5564 | 25.9 |
| 23 | 22.309 | 5.93 | 1.677900 | 55.34 | 0.5472 | 25.9 |
| 24 | −316.191 | 0.47 | | | | 25.6 |
| 25 | 61.102 | 1.42 | 1.762001 | 40.10 | 0.5765 | 25.0 |
| 26 | 21.416 | 3.78 | | | | 23.7 |
| 27 | 23.336 | 8.40 | 1.438750 | 94.93 | 0.5343 | 25.3 |
| 28 | −28.213 | 1.00 | 1.834807 | 42.71 | 0.5642 | 25.0 |
| 29 | −201.209 | BF | | | | 25.4 |
| Image plane | ∞ | | | | | |

Aspherical surface data

First surface

K = 3.48534e+000   A4 = 1.71640e−006   A6 = 8.41226e−011
A8 = −2.56285e−013   A10 = 2.79463e−016   A12 = −4.19689e−020

Tenth surface

K = −7.08167e+000   A4 = −6.61607e−007   A6 = 2.90014e−009
A8 = −4.66899e−011   A10 = 2.03286e−013   A12 = −3.43592e−016

Eleventh surface

K = 1.64127e+000   A4 = −1.04152e−006   A6 = 2.33336e−009
A8 = −3.26813e−011   A10 = 1.53684e−013   A12 = −2.80962e−016

Various data
Zoom ratio 4.32

| | Wide angle | Intermediate | Telephoto |
|---|---|---|---|
| Focal length | 18.50 | 30.00 | 80.00 |
| F-number | 4.00 | 4.00 | 4.00 |
| Half angle of view | 38.66 | 26.26 | 10.48 |
| Image height | 14.80 | 14.80 | 14.80 |
| Total lens length | 217.12 | 217.12 | 217.12 |
| BF | 43.55 | 43.55 | 43.55 |
| d6 | 58.51 | 29.34 | 1.77 |
| d9 | 0.64 | 16.69 | 5.01 |
| d11 | 0.40 | 13.52 | 52.78 |
| d18 | 17.21 | 15.02 | 0.23 |
| d21 | 0.50 | 2.68 | 17.48 |

Zoom lens unit data

| Unit | First surface | Focal length |
|---|---|---|
| 1 | 1 | −43.50 |
| 21 | 7 | 89.33 |

(Numerical Embodiment 1)
Unit mm

| | | |
|---|---|---|
| 22 | 10 | 88.13 |
| 3 | 12 | −33.91 |
| 4 | 19 | 57.16 |
| 5 | 22 | 135.77 |

(Numerical Embodiment 2)
Unit mm

| Surface number i | ri | di | ndi | vdi | θgFi | Effective diameter |
|---|---|---|---|---|---|---|
| 1* | 87.610 | 2.00 | 1.618000 | 63.33 | 0.5441 | 67.6 |
| 2 | 25.663 | 29.11 | | | | 49.3 |
| 3 | −64.303 | 1.50 | 1.688931 | 31.07 | 0.6003 | 43.6 |
| 4 | 38.210 | 8.20 | 1.761821 | 26.52 | 0.6135 | 40.6 |
| 5 | 7,032.775 | (Variable) | | | | 39.9 |
| 6 | 71.196 | 1.50 | 1.800000 | 29.84 | 0.6017 | 34.8 |
| 7 | 40.515 | 9.25 | 1.516330 | 64.14 | 0.5352 | 35.0 |
| 8 | −92.106 | (Variable) | | | | 35.9 |
| 9* | 52.192 | 8.27 | 1.438750 | 94.93 | 0.5343 | 38.6 |
| 10* | −62.342 | (Variable) | | | | 38.5 |
| 11 | 0.000 | 2.25 | | | | 22.0 |
| 12 | −44.095 | 1.00 | 1.677900 | 55.34 | 0.5472 | 21.6 |
| 13 | 25.191 | 3.21 | 1.805181 | 25.42 | 0.6161 | 21.5 |
| 14 | 172.645 | 1.20 | | | | 21.4 |
| 15 | −95.195 | 1.00 | 1.563839 | 60.67 | 0.5402 | 21.3 |
| 16 | 71.541 | 2.64 | | | | 21.4 |
| 17 | 0.000 | (Variable) | | | | 21.8 |
| 18 | 87.917 | 6.68 | 1.496999 | 81.54 | 0.5374 | 24.6 |
| 19 | −22.325 | 1.00 | 1.567322 | 42.80 | 0.5730 | 25.3 |
| 20 | −48.853 | (Variable) | | | | 26.6 |
| 21 | 137.912 | 3.68 | 1.696797 | 55.53 | 0.5433 | 28.5 |
| 22 | −66.880 | 0.47 | | | | 28.7 |
| 23 | 37.293 | 5.44 | 1.496999 | 81.54 | 0.5374 | 28.1 |
| 24 | −81.948 | 1.42 | 1.772499 | 49.60 | 0.5521 | 27.5 |
| 25 | 31.067 | 4.00 | | | | 26.2 |
| 26 | 37.971 | 7.07 | 1.438750 | 94.93 | 0.5343 | 27.3 |
| 27 | −31.802 | 1.00 | 1.698947 | 30.13 | 0.6029 | 27.3 |
| 28 | −126.994 | BF | | | | 27.7 |
| Image plane | ∞ | | | | | |

Aspherical surface data

First surface

K = 4.43141e+000  A4 = 2.11208e−006  A6 = 4.04346e−010
A8 = −1.01973e−012  A10 = 9.65526e−016  A12 = −2.57329e−019

Ninth surface

K = −2.70928e+000  A4 = 7.09063e−007  A6 = 3.32149e−009
A8 = −4.15992e−011  A10 = 1.59397e−013  A12 = −2.27454e−016

Tenth surface

K = −1.00005e+000  A4 = 2.18074e−007  A6 = 2.07516e−009
A8 = −3.06266e−011  A10 = 1.23962e−013  A12 = −1.87509e−016

Various data
Zoom ratio 3.00

| | Wide angle | Intermediate | Telephoto |
|---|---|---|---|
| Focal length | 15.50 | 27.00 | 46.50 |
| F-number | 2.70 | 2.70 | 2.70 |
| Half angle of view | 43.68 | 28.73 | 17.65 |
| Image height | 14.80 | 14.80 | 14.80 |
| Total lens length | 215.06 | 215.06 | 215.06 |
| BF | 40.00 | 40.00 | 40.00 |
| d5 | 54.69 | 22.82 | 8.77 |
| d8 | 0.62 | 15.33 | 9.45 |
| d10 | 0.00 | 17.17 | 37.11 |
| d17 | 17.47 | 15.00 | 6.13 |
| d20 | 0.39 | 2.86 | 11.73 |

Zoom lens unit data

| Unit | First surface | Focal length |
|---|---|---|
| 1 | 1 | −33.20 |
| 21 | 6 | 103.00 |
| 22 | 9 | 66.04 |
| 3 | 11 | −33.80 |
| 4 | 18 | 72.00 |
| 5 | 21 | 85.36 |

(Numerical Embodiment 3)
Unit mm

Surface data

| Surface number i | ri | di | ndi | vdi | θgFi | Effective diameter |
|---|---|---|---|---|---|---|
| 1* | 100.823 | 2.70 | 1.537750 | 74.70 | 0.5393 | 64.4 |
| 2 | 27.752 | 31.15 | | | | 49.4 |
| 3 | −150.390 | 1.50 | 1.729157 | 54.68 | 0.5444 | 44.7 |
| 4 | 57.570 | 0.72 | | | | 41.7 |
| 5 | 56.104 | 8.21 | 1.658441 | 50.88 | 0.5561 | 41.6 |
| 6 | −1,072.608 | (Variable) | | | | 40.0 |
| 7 | 238.625 | 5.88 | 1.620411 | 60.29 | 0.5426 | 22.8 |
| 8 | −33.607 | 1.35 | 1.761821 | 26.52 | 0.6135 | 23.3 |
| 9 | −61.887 | 0.20 | | | | 23.7 |
| 10 | 47.633 | 4.36 | 1.438750 | 94.93 | 0.5343 | 23.9 |
| 11 | −169.496 | (Variable) | | | | 23.5 |
| 12 | 0.000 | 1.71 | | | | 15.9 |
| 13 | −58.082 | 0.80 | 1.696797 | 55.53 | 0.5433 | 15.6 |
| 14 | 29.770 | 1.79 | 1.959060 | 17.47 | 0.6599 | 15.5 |
| 15 | 53.667 | 1.95 | | | | 15.4 |
| 16 | −24.477 | 1.20 | 1.516330 | 64.14 | 0.5352 | 15.4 |
| 17 | 40.606 | (Variable) | | | | 16.3 |
| 18* | 32.752 | 6.62 | 1.496999 | 81.54 | 0.5374 | 18.2 |
| 19 | −32.730 | (Variable) | | | | 20.2 |
| 20 | 76.090 | 0.97 | 1.785896 | 44.20 | 0.5631 | 28.3 |
| 21 | 38.996 | 9.33 | 1.496999 | 81.54 | 0.5374 | 28.5 |
| 22 | −36.584 | (Variable) | | | | 29.4 |
| 23 | 38.989 | 10.10 | 1.496999 | 81.54 | 0.5374 | 29.1 |
| 24 | −26.754 | 0.90 | 1.910820 | 35.25 | 0.5824 | 28.1 |
| 25 | −399.882 | BF | | | | 28.3 |
| Image plane | ∞ | | | | | |

Aspherical surface data

First surface

K = 2.99107e+000  A4 = 2.16207e−006  A6 = 4.17797e−010
A8 = −8.79919e−013  A10 = 1.00331e−015  A12 = −2.48813e−019

Eighteenth surface

K = 0.00000e+000  A4 = −1.25438e−005  A6 = 3.43408e−008
A8 = −5.64880e−010  A10 = 4.07328e−012  A12 = −1.08661e−014

Various data
Zoom ratio 2.67

| | Wide angle | Intermediate | Telephoto |
|---|---|---|---|
| Focal length | 18.00 | 36.00 | 48.00 |
| F-number | 2.94 | 3.21 | 3.50 |
| Half angle of view | 39.43 | 22.35 | 17.14 |

-continued (Numerical Embodiment 3)
Unit mm

| | | | |
|---|---|---|---|
| Image height | 14.80 | 14.80 | 14.80 |
| Total lens length | 187.91 | 187.91 | 187.91 |
| BF | 40.95 | 40.95 | 40.95 |
| d6 | 32.02 | 11.11 | 3.37 |
| d11 | 1.32 | 22.23 | 29.97 |
| d17 | 6.95 | 3.59 | 2.42 |
| d19 | 14.74 | 9.74 | 4.14 |
| d22 | 0.49 | 8.85 | 15.61 |
| d25 | 40.95 | 40.95 | 40.95 |

Zoom lens unit data

| Unit | First surface | Focal length |
|---|---|---|
| 1 | 1 | −47.91 |
| 2 | 7 | 45.08 |
| 3 | 12 | −17.49 |
| 41 | 18 | 33.98 |
| 42 | 20 | 61.56 |
| 5 | 23 | 1705.24 |

(Numerical Embodiment 4)
Unit mm

| Surface number i | ri | di | ndi | vdi | θgFi | Effective diameter |
|---|---|---|---|---|---|---|
| 1* | 158.682 | 2.70 | 1.487490 | 70.23 | 0.5300 | 57.0 |
| 2 | 21.477 | 23.52 | | | | 40.1 |
| 3 | −65.332 | 1.50 | 1.729157 | 54.68 | 0.5444 | 36.0 |
| 4 | 116.976 | 3.57 | | | | 34.5 |
| 5 | 111.421 | 5.23 | 1.696797 | 55.53 | 0.5433 | 33.5 |
| 6 | −332.807 | (Variable) | | | | 32.5 |
| 7 | 67.228 | 6.45 | 1.618000 | 63.33 | 0.5441 | 24.7 |
| 8 | −38.833 | 1.35 | 1.800000 | 29.84 | 0.6017 | 24.6 |
| 9 | −121.222 | (Variable) | | | | 25.0 |
| 10* | 68.223 | 5.44 | 1.496999 | 81.54 | 0.5374 | 25.4 |
| 11 | −49.716 | (Variable) | | | | 25.3 |
| 12 | 0.000 | 1.67 | | | | 14.2 |
| 13 | −80.222 | 0.80 | 1.729157 | 54.68 | 0.5444 | 13.8 |
| 14 | 19.087 | 2.46 | 1.808095 | 22.76 | 0.6307 | 13.6 |
| 15 | 120.749 | 4.52 | | | | 13.4 |
| 16 | −26.029 | 0.80 | 1.804000 | 46.58 | 0.5572 | 12.9 |
| 17 | 403.345 | (Variable) | | | | 13.1 |
| 18* | 82.237 | 6.17 | 1.496999 | 81.54 | 0.5374 | 20.9 |
| 19 | −25.255 | (Variable) | | | | 22.4 |
| 20 | 550.937 | 5.26 | 1.595220 | 67.74 | 0.5442 | 23.5 |
| 21 | −22.821 | 0.90 | 1.953750 | 32.32 | 0.5898 | 23.8 |
| 22 | −45.694 | 0.38 | | | | 24.7 |
| 23 | 70.482 | 5.99 | 1.496999 | 81.54 | 0.5374 | 25.2 |
| 24 | −25.120 | 0.90 | 1.882997 | 40.76 | 0.5667 | 25.1 |
| 25 | −69.445 | BF | | | | 25.8 |
| Image plane | ∞ | | | | | |

Aspherical surface data

First surface

K = 2.99107e+000   A4 = 7.33965e−006   A6 = −4.16481e−009
A8 = 6.68382e−012  A10 = −5.59885e−015  A12 = 2.90870e−018

Tenth surface

K = 0.00000e+000   A4 = −4.67248e−006  A6 = 4.65010e−009
A8 = −4.88533e−011 A10 = 1.99102e−013  A12 = −3.03795e−016

Eighteenth surface

K = 0.00000e+000   A4 = 1.67124e−006   A6 = 7.12145e−009
A8 = −7.61635e−011 A10 = 9.72722e−013  A12 = −4.78927e−015

(Numerical Embodiment 4)
Unit mm

Various data
Zoom ratio 3.03

| | Wide angle | Intermediate | Telephoto |
|---|---|---|---|
| Focal length | 16.50 | 35.00 | 50.00 |
| F-number | 3.26 | 3.58 | 4.00 |
| Half angle of view | 41.89 | 22.92 | 16.49 |
| Image height | 14.80 | 14.80 | 14.80 |
| Total lens length | 181.46 | 181.46 | 181.46 |
| BF | 49.44 | 49.44 | 49.44 |
| d6 | 36.41 | 8.50 | 4.13 |
| d9 | 1.49 | 7.21 | 1.50 |
| d11 | 1.96 | 24.15 | 34.23 |
| d17 | 11.55 | 8.42 | 4.61 |
| d19 | 0.99 | 4.13 | 7.93 |

Zoom lens unit data

| Unit | First surface | Focal length |
|---|---|---|
| 1 | 1 | −32.12 |
| 21 | 7 | 90.93 |
| 22 | 10 | 58.59 |
| 3 | 12 | −21.41 |
| 4 | 18 | 39.52 |
| 5 | 20 | 92.47 |

(Numerical Embodiment 5)
Unit mm

| Surface number i | ri | di | ndi | vdi | θgFi | Effective diameter |
|---|---|---|---|---|---|---|
| 1* | 78.308 | 2.80 | 1.696797 | 55.53 | 0.5433 | 69.9 |
| 2 | 27.219 | 24.45 | | | | 51.2 |
| 3 | −79.342 | 1.89 | 1.834807 | 42.71 | 0.5642 | 45.7 |
| 4 | 44.444 | 6.23 | | | | 42.2 |
| 5 | 59.865 | 5.39 | 1.603420 | 38.03 | 0.5835 | 43.5 |
| 6 | 1,100.405 | 1.12 | | | | 43.4 |
| 7 | 223.596 | 6.06 | 1.670029 | 47.23 | 0.5627 | 43.0 |
| 8 | −66.545 | 0.98 | | | | 42.7 |
| 9 | −16,548.304 | 1.68 | 1.850259 | 32.27 | 0.5929 | 38.7 |
| 10 | 94.834 | (Variable) | | | | 37.1 |
| 11 | 60.076 | 1.50 | 1.800000 | 29.84 | 0.6017 | 32.1 |
| 12 | 36.337 | 8.61 | 1.516330 | 64.14 | 0.5352 | 32.1 |
| 13 | −98.591 | (Variable) | | | | 32.7 |
| 14* | 58.909 | 5.63 | 1.438750 | 94.93 | 0.5343 | 34.1 |
| 15* | −76.762 | (Variable) | | | | 34.0 |
| 16 | 0.000 | 2.22 | | | | 20.0 |
| 17 | −50.435 | 1.00 | 1.696797 | 55.53 | 0.5433 | 19.5 |
| 18 | 24.837 | 3.23 | 1.805181 | 25.42 | 0.6161 | 19.4 |
| 19 | 1,307.515 | 1.21 | | | | 19.3 |
| 20 | −43.003 | 1.00 | 1.516330 | 64.14 | 0.5352 | 19.2 |
| 21 | 73.586 | (Variable) | | | | 19.4 |
| 22 | 138.037 | 6.82 | 1.438750 | 94.93 | 0.5343 | 20.8 |
| 23 | −22.944 | 0.80 | 1.570989 | 50.80 | 0.5588 | 22.4 |
| 24 | −31.987 | (Variable) | | | | 23.2 |
| 25 | 31.163 | 5.92 | 1.438750 | 94.93 | 0.5343 | 28.8 |
| 26 | −114.255 | 0.47 | | | | 28.7 |
| 27 | 42.475 | 0.80 | 1.754998 | 52.32 | 0.5476 | 27.8 |
| 28 | 22.665 | 1.50 | | | | 26.6 |
| 29 | 25.682 | 8.72 | 1.438750 | 94.93 | 0.5343 | 26.9 |
| 30 | −27.612 | 0.80 | 1.755199 | 27.51 | 0.6103 | 26.7 |
| 31 | −334.957 | BF | | | | 26.9 |
| Image plane | ∞ | | | | | |

33

-continued (Numerical Embodiment 5)
Unit mm

Aspherical surface data

First surface

K = 3.32755e+000    A4 = 1.67794e−006    A6 = 5.55468e−010
A8 = −1.45838e−012  A10 = 1.26290e−015   A12 = −3.79497e−019

Fourteenth surface

K = −4.14953e−001   A4 = −1.25538e−006   A6 = 5.56134e−009
A8 = −5.52273e−011  A10 = 2.62913e−013   A12 = −4.61916e−016

Fifteenth surface

K = −4.09299e−001   A4 = −5.64796e−007   A6 = 3.69251e−009
A8 = −3.42012e−011  A10 = 1.85309e−013   A12 = −3.60826e−016

Various data
Zoom ratio 3.00

|  | Wide angle | Intermediate | Telephoto |
|---|---|---|---|
| Focal length | 13.00 | 25.00 | 39.00 |
| F-number | 2.79 | 2.86 | 3.00 |
| Half angle of view | 48.70 | 30.63 | 20.78 |
| Image height | 14.80 | 14.80 | 14.80 |
| Total lens length | 220.00 | 220.00 | 220.00 |
| BF | 40.00 | 40.00 | 40.00 |
| d10 | 53.87 | 19.30 | 7.28 |
| d13 | 0.50 | 15.30 | 10.60 |
| d15 | 0.47 | 20.23 | 36.95 |
| d21 | 17.06 | 12.48 | 5.24 |
| d24 | 7.29 | 11.87 | 19.11 |

Zoom lens unit data

| Unit | First surface | Focal length |
|---|---|---|
| 1 | 1 | −30.26 |
| 21 | 11 | 94.22 |
| 22 | 14 | 76.75 |
| 3 | 16 | −33.52 |
| 4 | 22 | 66.10 |
| 5 | 25 | 84.40 |

(Numerical Embodiment 6)
Unit mm

Surface data

| Surface number i | ri | di | ndi | vdi | θgFi | Effective diameter |
|---|---|---|---|---|---|---|
| 1* | 105.156 | 2.70 | 1.496999 | 81.54 | 0.5374 | 63.3 |
| 2 | 24.557 | (Variable) |  |  |  | 46.2 |
| 3 | −79.541 | 1.50 | 1.740999 | 52.64 | 0.5467 | 38.7 |
| 4 | 100.713 | 3.59 |  |  |  | 36.8 |
| 5 | 100.339 | 3.68 | 1.698947 | 30.13 | 0.6029 | 35.7 |
| 6 | −1,203.013 | (Variable) |  |  |  | 35.0 |
| 7 | 62.920 | 7.59 | 1.618000 | 63.33 | 0.5441 | 28.3 |
| 8 | −42.666 | 1.35 | 1.854780 | 24.80 | 0.6122 | 28.0 |
| 9 | −108.523 | 0.20 |  |  |  | 28.0 |
| 10* | 73.558 | 7.56 | 1.496999 | 81.54 | 0.5374 | 27.5 |
| 11 | −56.908 | (Variable) |  |  |  | 26.4 |
| 12 | 0.000 | 2.90 |  |  |  | 12.7 |
| 13 | −55.809 | 0.80 | 1.658441 | 50.88 | 0.5561 | 12.0 |
| 14 | 15.148 | 2.12 | 1.922860 | 18.90 | 0.6495 | 11.8 |
| 15 | 41.652 | 3.18 |  |  |  | 11.5 |
| 16 | −19.790 | 1.50 | 1.800000 | 29.84 | 0.6017 | 11.3 |
| 17 | −261.806 | (Variable) |  |  |  | 11.8 |
| 18* | 192.872 | 3.54 | 1.496999 | 81.54 | 0.5374 | 15.8 |

34

-continued (Numerical Embodiment 6)
Unit mm

| 19 | −18.940 | (Variable) |  |  |  | 16.7 |
|---|---|---|---|---|---|---|
| 20 | 160.222 | 6.54 | 1.595220 | 67.74 | 0.5442 | 18.4 |
| 21 | −13.803 | 0.90 | 1.910820 | 35.25 | 0.5824 | 19.1 |
| 22 | −37.294 | 0.20 |  |  |  | 20.8 |
| 23 | 146.359 | 4.47 | 1.595220 | 67.74 | 0.5442 | 21.8 |
| 24 | −64.006 | BF |  |  |  | 22.5 |
| Image plane | ∞ |  |  |  |  |  |

Aspherical surface data

First surface

K = 2.99107e+000    A4 = 4.02739e−006    A6 = −8.89153e−010
A8 = 1.66414e−012   A10 = −1.31092e−015  A12 = 8.65049e−019

Tenth surface

K = 0.00000e+000    A4 = −3.86204e−006   A6 = 2.47475e−009
A8 = −2.42565e−011  A10 = 9.35867e−014   A12 = −1.36600e−016

Eighteenth surface

K = 0.00000e+000    A4 = 6.13749e−006    A6 = 2.62274e−008
A8 = 8.14687e−010   A10 = −1.19700e−011  A12 = 5.17898e−014

Various data
Zoom ratio 3.24

|  | Wide angle | Intermediate | Telephoto |
|---|---|---|---|
| Focal length | 17.00 | 35.00 | 55.00 |
| F-number | 3.44 | 3.75 | 4.00 |
| Half angle of view | 41.04 | 22.92 | 15.06 |
| Image height | 14.80 | 14.80 | 14.80 |
| Total lens length | 174.07 | 174.07 | 174.07 |
| BF | 45.95 | 45.95 | 45.95 |
| d2 | 29.28 | 36.15 | 26.78 |
| d6 | 36.41 | 7.33 | 1.70 |
| d11 | 1.98 | 24.19 | 39.18 |
| d17 | 5.15 | 2.65 | 0.57 |
| d19 | 1.00 | 3.50 | 5.58 |
| d24 | 45.95 | 45.95 | 45.95 |

Zoom lens unit data

| Unit | First surface | Focal length |
|---|---|---|
| 1 | 1 | −65.00 |
| 21 | 3 | −115.33 |
| 22 | 7 | 38.59 |
| 3 | 12 | −18.00 |
| 4 | 18 | 34.79 |
| 5 | 20 | 54.27 |

(Numerical Embodiment 7)
Unit mm

Surface data

| Surface number i | ri | di | ndi | vdi | θgFi | Effective diameter |
|---|---|---|---|---|---|---|
| 1* | 139.603 | 2.70 | 1.496999 | 81.54 | 0.5374 | 60.4 |
| 2 | 22.128 | 23.73 |  |  |  | 42.0 |
| 3 | −69.393 | 1.50 | 1.729157 | 54.68 | 0.5444 | 37.2 |
| 4 | 84.529 | 3.44 |  |  |  | 35.3 |
| 5 | 80.615 | 5.91 | 1.651597 | 58.55 | 0.5426 | 34.4 |
| 6 | −3,630.207 | (Variable) |  |  |  | 33.1 |
| 7 | 163.620 | 7.50 | 1.639300 | 44.87 | 0.5684 | 31.3 |
| 8 | −31.897 | 1.35 | 1.805181 | 25.42 | 0.6161 | 31.9 |

(Numerical Embodiment 7)
Unit mm

| | | | | | | |
|---|---|---|---|---|---|---|
| 9 | −68.026 | (Variable) | | | | 33.1 |
| 10* | 48.822 | 8.18 | 1.438750 | 94.93 | 0.5343 | 34.5 |
| 11 | −52.537 | (Variable) | | | | 34.4 |
| 12 | 0.000 | 2.25 | | | | 19.4 |
| 13 | −89.826 | 0.80 | 1.834807 | 42.73 | 0.5648 | 18.7 |
| 14 | 19.759 | 3.51 | 1.846660 | 23.78 | 0.6205 | 18.3 |
| 15 | 270.773 | 3.92 | | | | 18.2 |
| 16 | −24.598 | 1.20 | 1.517417 | 52.43 | 0.5564 | 17.8 |
| 17 | 112.189 | (Variable) | | | | 18.4 |
| 18* | 200.164 | 5.93 | 1.438750 | 94.93 | 0.5343 | 19.1 |
| 19 | −27.985 | (Variable) | | | | 21.2 |
| 20 | −669.709 | 5.82 | 1.595220 | 67.74 | 0.5442 | 25.9 |
| 21 | −25.307 | 0.90 | 2.003300 | 28.27 | 0.5980 | 26.6 |
| 22 | −39.511 | (Variable) | | | | 27.7 |
| 23 | 65.278 | 6.98 | 1.595220 | 67.74 | 0.5442 | 29.0 |
| 24 | −31.268 | 0.90 | 1.953750 | 32.32 | 0.5898 | 29.0 |
| 25 | −80.489 | BF | | | | 29.5 |
| Image plane | ∞ | | | | | |

Aspherical surface data

First surface

K = 2.99107e+000   A4 = 6.19159e−006   A6 = −3.22667e−009
A8 = 5.52229e−012   A10 = −4.81977e−015   A12 = 2.37317e−018

Tenth surface

K = 0.00000e+000   A4 = −3.88179e−006   A6 = 6.19439e−009
A8 = −4.66883e−011   A10 = 1.38796e−013   A12 = −1.53199e−016

Eighteenth surface

K = 0.00000e+000   A4 = 2.80480e−006   A6 = −3.17920e−008
A8 = 6.38976e−010   A10 = −5.01093e−012   A12 = 1.41630e−014

Various data
Zoom ratio 2.97

| | Wide angle | Intermediate | Telephoto |
|---|---|---|---|
| Focal length | 15.50 | 27.00 | 46.00 |
| F-number | 2.54 | 2.65 | 2.80 |
| Half angle of view | 43.68 | 28.73 | 17.84 |
| Image height | 14.80 | 14.80 | 14.80 |
| Total lens length | 186.31 | 186.31 | 186.31 |
| BF | 42.55 | 42.55 | 42.55 |
| d6 | 36.83 | 11.75 | 2.35 |
| d9 | 1.44 | 10.29 | 1.46 |
| d11 | 2.40 | 18.62 | 36.85 |
| d17 | 8.65 | 6.79 | 2.17 |
| d19 | 7.16 | 3.71 | 1.78 |
| d22 | 0.77 | 6.08 | 12.63 |
| d25 | 42.55 | 42.55 | 42.55 |

Zoom lens unit data

| Unit | First surface | Focal length |
|---|---|---|
| 1 | 1 | −30.13 |
| 21 | 7 | 95.80 |
| 22 | 10 | 58.99 |
| 3 | 12 | −25.40 |
| 41 | 18 | 56.27 |
| 42 | 20 | 116.71 |
| 5 | 23 | 105.68 |

(Numerical Embodiment 8)
Unit mm

Surface data

| Surface number i | ri | di | ndi | vdi | θgFi | Effective diameter |
|---|---|---|---|---|---|---|
| 1* | 56.472 | 2.80 | 1.651597 | 58.55 | 0.5426 | 54.0 |
| 2 | 28.188 | 6.20 | | | | 45.0 |
| 3 | 32.615 | 2.00 | 1.729157 | 54.68 | 0.5444 | 41.1 |
| 4 | 21.980 | 13.32 | | | | 35.2 |
| 5 | −49.732 | 1.80 | 1.496999 | 81.54 | 0.5374 | 33.4 |
| 6 | 37.332 | 1.31 | | | | 30.4 |
| 7 | 51.024 | 4.83 | 1.647689 | 33.79 | 0.5939 | 30.4 |
| 8 | 117.338 | 1.81 | | | | 29.3 |
| 9 | −272.351 | 3.93 | 1.516330 | 64.14 | 0.5352 | 29.1 |
| 10 | −43.468 | 2.50 | | | | 28.8 |
| 11 | −528.451 | 1.68 | 1.922860 | 18.90 | 0.6495 | 25.1 |
| 12 | 241.848 | (Variable) | | | | 24.4 |
| 13 | 45.558 | 1.50 | 2.000690 | 25.46 | 0.6133 | 27.4 |
| 14 | 33.237 | 5.25 | 1.595220 | 67.74 | 0.5442 | 27.2 |
| 15 | −106.481 | (Variable) | | | | 27.4 |
| 16* | 40.571 | 5.55 | 1.496999 | 81.54 | 0.5374 | 27.7 |
| 17* | −69.990 | (Variable) | | | | 27.6 |
| 18 | 0.000 | 3.00 | | | | 16.9 |
| 19 | −79.784 | 1.00 | 1.882997 | 40.76 | 0.5667 | 15.7 |
| 20 | 15.234 | 3.46 | 1.808095 | 22.76 | 0.6307 | 15.1 |
| 21 | −686.219 | 1.16 | | | | 15.0 |
| 22 | −35.503 | 1.00 | 1.816000 | 46.62 | 0.5568 | 14.9 |
| 23 | 60.738 | (Variable) | | | | 15.0 |
| 24 | −187.450 | 4.00 | 1.537750 | 74.70 | 0.5393 | 25.4 |
| 25 | −30.075 | 0.20 | | | | 26.4 |
| 26 | 33.121 | 6.32 | 1.438750 | 94.93 | 0.5343 | 31.2 |
| 27 | −215.883 | (Variable) | | | | 31.4 |
| 28 | 66.857 | 3.35 | 1.922860 | 18.90 | 0.6495 | 31.5 |
| 29 | −2,017.462 | 1.00 | 2.000690 | 25.46 | 0.6133 | 31.3 |
| 30 | 29.686 | (Variable) | | | | 30.2 |
| 31 | 48.297 | 8.50 | 1.729157 | 54.68 | 0.5444 | 31.0 |
| 32 | −33.333 | 0.80 | 2.000690 | 25.46 | 0.6133 | 31.4 |
| 33 | −118.506 | 0.20 | | | | 32.5 |
| 34 | 114.930 | 5.50 | 1.537750 | 74.70 | 0.5393 | 33.4 |
| 35 | −67.536 | BF | | | | 33.7 |
| Image plane | ∞ | | | | | |

Aspherical surface data

First surface

K = 2.25376e+000   A4 = 2.38111e−006   A6 = −5.36706e−010
A8 = −1.36021e−012   A10 = 2.70681e−015   A12 = −1.78443e−018

Sixteenth surface

K = −8.03251e−001   A4 = −4.09302e−006   A6 = 1.86617e−008
A8 = −5.14357e−010   A10 = 3.51384e−012   A12 = −1.06379e−014

Seventeenth surface

K = 4.88557e−001   A4 = −4.09768e−006   A6 = −6.59431e−010
A8 = −2.19670e−010   A10 = 1.82277e−012   A12 = −6.89510e−015

Various data
Zoom ratio 3.00

| | Wide angle | Intermediate | Telephoto |
|---|---|---|---|
| Focal length | 15.00 | 30.00 | 45.00 |
| F-number | 2.41 | 2.90 | 3.50 |
| Half angle of view | 44.62 | 26.26 | 18.21 |
| Image height | 14.80 | 14.80 | 14.80 |
| Total lens length | 178.97 | 178.97 | 178.97 |
| BF | 41.00 | 41.00 | 41.00 |
| d12 | 24.52 | 8.68 | 4.72 |
| d15 | 0.50 | 3.15 | 0.50 |
| d17 | 0.40 | 13.59 | 20.20 |
| d23 | 14.65 | 8.41 | 2.27 |
| d27 | 1.59 | 6.24 | 11.64 |

-continued (Numerical Embodiment 8)
Unit mm

| d30 | 2.36 | 3.95 | 4.68 |
|---|---|---|---|
| d35 | 41.00 | 41.00 | 41.00 |

Zoom lens unit data

| Unit | First surface | Focal length |
|---|---|---|
| 1 | 1 | −27.42 |
| 21 | 13 | 65.39 |
| 22 | 16 | 52.40 |
| 3 | 18 | −18.70 |
| 41 | 24 | 32.98 |
| 42 | 28 | −52.56 |
| 5 | 31 | 37.85 |

(Numerical Embodiment 9)
Unit mm

Surface data

| Surface number i | ri | di | ndi | vdi | θgFi | Effective diameter |
|---|---|---|---|---|---|---|
| 1* | 140.746 | 2.70 | 1.487490 | 70.23 | 0.5300 | 60.1 |
| 2 | 21.653 | 27.58 | | | | 41.5 |
| 3 | −61.487 | 1.50 | 1.719995 | 50.23 | 0.5521 | 33.7 |
| 4 | 82.175 | 2.30 | | | | 32.1 |
| 5 | 76.776 | 5.80 | 1.651597 | 58.55 | 0.5426 | 31.5 |
| 6 | −886.071 | (Variable) | | | | 30.3 |
| 7 | 152.802 | 7.08 | 1.613397 | 44.30 | 0.5633 | 24.0 |
| 8 | −30.721 | 1.35 | 1.805181 | 25.42 | 0.6161 | 24.0 |
| 9 | −69.806 | (Variable) | | | | 24.3 |
| 10* | 51.136 | 6.23 | 1.496999 | 81.54 | 0.5374 | 25.2 |
| 11 | −49.958 | (Variable) | | | | 25.1 |
| 12 | 0.000 | 1.70 | | | | 13.8 |
| 13 | −45.913 | 0.80 | 1.834807 | 42.73 | 0.5648 | 13.4 |
| 14 | 14.211 | 4.64 | 1.846660 | 23.78 | 0.6205 | 13.4 |
| 15 | 532.716 | 4.79 | | | | 13.3 |
| 16 | −17.516 | 1.20 | 1.517417 | 52.43 | 0.5564 | 13.2 |
| 17 | 5,082.028 | (Variable) | | | | 13.8 |
| 18 | 261.670 | 2.95 | 1.595220 | 67.74 | 0.5442 | 14.0 |
| 19 | −23.638 | (Variable) | | | | 15.0 |
| 20 | −110.686 | 3.77 | 1.595220 | 67.74 | 0.5442 | 15.9 |
| 21 | −16.345 | 0.90 | 2.003300 | 28.27 | 0.5980 | 16.5 |
| 22 | −21.793 | (Variable) | | | | 17.2 |
| 23 | 126.887 | 4.76 | 1.595220 | 67.74 | 0.5442 | 17.7 |
| 24 | −19.855 | 0.90 | 1.953750 | 32.32 | 0.5898 | 17.8 |
| 25 | −77.053 | BF | | | | 18.4 |
| Image plane | ∞ | | | | | |

Aspherical surface data

First surface

K = 2.99107e+000  A4 = 6.86067e−006  A6 = −4.69819e−009
A8 = 8.70648e−012  A10 = −8.07592e−015  A12 = 3.85102e−018

Tenth surface

K = 0.00000e+000  A4 = −4.23189e−006  A6 = 5.49762e−009
A8 = −5.93754e−011  A10 = 2.58567e−013  A12 = −4.29357e−016

Various data
Zoom ratio 3.00

| | Wide angle | Intermediate | Telephoto |
|---|---|---|---|
| Focal length | 16.00 | 30.00 | 48.00 |
| F-number | 3.75 | 3.82 | 4.00 |
| Half angle of view | 42.77 | 26.26 | 17.14 |
| Image height | 14.80 | 14.80 | 14.80 |

-continued (Numerical Embodiment 9)
Unit mm

| Total lens length | 176.48 | 176.48 | 176.48 |
|---|---|---|---|
| BF | 48.84 | 48.84 | 48.84 |
| d6 | 36.52 | 8.57 | 1.79 |
| d9 | 1.45 | 10.25 | 1.74 |
| d11 | 3.34 | 22.49 | 37.78 |
| d17 | 4.04 | 2.99 | 0.54 |
| d19 | 0.93 | 1.07 | 0.82 |
| d22 | 0.41 | 1.31 | 4.02 |
| d25 | 48.84 | 48.84 | 48.84 |

Zoom lens unit data

| Unit | First surface | Focal length |
|---|---|---|
| 1 | 1 | −28.62 |
| 21 | 7 | 108.40 |
| 22 | 10 | 51.76 |
| 3 | 12 | −18.92 |
| 41 | 18 | 36.44 |
| 42 | 20 | 60.28 |
| 5 | 23 | −1031.32 |

(Numerical Embodiment 10)
Unit mm

Surface data

| Surface number i | ri | di | ndi | vdi | θgFi | Effective diameter |
|---|---|---|---|---|---|---|
| 1* | 68.920 | 2.80 | 1.696797 | 55.53 | 0.5433 | 74.0 |
| 2 | 27.500 | 19.53 | | | | 54.2 |
| 3 | 59.092 | 1.89 | 1.882997 | 40.76 | 0.5667 | 48.8 |
| 4 | 22.937 | 13.21 | | | | 38.1 |
| 5 | −69.447 | 1.00 | 1.496999 | 81.54 | 0.5374 | 37.7 |
| 6 | 43.559 | 7.71 | | | | 35.7 |
| 7 | 52.134 | 5.68 | 1.548141 | 45.79 | 0.5685 | 36.1 |
| 8 | 233.916 | 1.16 | | | | 35.4 |
| 9 | 2,1674.176 | 5.22 | 1.517417 | 52.43 | 0.5564 | 35.3 |
| 10 | −42.786 | 1.50 | | | | 35.1 |
| 11 | 2,579.545 | 1.68 | 1.953750 | 32.32 | 0.5898 | 30.7 |
| 12 | 105.490 | (Variable) | | | | 29.6 |
| 13 | 44.612 | 1.50 | 2.000690 | 25.46 | 0.6133 | 31.6 |
| 14 | 29.993 | 6.14 | 1.531717 | 48.84 | 0.5630 | 31.1 |
| 15 | −382.107 | (Variable) | | | | 31.4 |
| 16* | 50.848 | 6.27 | 1.438750 | 94.93 | 0.5343 | 32.0 |
| 17* | −53.169 | (Variable) | | | | 32.0 |
| 18 | 0.000 | 3.00 | | | | 18.9 |
| 19 | −65.174 | 1.00 | 1.834807 | 42.73 | 0.5648 | 18.1 |
| 20 | 16.794 | 5.49 | 1.808095 | 22.76 | 0.6307 | 17.9 |
| 21 | −45.168 | 2.29 | | | | 17.9 |
| 22 | −27.765 | 1.00 | 2.000690 | 25.46 | 0.6133 | 17.1 |
| 23 | 3,868.913 | (Variable) | | | | 17.4 |
| 24 | −64.588 | 3.17 | 1.595220 | 67.74 | 0.5442 | 19.3 |
| 25 | −29.313 | 1.90 | | | | 19.9 |
| 26 | 54.084 | 4.27 | 1.595220 | 67.74 | 0.5442 | 22.6 |
| 27 | −40.151 | (Variable) | | | | 22.8 |
| 28 | 62.164 | 4.63 | 1.548141 | 45.79 | 0.5685 | 22.6 |
| 29 | −30.099 | 1.00 | 1.953750 | 32.32 | 0.5898 | 22.3 |
| 30 | 37.465 | (Variable) | | | | 22.4 |
| 31 | 38.870 | 8.48 | 1.595220 | 67.74 | 0.5442 | 23.1 |
| 32 | −28.000 | 0.80 | 1.953750 | 32.32 | 0.5898 | 23.9 |
| 33 | −47.730 | BF | | | | 24.5 |
| Image plane | ∞ | | | | | |

(Numerical Embodiment 10)
Unit mm

Aspherical surface data

First surface

K = 2.25376e+000  A4 = 3.25133e-006   A6 = -3.03483e-009
A8 = 3.88387e-012 A10 = -2.64826e-015 A12 = 8.36141e-019

Sixteenth surface

K = -8.03251e-001  A4 = -3.18540e-006  A6 = 2.90027e-008
A8 = -2.24588e-010 A10 = 8.34708e-013  A12 = -1.19390e-015

Seventeenth surface

K = 4.88557e-001   A4 = -5.19876e-007  A6 = 2.49381e-008
A8 = -1.96367e-010 A10 = 7.56868e-013  A12 = -1.11249e-015

Various data
Zoom ratio 2.63

| | Wide angle | Intermediate | Telephoto |
|---|---|---|---|
| Focal length | 9.50 | 17.00 | 25.00 |
| F-number | 2.77 | 2.80 | 2.80 |
| Half angle of view | 57.30 | 41.04 | 30.63 |
| Image height | 14.80 | 14.80 | 14.80 |
| Total lens length | 211.00 | 211.00 | 211.00 |
| BF | 41.00 | 41.00 | 41.00 |
| d12 | 41.58 | 12.33 | 5.01 |
| d15 | 0.50 | 9.48 | 0.50 |
| d17 | 0.40 | 20.67 | 36.97 |
| d23 | 13.52 | 10.76 | 7.35 |
| d27 | 0.87 | 1.40 | 1.35 |
| d30 | 0.80 | 3.03 | 6.49 |
| d33 | 41.00 | 41.00 | 41.00 |

Zoom lens unit data

| Unit | First surface | Focal length |
|---|---|---|
| 1 | 1 | -20.00 |
| 21 | 13 | 119.29 |
| 22 | 16 | 60.20 |
| 3 | 18 | -29.98 |
| 41 | 24 | 27.45 |
| 42 | 28 | -34.00 |
| 5 | 31 | 45.65 |

(Numerical Embodiment 11)
Unit mm

| Surface number i | ri | di | ndi | vdi | θgFi | Effective diameter |
|---|---|---|---|---|---|---|
| 1* | 67.946 | 2.80 | 1.696797 | 55.53 | 0.5433 | 72.7 |
| 2 | 28.157 | 13.53 | | | | 54.6 |
| 3 | 40.584 | 1.89 | 1.882997 | 40.76 | 0.5667 | 50.9 |
| 4 | 23.608 | 15.83 | | | | 41.0 |
| 5 | -78.101 | 1.89 | 1.834000 | 37.16 | 0.5775 | 39.1 |
| 6 | 44.678 | 8.13 | | | | 36.5 |
| 7 | 79.057 | 4.47 | 1.620041 | 36.26 | 0.5879 | 37.7 |
| 8 | -248.175 | 0.98 | | | | 37.6 |
| 9 | 91.566 | 6.10 | 1.548141 | 45.79 | 0.5685 | 36.8 |
| 10 | -61.074 | 0.94 | | | | 36.3 |
| 11 | 352.619 | 1.68 | 2.001000 | 29.13 | 0.5997 | 32.5 |
| 12 | 67.819 | (Variable) | | | | 31.1 |
| 13 | 47.930 | 1.50 | 2.000690 | 25.46 | 0.6133 | 30.9 |
| 14 | 30.990 | 6.64 | 1.531717 | 48.84 | 0.5630 | 30.6 |
| 15 | -89.014 | (Variable) | | | | 30.9 |
| 16* | 52.411 | 6.30 | 1.438750 | 94.93 | 0.5343 | 32.6 |
| 17* | -52.471 | (Variable) | | | | 32.5 |
| 18 | 0.000 | 2.09 | | | | 19.9 |
| 19 | -54.033 | 1.00 | 1.754998 | 52.32 | 0.5476 | 19.4 |
| 20 | 16.760 | 4.73 | 1.784696 | 26.29 | 0.6135 | 19.0 |
| 21 | -80.459 | 0.90 | | | | 18.9 |
| 22 | -34.770 | 1.00 | 1.740999 | 52.64 | 0.5467 | 18.8 |
| 23 | 75.109 | (Variable) | | | | 18.9 |
| 24 | -182.656 | 2.90 | 1.496999 | 81.54 | 0.5374 | 20.4 |
| 25 | -32.694 | (Variable) | | | | 20.7 |
| 26 | 31.755 | 4.61 | 1.438750 | 94.93 | 0.5343 | 22.1 |
| 27 | -66.019 | 0.47 | | | | 22.3 |
| 28 | 37.171 | 3.00 | 1.438750 | 94.93 | 0.5343 | 22.3 |
| 29 | 389.443 | 1.00 | 1.799516 | 42.22 | 0.5672 | 22.0 |
| 30 | 23.611 | 3.00 | | | | 21.5 |
| 31 | 28.993 | 7.27 | 1.438750 | 94.93 | 0.5343 | 23.1 |
| 32 | -22.987 | 0.80 | 1.922860 | 18.90 | 0.6495 | 23.3 |
| 33 | -40.782 | BF | | | | 24.1 |
| Image plane | ∞ | | | | | |

Aspherical surface data

First surface

K = 2.25376e+000 A4 = 2.28704e-006   A6 = -6.70875e-010
A8 = 9.77567e-013 A10 = -9.03399e-016 A12 = 4.23368e-019

Sixteenth surface

K = -8.03251e-001  A4 = -9.36601e-007 A6 = 8.10468e-009
A8 = -7.98653e-011 A10 = 3.52905e-013 A12 = -5.55071e-016

Seventeenth surface

K = 4.88557e-001   A4 = 8.32579e-007  A6 = 3.66737e-009
A8 = -4.26926e-011 A10 = 2.26611e-013 A12 = -4.00394e-016

Various data
Zoom ratio 2.50

| | Wide angle | Intermediate | Telephoto |
|---|---|---|---|
| Focal length | 10.00 | 15.00 | 25.00 |
| F-number | 2.67 | 2.68 | 2.70 |
| Half angle of view | 55.95 | 44.61 | 30.63 |
| Image height | 14.80 | 14.80 | 14.80 |
| Total lens length | 203.11 | 203.11 | 203.11 |
| BF | 40.01 | 40.01 | 40.01 |
| d12 | 40.75 | 20.66 | 5.78 |
| d15 | 0.47 | 10.45 | 9.01 |
| d17 | 0.28 | 10.39 | 26.71 |
| d23 | 15.77 | 13.70 | 7.09 |
| d25 | 0.38 | 2.46 | 9.06 |
| Entrance pupil position | 29.39 | 30.00 | 32.20 |
| Exit pupil position | -109.44 | -96.61 | -73.75 |
| Front principal point position | 38.72 | 43.35 | 51.70 |
| Rear principal point position | 30.01 | 25.01 | 15.01 |

Zoom lens unit data

| Unit | First surface | Focal length | Lens structure length | Front principal point position | Rear principal point position |
|---|---|---|---|---|---|
| 1 | 1 | -20.00 | 58.25 | 13.07 | -36.21 |
| 21 | 13 | 85.34 | 8.14 | 1.65 | -3.54 |
| 22 | 16 | 60.73 | 6.30 | 2.23 | -2.23 |
| 3 | 18 | -28.94 | 9.71 | 5.01 | -1.60 |
| 4 | 24 | 79.38 | 2.90 | 2.34 | 0.42 |
| 5 | 26 | 59.14 | 20.15 | 2.30 | -13.32 |

TABLE 1

Values of respective conditional expressions in Numerical Embodiments

| Conditional Expression | | Embodiment | | | | | |
|---|---|---|---|---|---|---|---|
| | | 1 | 2 | 3 | 4 | 5 | 6 |
| | f1 | −43.5 | −33.2 | −47.91 | −32.12 | −30.26 | −65 |
| | f11 | −81.84 | −59.24 | −71.91 | −51.11 | −24.47 | |
| | f12p | — | — | — | — | 234.79 | — |
| | f12n | −120.26 | −111.81 | −199.65 | −118.05 | — | — |
| | f21 | 89.3 | 103 | — | 90.9 | 94.2 | −115.33 |
| | f22 | 88.1 | 66 | — | 58.6 | 76.7 | 38.59 |
| | f3 | −33.91 | −33.8 | −17.49 | −21.41 | −33.52 | −18 |
| | f4 | 57.2 | 72 | 28.63 | 39.5 | 66.1 | 34.79 |
| | fw | 18.5 | 15.5 | 18 | 16.5 | 13 | 17 |
| | |m2| | 56.74 | 45.93 | 28.65 | 32.28 | 46.59 | 37.2 |
| | |m4| | 16.98 | 11.34 | 15.12 | 6.94 | 11.83 | 4.58 |
| | β2_w | −0.533 | −0.555 | −0.664 | −0.611 | −0.556 | −0.34 |
| | β2_t | −1.545 | −1.328 | −1.149 | −1.29 | −1.305 | −0.768 |
| | β21_w | −2.28 | −10.388 | — | −30.8 | −3.605 | 0.56 |
| | β21_t | 5.086 | 2.86 | — | 3.101 | 4.607 | 0.57 |
| | β22_w | 0.235 | 0.054 | — | 0.02 | 0.152 | −0.6 |
| | β22_t | −0.307 | −0.467 | — | −0.419 | −0.275 | −1.339 |
| | θ2p | 0.5402 | 0.5352 | 0.5426 | 0.5441 | 0.5352 | 0.5441 |
| | ν2p | 60.67 | 64.14 | 60.29 | 63.33 | 64.14 | 63.33 |
| | θ2n | 0.6017 | 0.6017 | 0.6135 | 0.6017 | 0.6017 | 0.6122 |
| | ν2n | 29.84 | 29.84 | 26.52 | 29.84 | 29.84 | 24.8 |
| (1) | f1/f3 | 1.28 | 0.98 | 2.74 | 1.5 | 0.9 | 3.61 |
| (2) | |m2|/|m4| | 3.34 | 4.05 | 1.89 | 4.65 | 3.94 | 8.12 |
| (3) | β2_t/β2_w | 2.9 | 2.39 | 1.73 | 2.11 | 2.35 | 2.26 |
| (4) | f1/fw | −2.35 | −2.14 | −2.66 | −1.95 | −2.33 | −3.82 |
| (5) | |β2_w| | 0.53 | 0.56 | 0.66 | 0.61 | 0.56 | 0.34 |
| (6) | f11/f12p | — | — | — | — | −0.1 | — |
| (7) | f11/f12n | 0.68 | 0.53 | 0.36 | 0.43 | — | — |
| (8) | (θ2p − θ2n)/(ν2p − ν2n) | −1.99E−03 | −1.94E−03 | −2.1E−03 | −1.72E−03 | −1.94E−03 | −1.77E−03 |
| (9) | f1/f21 | −0.49 | −0.32 | — | −0.35 | −0.32 | 0.56 |
| (10) | f1/f4 | −0.76 | −0.46 | −1.67 | −0.81 | −0.46 | −1.87 |
| (11) | f21/f22 | 1.01 | 1.56 | — | 1.55 | 1.23 | −2.99 |

| Conditional Expression | | Embodiment | | | | |
|---|---|---|---|---|---|---|
| | | 7 | 8 | 9 | 10 | 11 |
| | f1 | −30.13 | −27.42 | −28.62 | −20 | −20 |
| | f11 | −53.16 | −22.78 | −52.71 | −16.73 | −17.5 |
| | f12p | — | 217.89 | — | 270.71 | 287.5 |
| | f12n | −96.46 | — | −92.31 | — | — |
| | f21 | 95.8 | 65.39 | 108.4 | 119.29 | 85.3 |
| | f22 | 58.99 | 52.4 | 51.76 | 60.2 | 60.7 |
| | f3 | −25.4 | −18.7 | −18.92 | −29.98 | −28.9 |
| | f4 | 41.05 | 59.47 | 24.05 | 68.52 | 79.4 |
| | fw | 15.5 | 15 | 16 | 9.5 | 10 |
| | |m2| | 34.47 | 19.8 | 34.73 | 36.57 | 34.97 |
| | |m4| | 11.86 | 12.38 | 3.61 | 6.18 | 8.68 |
| | β2_w | −0.639 | −0.642 | −0.615 | −0.645 | −0.567 |
| | β2_t | −1.526 | −1.105 | −1.492 | −1.476 | −1.169 |
| | β21_w | 38.68 | −6.28 | 6.33 | 6.82 | −6.433 |
| | β21_t | 2.59 | 6.96 | 2.09 | 2.21 | 3.932 |
| | β22_w | −0.017 | 0.1 | −0.097 | −0.094 | 0.088 |
| | β22_t | −0.593 | −0.153 | −0.718 | −0.655 | −0.297 |
| | θ2p | 0.5684 | 0.5442 | 0.5633 | 0.563 | 0.563 |
| | ν2p | 44.87 | 67.74 | 44.3 | 48.84 | 48.84 |
| | θ2n | 0.6161 | 0.6133 | 0.6161 | 0.6133 | 0.6133 |
| | ν2n | 25.42 | 25.46 | 25.42 | 25.46 | 25.46 |
| (1) | f1/f3 | 1.19 | 1.47 | 1.51 | 0.67 | 0.69 |
| (2) | |m2|/|m4| | 2.91 | 1.6 | 9.62 | 5.92 | 4.03 |
| (3) | β2_t/β2_w | 2.39 | 1.72 | 2.43 | 2.29 | 2.06 |
| (4) | f1/fw | −1.94 | −1.83 | −1.79 | −2.11 | −2.00 |
| (5) | |β2_w| | 0.64 | 0.64 | 0.61 | 0.64 | 0.57 |
| (6) | f11/f12p | — | −0.1 | — | −0.06 | −0.06 |
| (7) | f11/f12n | 0.55 | — | 0.57 | — | — |
| (8) | (θ2p − θ2n)/(ν2p − ν2n) | −2.45E−03 | −1.63E−03 | −2.8E−03 | −2.15E−03 | −2.15e−03 |
| (9) | f1/f21 | −0.31 | −0.42 | −0.26 | −0.17 | −0.23 |
| (10) | f1/f4 | −0.73 | −0.46 | −1.19 | −0.29 | −0.25 |
| (11) | f21/f22 | 1.62 | 1.25 | 2.09 | 1.98 | 1.41 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-206169, filed Oct. 20, 2015 and Japanese Patent Application No. 2015-206170, filed Oct. 20, 2015 which are hereby incorporated by reference herein in their entirety.

What is claimed is:

1. A zoom lens comprising in order from an object side to an image side:
    a first lens unit having a negative refractive power and being not moved for zooming;
    a second lens unit being moved during zooming, and having a positive refractive power;
    a third lens unit including an aperture stop, being not moved for zooming, and having a negative refractive power;
    a fourth lens unit being moved during zooming; and
    a fifth lens unit being not moved for zooming,
    wherein at least three of a lens sub unit are included in the second lens unit and the fourth lens unit, and are moved in an optical axis direction during zooming,
    wherein the following expressions are satisfied:

$0.6 < f1/f3 < 4.0$; and $1.4 < |m2|/|m4| < 50.0$, where f1 and f3 respectively represent focal lengths of the first lens unit and the third lens unit, and m2 and m4 respectively represent a movement amount of one of the lens sub unit that is moved by a largest amount in the second lens unit during zooming from a wide angle end to a telephoto end and a movement amount of one of the lens sub unit that is moved by a largest amount in the fourth lens unit during zooming from the wide angle end to the telephoto end.

2. A zoom lens according to claim 1, wherein the following expression is satisfied:

$1.5 < \beta2\_t/\beta2\_w < 4.0$, where $\beta2\_w$ and $\beta2\_t$ respectively represent lateral magnifications of the second lens unit at the wide angle end and the telephoto end.

3. A zoom lens according to claim 1, wherein the following expression is satisfied:

$-5.0 < f1/fw < -1.5$, where fw represents a focal length of the zoom lens at the wide angle end in a state of focusing at infinity.

4. A zoom lens according to claim 1, wherein the following expression is satisfied:

$|\beta2\_w| < 1.0$, where $|\beta2\_w|$ represents an absolute value of a lateral magnification of the second lens unit at the wide angle end.

5. A zoom lens according to claim 1, wherein the third lens unit comprises at least two lenses having negative refractive powers.

6. A zoom lens according to claim 1, wherein a lens closest to the object side in the first lens unit comprises a lens having a negative refractive power.

7. A zoom lens according to claim 1, wherein the first lens unit comprises a lens sub unit (L11) having a negative refractive power and being not moved for focusing, and a lens sub unit (L12) being moved during focusing.

8. A zoom lens according to claim 7, wherein the lens sub unit (L12) has a positive refractive power, and the following expression is satisfied:

$-0.15 < f11/f12p < -0.04$, where f11 represents a focal length of the lens sub unit (L11), and f12p represents a focal length of the lens sub unit (L12).

9. A zoom lens according to claim 7, wherein the lens sub unit (L12) has a negative refractive power, and the following expression is satisfied:

$0.3 < f11/f12n < 0.8$, where f11 represents a focal length of the lens sub unit (L11), and f12n represents a focal length of the lens sub unit (L12).

10. A zoom lens according to claim 1, wherein the second lens unit comprises at least one cemented lens formed of one convex lens and one concave lens, and satisfies the following expression:

$-3.00 \times 10^{-3} < (\theta2p - \theta2n)/(\nu2p - \nu2n) < -1.5 \times 10^{-3}$, where $\nu2p$ represents an Abbe number of the convex lens, $\theta2p$ represents a partial dispersion ratio of the convex lens, $\nu2n$ represents an Abbe number of the concave lens, and $\theta2n$ represents a partial dispersion ratio of the concave lens, an Abbe number $\nu d$ and a partial dispersion ratio $\theta gF$ are defined as follows:

$\nu d = (Nd-1)/(NF-NC)$; and $\theta gF = (Ng-NF)/(NF-NC)$, where Ng, NF, Nd, and NC respectively represent refractive indices for a g-line, a F-line, a d-line, and a C-line of Fraunhofer lines.

11. A zoom lens according to claim 1, wherein the second lens unit and the fourth lens unit comprise a lens having at least one aspherical surface.

12. A zoom lens according to claim 1, wherein the second lens unit comprises a lens sub unit (L21) and a lens sub unit (L22) which are moved along mutually different loci during zooming.

13. A zoom lens according to claim 12, wherein the following expression is satisfied:

$-0.60 < f1/f21 < -0.15$, where f21 represents a focal length of the lens sub unit (L21).

14. A zoom lens according to claim 1, wherein the following expression is satisfied:

$-1.00 < f1/f4 < -0.15$, where f4 represents a focal length of the fourth lens unit.

15. A zoom lens according to claim 12, wherein the following expression is satisfied:

$0.8 < f21/f22 < 1.8$, where f21 represents a focal length of the lens sub unit (L21), and f22 represents a focal length of the lens sub unit (L22).

16. A zoom lens according to claim 12, wherein the lens sub unit (L21), the lens sub unit (L22), and the fourth lens unit are configured to move during zooming.

17. An image pickup apparatus, comprising:
    a zoom lens; and
    an image pickup element configured to receive light of an image formed by the zoom lens, the zoom lens comprising in order from an object side to an image side:
a first lens unit having a negative refractive power and being not moved for zooming;
a second lens unit being moved during zooming, and having a positive refractive power;
a third lens unit including an aperture stop, being not moved for zooming, and having a negative refractive power;
a fourth lens unit being moved during zooming; and
a fifth lens unit being not moved for zooming,
wherein at least three of a lens sub unit are included in the second lens unit and the fourth lens unit, and are moved in an optical axis direction during zooming,
wherein the following expressions are satisfied:

$0.6 < f1/f3 < 4.0$; and $1.4 < |m2|/|m41| < 50.0$, where f1 and f3 respectively represent focal lengths of the first lens unit and the third lens unit, and m2 and m4 respectively represent a movement amount of one of the lens sub unit that is moved by a largest amount in the second lens unit during zooming from a wide angle end to a telephoto end and a movement amount of one of the lens sub unit that is moved by a largest amount in the fourth lens unit during zooming from the wide angle end to the telephoto end.

* * * * *